US012404417B2

(12) United States Patent
Tateishi et al.

(10) Patent No.: US 12,404,417 B2
(45) Date of Patent: Sep. 2, 2025

(54) AQUEOUS ADDITIVE SOLUTION FOR INK COMPOSITION, AQUEOUS COLORANT SOLUTION FOR INK COMPOSITION, INK COMPOSITION, INK COMPOSITION FOR INK JET RECORDING, AND INK JET RECORDING METHOD

(71) Applicant: FUJIFILM Corporation, Tokyo (JP)

(72) Inventors: Keiichi Tateishi, Kanagawa (JP); Yuta Okuaki, Kanagawa (JP); Yuta Takasaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 175 days.

(21) Appl. No.: 18/474,241

(22) Filed: Sep. 26, 2023

(65) Prior Publication Data

US 2024/0018376 A1 Jan. 18, 2024

Related U.S. Application Data

(63) Continuation of application No. PCT/JP2022/014717, filed on Mar. 25, 2022.

(30) Foreign Application Priority Data

Mar. 30, 2021 (JP) ................................ 2021-058541

(51) Int. Cl.

| | |
|---|---|
| ***C09D 11/38*** | (2014.01) |
| ***C09B 5/14*** | (2006.01) |
| ***C09B 33/28*** | (2006.01) |
| ***C09B 35/34*** | (2006.01) |
| ***C09B 47/20*** | (2006.01) |
| ***C09B 67/44*** | (2006.01) |
| ***C09D 11/328*** | (2014.01) |

(52) U.S. Cl.

CPC ................ *C09D 11/38* (2013.01); *C09B 5/14* (2013.01); *C09B 33/28* (2013.01); *C09B 35/34* (2013.01); *C09B 47/20* (2013.01); *C09B 67/0083* (2013.01); *C09D 11/328* (2013.01)

(58) Field of Classification Search

CPC ......... C09D 11/38; C09D 11/328; C09B 5/14; C09B 33/28; C09B 35/34; C09B 47/20; C09B 67/0083

See application file for complete search history.

(56) References Cited

U.S. PATENT DOCUMENTS

| | | | |
|---|---|---|---|
| 7,279,033 | B2 | 10/2007 | Yabuki et al. |
| 2005/0109236 | A1 | 5/2005 | Yabuki et al. |
| 2006/0201382 | A1 | 9/2006 | Ozawa et al. |
| 2010/0028539 | A1 | 2/2010 | Tateishi et al. |
| 2021/0403736 | A1 | 12/2021 | Tateishi et al. |
| 2022/0017763 | A1 | 1/2022 | Tateishi et al. |
| 2022/0169859 | A1 | 6/2022 | Tateishi et al. |
| 2023/0039668 | A1 | 2/2023 | Tateishi |

FOREIGN PATENT DOCUMENTS

| | | | |
|---|---|---|---|
| JP | 2005105261 | 4/2005 | |
| JP | 2005105261 A * | 4/2005 | ........... C09D 11/328 |
| JP | 2006249329 | 9/2006 | |
| JP | 2008088344 | 4/2008 | |
| JP | 4686151 | 5/2011 | |
| JP | 2015193800 A * | 11/2015 | ............. C09B 11/26 |
| JP | 2019163418 A * | 9/2019 | ............. C09D 11/32 |
| JP | 2020076048 | 5/2020 | |
| WO | 2020189589 | 9/2020 | |
| WO | 2020196435 | 10/2020 | |
| WO | WO-2020196435 A1 * | 10/2020 | .......... B41M 5/0023 |
| WO | 2021039651 | 3/2021 | |
| WO | WO-2021039651 A1 * | 3/2021 | ........... C09B 47/065 |
| WO | 2021201043 | 10/2021 | |

OTHER PUBLICATIONS

"International Search Report (Form PCT/ISA/210) of PCT/JP2022/014717", mailed on May 24, 2022, with English translation thereof, pp. 1-7.

"Written Opinion of the International Searching Authority (Form PCT/ISA/237) of PCT/JP2022/014717", mailed on May 24, 2022, with English translation thereof, pp. 1-8.

* cited by examiner

*Primary Examiner* — Yaovi M Ameh

(74) *Attorney, Agent, or Firm* — JCIPRNET

(57) ABSTRACT

An aqueous additive solution for an ink composition, containing a compound represented by general formula (A) as defined herein; a compound represented by general formula (II) as defined herein; and water, an aqueous colorant solution for an ink composition, containing a compound represented by general formula (A) as defined herein; a compound represented by general formula (II) as defined herein; water; and a colorant, and an ink composition containing a compound represented by general formula (A) as defined herein; a compound represented by general formula (II) as defined herein.

19 Claims, No Drawings

AQUEOUS ADDITIVE SOLUTION FOR INK COMPOSITION, AQUEOUS COLORANT SOLUTION FOR INK COMPOSITION, INK COMPOSITION, INK COMPOSITION FOR INK JET RECORDING, AND INK JET RECORDING METHOD

CROSS REFERENCE TO RELATED APPLICATION

This is a continuation of International Application No. PCT/JP2022/014717 filed on Mar. 25, 2022, and claims priority from Japanese Patent Application No. 2021-058541 filed on Mar. 30, 2021, the entire disclosure of which is incorporated herein by reference.

BACKGROUND OF THE INVENTION

1. Field of the Invention

The present invention relates to an aqueous additive solution for an ink composition, an aqueous colorant solution for an ink composition, an ink composition, an ink composition for ink jet recording, and an ink jet recording method.

2. Description of the Related Art

An ink jet recording method has been spreading rapidly and further developing because the material cost is low, high-speed recording is possible, noises during recording are small, and color recording is easily achieved.

As ink compositions used in the ink jet recording method, compositions including various colorants (coloring agents) have been proposed. In addition, in order to improve various performances, compounds (additives) added to the ink compositions have also been studied. For example, JP4686151B, JP2020-76048A, and WO2021/039651A disclose compounds with high planarity as additives that can be used for ink compositions including dyes.

SUMMARY OF THE INVENTION

In recent years, ink jet printers mounting large-volume ink tanks having a volume of 50 mL or more have been developed, and such ink jet printers mounting large-volume ink tanks are said to be excellent in terms of, for example, the printing cost because the frequency at which an ink cartridge is replaced can be reduced.

However, in large-volume ink tanks, since ink compositions remain in the ink tanks for a long period of time, the ink compositions are required to have storage stability at a level that has not been achieved in the related art.

Furthermore, aqueous additive solutions used for preparing the ink compositions are also required to have storage stability.

In JP4686151B, no study is performed from the above points of view.

In JP2020-76048A and WO2021/039651A, studies are performed on storage stability of ink compositions, but there is room for further improvement. In addition, no study is performed on storage stability of aqueous additive solution.

In particular, if the pH values of an aqueous additive solution and an aqueous colorant solution used in the preparation of an ink composition increase (for example, if the pH values become more than 9.0), it may be substantially difficult to adjust the pH value (for example, pH value=8.5) of the ink composition for ink jet recording. Furthermore, if the pH values of the aqueous additive solution, the aqueous colorant solution, and the ink composition increase, decomposition of a colorant and an additive may occur.

If the pH values of the aqueous additive solution and the aqueous colorant solution decrease (for example, if the pH values become less than 6.0), the risk of the occurrence of precipitation of a colorant (for example, an acid dye) and an additive increases.

If the pH value of the ink composition decreases (for example, if the pH value becomes less than 6.0), the risk of corrosion of an ink head of an ink jet printer increases. In addition, the risk of the occurrence of precipitation of a colorant (for example, an acid dye) and an additive increases as in the aqueous additive solution and the aqueous colorant solution.

Accordingly, variations in the pH values are also associated with variations in optimized liquid physical properties (such as the dissolution stability, absorbance, viscosity, and surface tension), and there is a concern that the variations in the pH values have an influence on the characteristics of a delicate ink head (for example, ejection stability (clogging) and continuous ejection stability (reliability) of the ink may be deteriorated).

An object of the present invention is to provide an aqueous additive solution for an ink composition, an aqueous colorant solution for an ink composition, and an ink composition which are excellent in storage stability (have excellent antiseptic properties, and produce less precipitation of insoluble matter, are less likely to undergo changes in the absorbance, viscosity, and surface tension, and less likely to undergo a change in the pH value when stored for a long period of time), an ink composition for ink jet recording, the ink composition including the above ink composition, and an ink jet recording method using the above ink composition for ink jet recording.

The inventors of the present invention have found that the above object can be achieved by the configurations described below.

<1>

An aqueous additive solution for an ink composition, the aqueous additive solution containing a compound represented by the following general formula (A); a compound represented by the following general formula (II); and water.

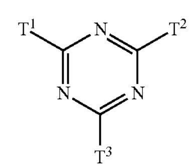

(A)

In general formula (A), $T^1$, $T^2$, and $T^3$ each independently represent *—NH—$(CH_2)_n$-Rt, *—NH—$(CH_2)_n$—OH, *—N—$\{(CH_2)_n$—OH$\}_2$, *—NH—$CH_2CH(OH)CH_2$-Rt, *-OM, a halogen atom, or a substituted or unsubstituted arylamino group. However, at least one of $T^1$, $T^2$, or $T^3$ represents *—NH—$(CH_2)_n$-Rt, *—NH—$(CH_2)_n$—OH, *—N—$\{(CH_2)_n$—OH$\}_2$, or *—NH—$CH_2CH(OH)CH_2$-Rt. * represents a bonding site to a triazine ring, n represents an integer of 1 to 5, and Rt represents $CO_2M$, $SO_3M$, or $PO(OM)_2$. M represents a hydrogen atom or a counter cation. If a plurality of n are present, the plurality of n may be the same or different. If a plurality of M are present, the plurality of M may be the same or different.

(II)

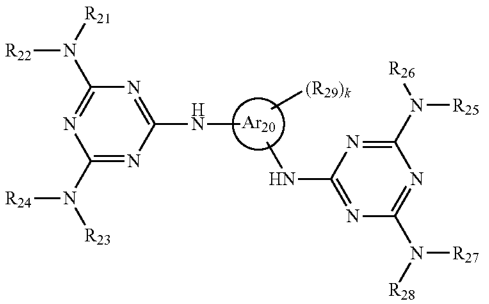

In general formula (II), $Ar_{20}$ represents a benzene ring or a naphthalene ring. $R_{21}$ to $R_{28}$ each independently represent a hydrogen atom or a substituent. $R_{21}$ and $R_{22}$ may be bonded to each other to form a ring. $R_{23}$ and $R_{24}$ may be bonded to each other to form a ring. $R_{25}$ and $R_{26}$ may be bonded to each other to form a ring. $R_{27}$ and $R_{28}$ may be bonded to each other to form a ring. $R_{29}$ represents a substituent. If $Ar_{20}$ represents a benzene ring, k represents an integer of 0 to 4. If $Ar_{20}$ represents a naphthalene ring, k represents an integer of 0 to 6. If a plurality of $R_{29}$ are present, the plurality of $R_{29}$ may be the same or different. If a plurality of $R_{29}$ are present, the plurality of $R_{29}$ may be bonded together to form a ring. However, the compound represented by general formula (II) has at least one hydrophilic group.

<2>

The aqueous additive solution for an ink composition according to <1>, wherein the compound represented by the general formula (A) is at least one compound selected from the following compound group (a).

Compound group (a)

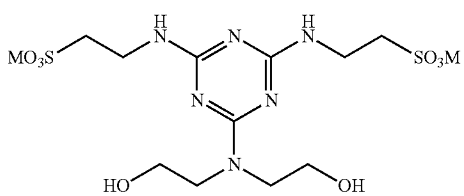

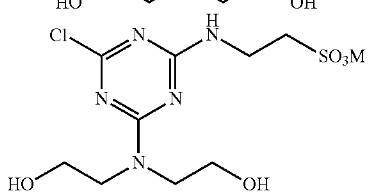

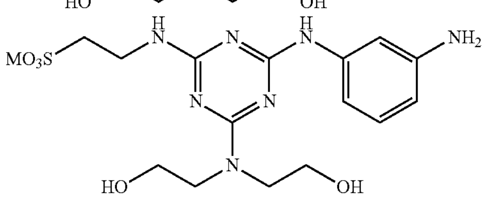

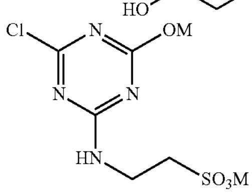

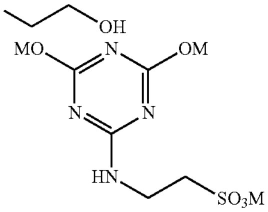

-continued

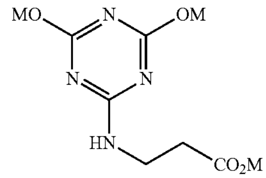

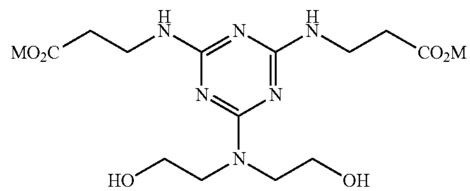

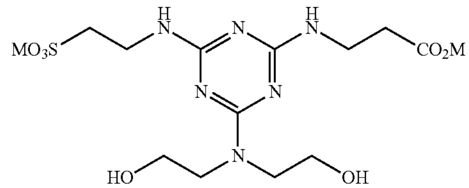

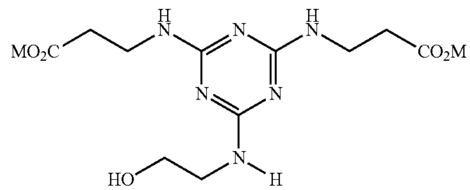

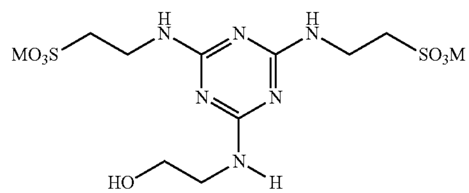

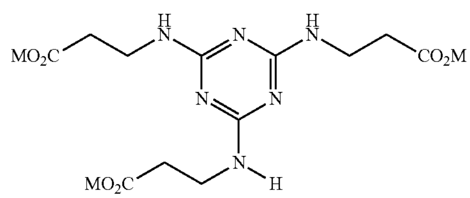

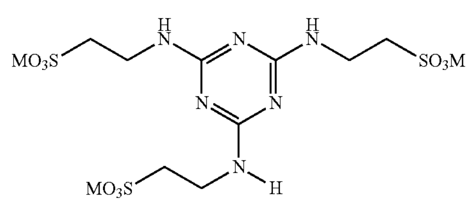

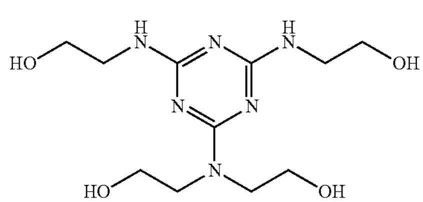

-continued

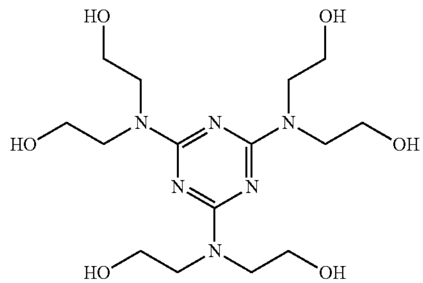

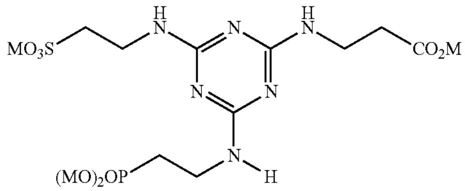

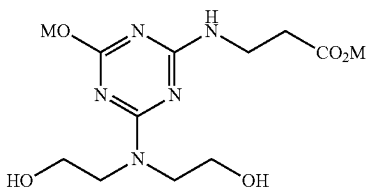

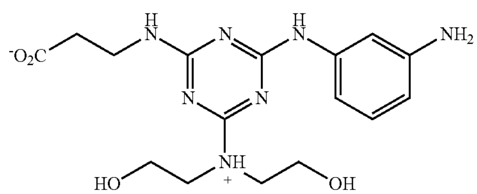

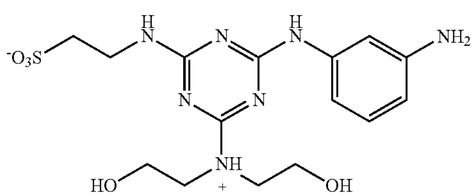

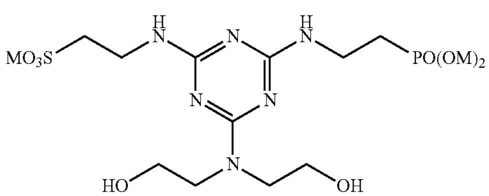

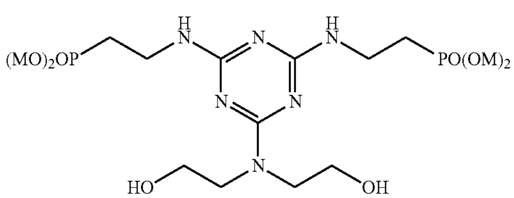

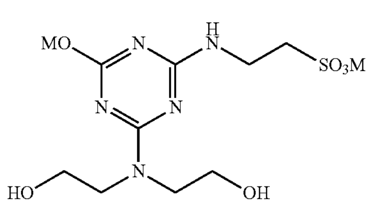

-continued

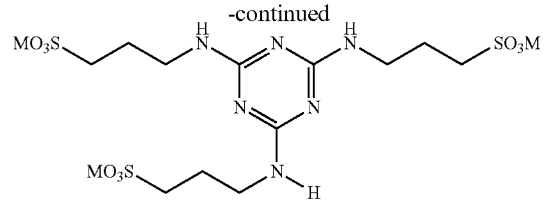

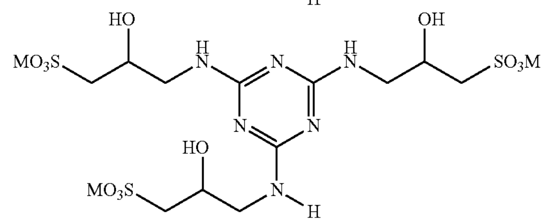

M in a compound of the compound group (a) represents a hydrogen atom or a counter cation. If a plurality of M are present in the compound, the plurality of M may be the same or different.

<3>

The aqueous additive solution for an ink composition according to <1> or <2>, wherein at least one of $R_{21}$ to $R_{29}$ in the general formula (II) has an ionic hydrophilic group.

<4>

The aqueous additive solution for an ink composition according to any one of <1> to <3>, wherein a content of the compound represented by the general formula (II) is 5.0% to 20.0% by mass based on a total mass of the aqueous additive solution for an ink composition.

<5>

The aqueous additive solution for an ink composition according to any one of <1> to <4>, wherein a content of the compound represented by the general formula (A) is 0.01% to 1.0% by mass based on a total mass of the aqueous additive solution for an ink composition.

<6>

The aqueous additive solution for an ink composition according to any one of <1> to <5>, further containing a chelating agent.

<7>

The aqueous additive solution for an ink composition according to <6>, wherein a content of the chelating agent is 0.001% to 1.0% by mass based on a total mass of the aqueous additive solution for an ink composition.

<8>

The aqueous additive solution for an ink composition according to any one of <1> to <7>, further containing a preservative.

<9>

The aqueous additive solution for an ink composition according to <8>, wherein a content of the preservative is 0.01% to 1.0% by mass based on a total mass of the aqueous additive solution for an ink composition.

<10>

The aqueous additive solution for an ink composition according to any one of <1> to <9>, further containing a buffering agent.

<11>

The aqueous additive solution for an ink composition according to any one of <1> to <10>, having a pH value of 6.5 to 9.0 at 25° C.

<12>

An aqueous colorant solution for an ink composition, the aqueous colorant solution containing a compound represented by the following general formula (A); a compound represented by the following general formula (II); water; and a colorant.

(A)

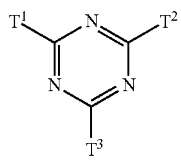

In general formula (A), $T^1$, $T^2$, and $T^3$ each independently represent *—NH—$(CH_2)_n$-Rt, *—NH—$(CH_2)_n$—OH, *—N—{$(CH_2)_n$—OH}$_2$, *—NH—$CH_2CH(OH)CH_2$-Rt, *-OM, a halogen atom, or a substituted or unsubstituted arylamino group. However, at least one of $T^1$, $T^2$, or $T^3$ represents *—NH—$(CH_2)_n$-Rt, *—NH—$(CH_2)_n$—OH, *—N—{$(CH_2)_n$—OH}$_2$, or *—NH—$CH_2CH(OH)CH_2$-Rt. * represents a bonding site to a triazine ring, n represents an integer of 1 to 5, and Rt represents $CO_2M$, $SO_3M$, or $PO(OM)_2$. M represents a hydrogen atom or a counter cation. If a plurality of n are present, the plurality of n may be the same or different. If a plurality of M are present, the plurality of M may be the same or different.

(II)

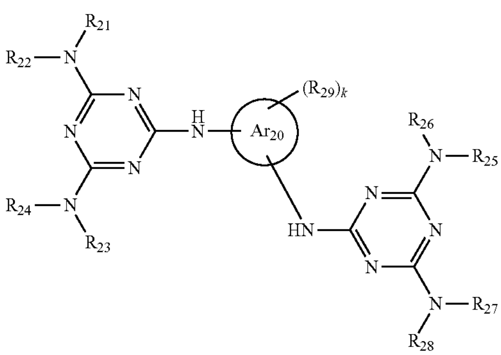

In general formula (II), $Ar_{20}$ represents a benzene ring or a naphthalene ring. $R_{21}$ to $R_{28}$ each independently represent a hydrogen atom or a substituent. $R_{21}$ and $R_{22}$ may be bonded to each other to form a ring. $R_{23}$ and $R_{24}$ may be bonded to each other to form a ring. $R_{25}$ and $R_{26}$ may be bonded to each other to form a ring. $R_{27}$ and $R_{28}$ may be bonded to each other to form a ring. $R_{29}$ represents a substituent. If $Ar_{20}$ represents a benzene ring, k represents an integer of 0 to 4. If $Ar_{20}$ represents a naphthalene ring, k represents an integer of 0 to 6. If a plurality of $R_{29}$ are present, the plurality of $R_{29}$ may be the same or different. If a plurality of $R_{29}$ are present, the plurality of $R_{29}$ may be bonded together to form a ring. However, the compound represented by general formula (II) has at least one hydrophilic group.

<13>

The aqueous colorant solution for an ink composition according to <12>, wherein the compound represented by the general formula (A) is at least one compound selected from the following compound group (a).

Compound group (a)

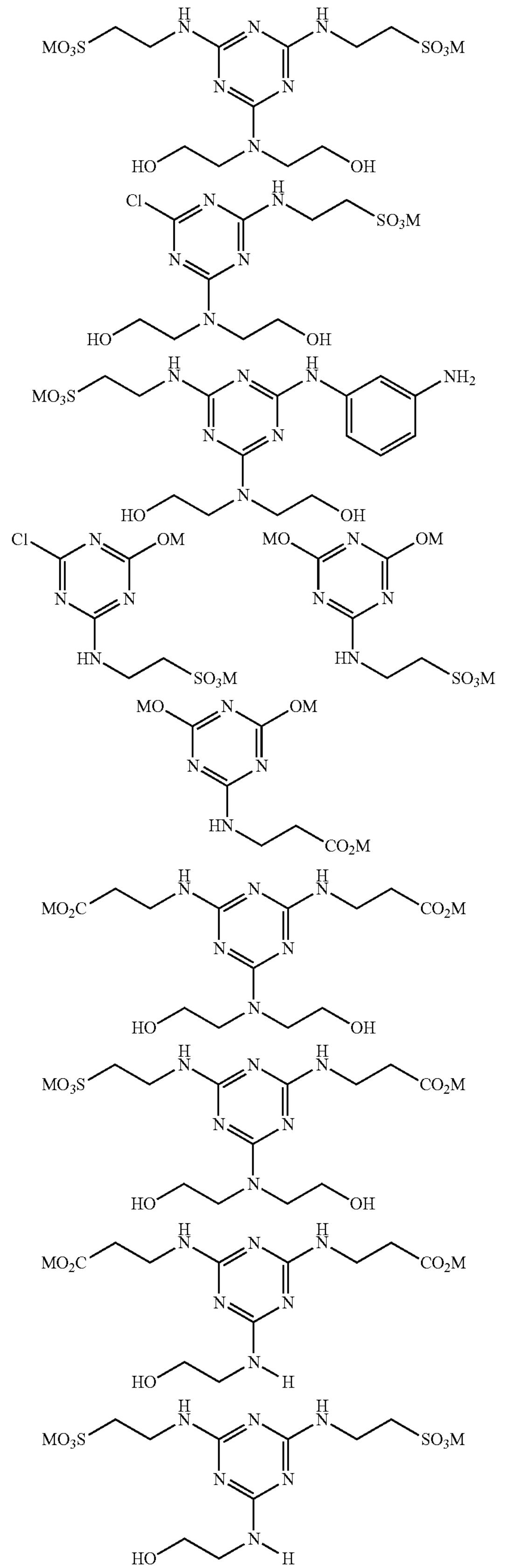

-continued

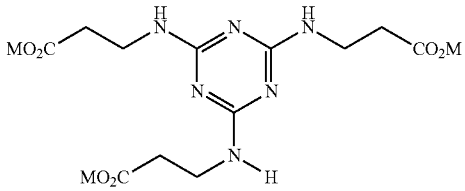

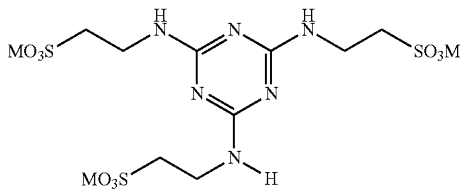

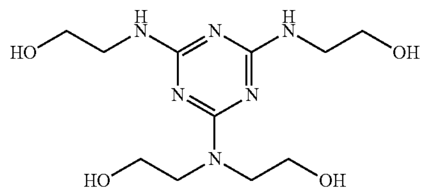

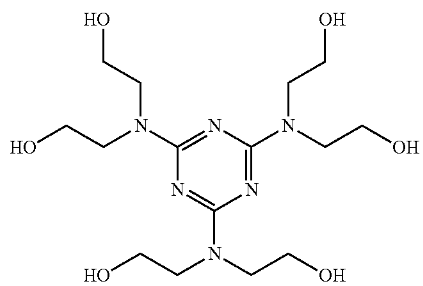

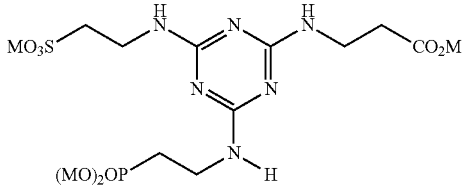

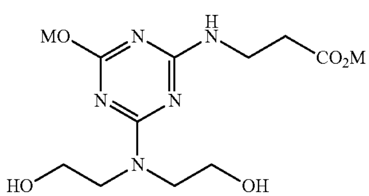

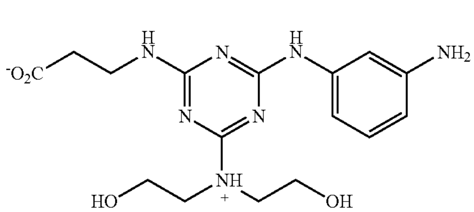

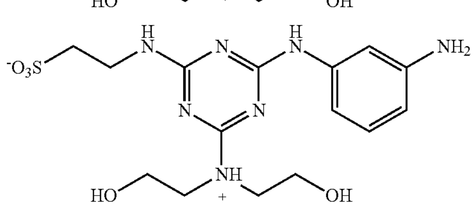

-continued

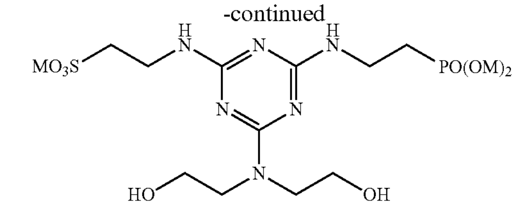

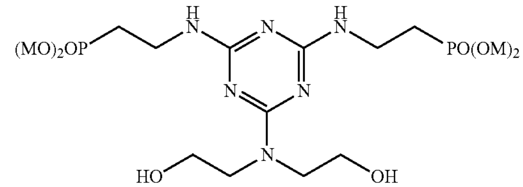

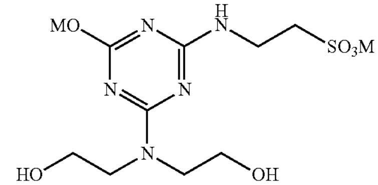

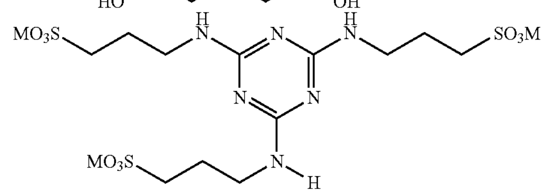

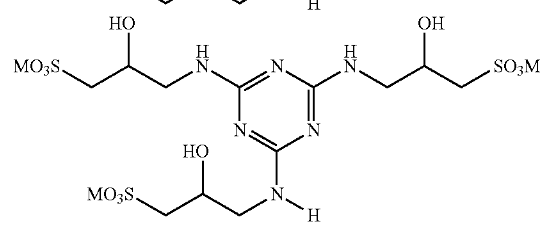

M in a compound of the compound group (a) represents a hydrogen atom or a counter cation. If a plurality of M are present in the compound, the plurality of M may be the same or different.

<14>

The aqueous colorant solution for an ink composition according to <12> or <13>, wherein a content of the colorant is 5.0% to 20.0% by mass based on a total mass of the aqueous colorant solution for an ink composition.

<15>

The aqueous colorant solution for an ink composition according to any one of <12> to <14>, wherein the colorant is a water-soluble dye.

<16>

The aqueous colorant solution for an ink composition according to any one of <12> to <15>, wherein a content of the compound represented by the general formula (II) is 0.5% to 8.0% by mass based on a total mass of the aqueous colorant solution for an ink composition.

<17>

The aqueous colorant solution for an ink composition according to any one of <12> to <16>, wherein a content of the compound represented by the general formula (A) is 0.001% to 0.3% by mass based on a total mass of the aqueous colorant solution for an ink composition.

<18>

The aqueous colorant solution for an ink composition according to any one of <12> to <17>, further containing a chelating agent.

<19>

The aqueous colorant solution for an ink composition according to <18>, wherein a content of the chelating agent is 0.001% to 1.0% by mass based on a total mass of the aqueous colorant solution for an ink composition.

<20>

The aqueous colorant solution for an ink composition according to any one of <12> to <19>, further containing a preservative.

<21>

The aqueous colorant solution for an ink composition according to <20>, wherein a content of the preservative is 0.01% to 1.0% by mass based on a total mass of the aqueous colorant solution for an ink composition.

<22>

The aqueous colorant solution for an ink composition according to any one of <12> to <21>, further containing a buffering agent.

<23>

The aqueous colorant solution for an ink composition according to any one of <12> to <22>, having a pH value of 6.5 to 9.0 at 25° C.

<24>

An ink composition containing a compound represented by the following general formula (A); a compound represented by the following general formula (II); water; and a colorant.

(A)

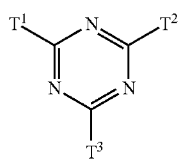

In general formula (A), $T^1$, $T^2$, and $T^3$ each independently represent $*\text{—NH—}(CH_2)_n\text{-Rt}$, $*\text{—NH—}(CH_2)_n\text{—OH}$, $*\text{—N—}\{(CH_2)_n\text{—OH}\}_2$, $*\text{—NH—}CH_2CH(OH)CH_2\text{-Rt}$, *-OM, a halogen atom, or a substituted or unsubstituted arylamino group. However, at least one of $T^1$, $T^2$, or $T^3$ represents $*\text{—NH—}(CH_2)_n\text{-Rt}$, $*\text{—NH—}(CH_2)_n\text{—OH}$, $*\text{—N—}\{(CH_2)_n\text{—OH}\}_2$, or $*\text{—NH—}CH_2CH(OH)CH_2\text{-Rt}$. * represents a bonding site to a triazine ring, n represents an integer of 1 to 5, and Rt represents $CO_2M$, $SO_3M$, or $PO(OM)_2$. M represents a hydrogen atom or a counter cation. If a plurality of n are present, the plurality of n may be the same or different. If a plurality of M are present, the plurality of M may be the same or different.

(II)

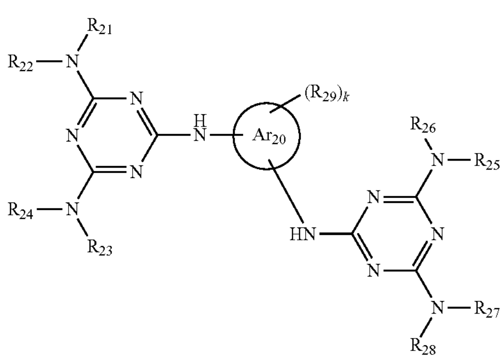

In general formula (II), $Ar_{20}$ represents a benzene ring or a naphthalene ring. $R_{21}$ to $R_{28}$ each independently represent a hydrogen atom or a substituent. $R_{21}$ and $R_{22}$ may be bonded to each other to form a ring. $R_{23}$ and $R_{24}$ may be bonded to each other to form a ring. $R_{25}$ and $R_{26}$ may be bonded to each other to form a ring. $R_{27}$ and $R_{28}$ may be bonded to each other to form a ring. $R_{29}$ represents a substituent. If $Ar_{20}$ represents a benzene ring, k represents an integer of 0 to 4. If $Ar_{20}$ represents a naphthalene ring, k represents an integer of 0 to 6. If a plurality of $R_{29}$ are present, the plurality of $R_{29}$ may be the same or different. If a plurality of $R_{29}$ are present, the plurality of $R_{29}$ may be bonded together to form a ring. However, the compound represented by general formula (II) has at least one hydrophilic group.

<25>

The ink composition according to <24>, wherein the compound represented by the general formula (A) is at least one compound selected from the following compound group (a).

Compound group (a)

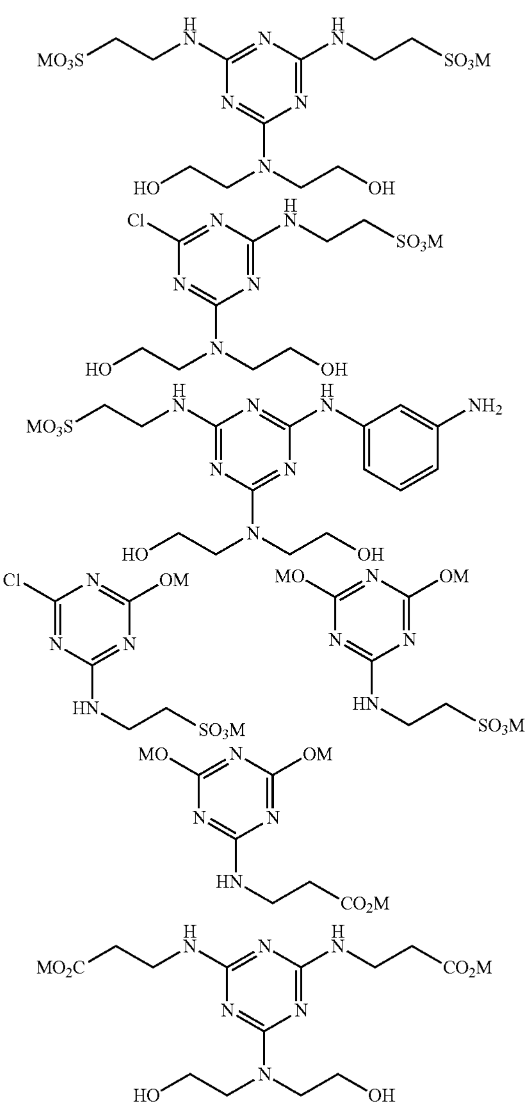

-continued
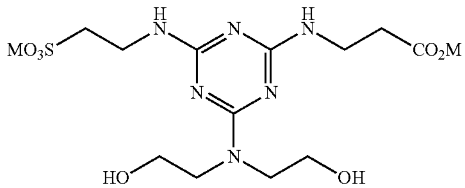
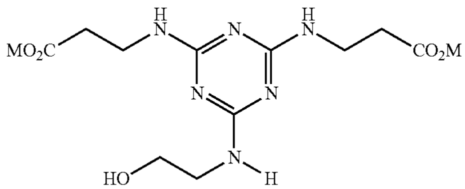
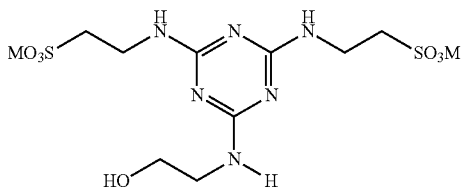
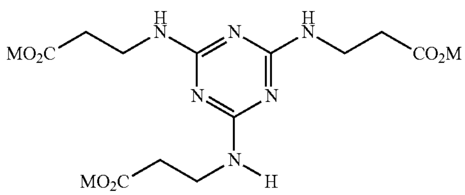
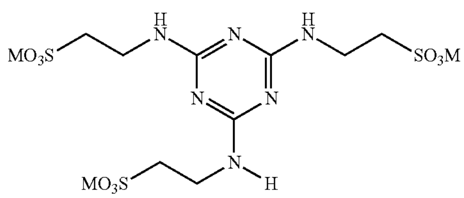
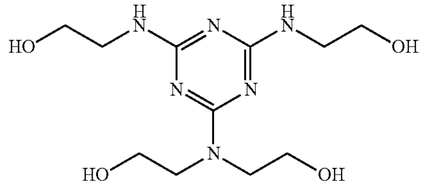
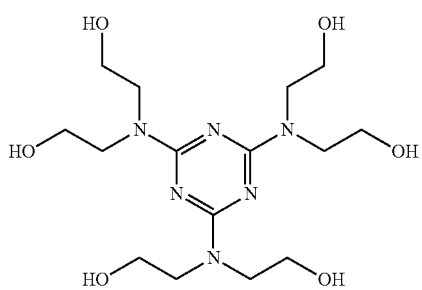
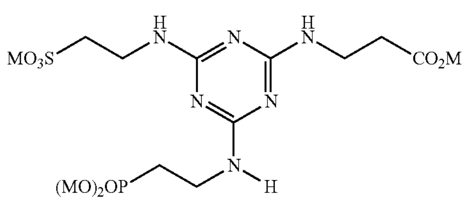
-continued
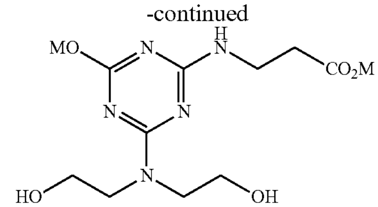
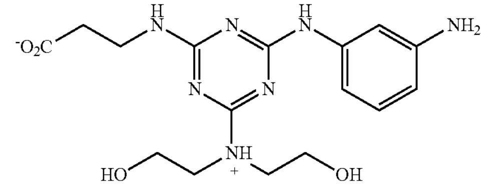
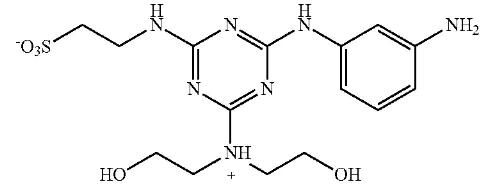
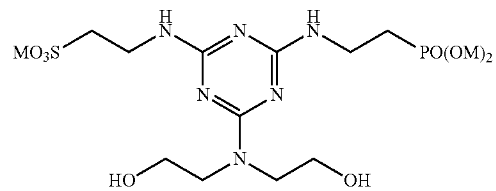
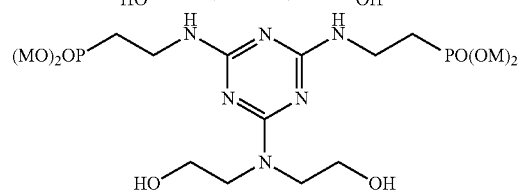
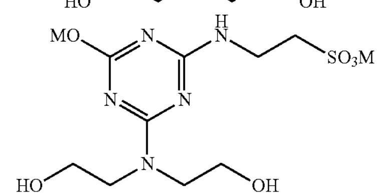
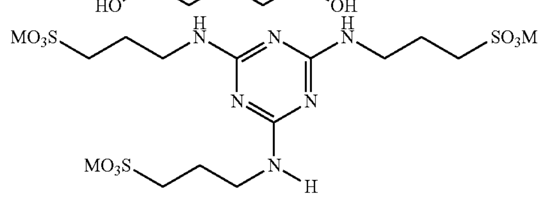
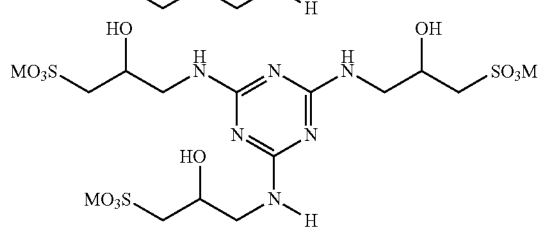
M in a compound of the compound group (a) represents a hydrogen atom or a counter cation. If a plurality of M are present in the compound, the plurality of M may be the same or different.
<26>
The ink composition according to <24> or <25>, wherein a content of the colorant is 0.1% to 10.0% by mass based on a total mass of the ink composition.

<27>

The ink composition according to any one of <24> to <26>, further containing a chelating agent.

<28>

The ink composition according to <27>, wherein a content of the chelating agent is 0.001% to 1.0% by mass based on a total mass of the ink composition.

<29>

The ink composition according to any one of <24> to <28>, further containing a preservative.

<30>

The ink composition according to <29>, wherein a content of the preservative is 0.001% to 0.5% by mass based on a total mass of the ink composition.

<31>

The ink composition according to any one of <24> to <30>, further containing a buffering agent.

<32>

The ink composition according to any one of <24> to <31>, having a pH value of 6.5 to 9.0 at 25° C.

<33>

An ink composition for ink jet recording, the ink composition including the ink composition according to any one of <24> to <32>.

<34>

An ink jet recording method having ejecting the ink composition for ink jet recording according to <33> with a recording head for an ink jet process.

According to the present invention, it is possible to provide an aqueous additive solution for an ink composition, an aqueous colorant solution for an ink composition, and an ink composition which are excellent in storage stability (have excellent antiseptic properties, and produce less precipitation of insoluble matter, are less likely to undergo changes in the absorbance, viscosity, and surface tension, and less likely to undergo a change in the pH value when stored for a long period of time), an ink composition for ink jet recording, the ink composition including the above ink composition, and an ink jet recording method using the above ink composition for ink jet recording.

DESCRIPTION OF THE PREFERRED EMBODIMENTS

Hereinafter, the present invention will be described in more detail with reference to preferred embodiments.

Aqueous Additive Solution for Ink Composition

An aqueous additive solution for an ink composition (also simply referred to as an "aqueous additive solution") according to the present invention contains a compound represented by the following general formula (A), a compound represented by the following general formula (II), and water.

(A)

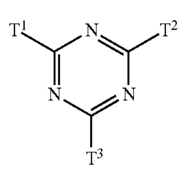

In general formula (A), $T^1$, $T^2$, and $T^3$ each independently represent *—NH—$(CH_2)_n$-Rt, *—NH—$(CH_2)_n$—OH, *—N—$\{(CH_2)_n—OH\}_2$, *—NH—$CH_2CH(OH)CH_2$-Rt, *-OM, a halogen atom, or a substituted or unsubstituted arylamino group. However, at least one of $T^1$, $T^2$, or $T^3$ represents *—NH—$(CH_2)_n$-Rt, *—NH—$(CH_2)_n$—OH, *—N—$\{(CH_2)_n—OH\}_2$, or *—NH—$CH_2CH(OH)CH_2$-Rt. * represents a bonding site to a triazine ring, n represents an integer of 1 to 5, and Rt represents $CO_2M$, $SO_3M$, or $PO(OM)_2$. M represents a hydrogen atom or a counter cation. If a plurality of n are present, the plurality of n may be the same or different. If a plurality of M are present, the plurality of M may be the same or different.

(II)

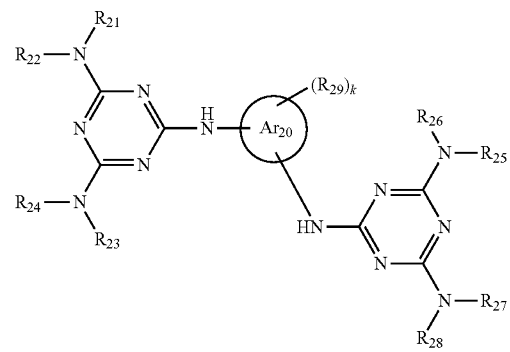

In general formula (II), $Ar_{20}$ represents a benzene ring or a naphthalene ring. $R_{21}$ to $R_{28}$ each independently represent a hydrogen atom or a substituent. $R_{21}$ and $R_{22}$ may be bonded to each other to form a ring. $R_{23}$ and $R_{24}$ may be bonded to each other to form a ring. $R_{25}$ and $R_{26}$ may be bonded to each other to form a ring. $R_{27}$ and $R_{28}$ may be bonded to each other to form a ring. $R_{29}$ represents a substituent. If $Ar_{20}$ represents a benzene ring, k represents an integer of 0 to 4. If $Ar_{20}$ represents a naphthalene ring, k represents an integer of 0 to 6. If a plurality of $R_{29}$ are present, the plurality of $R_{29}$ may be the same or different. If a plurality of $R_{29}$ are present, the plurality of $R_{29}$ may be bonded together to form a ring. However, the compound represented by general formula (II) has at least one hydrophilic group.

The compound represented by the general formula (A) and the compound represented by the general formula (II) can be used as additives in an ink composition.

The aqueous additive solution according to the present invention can be used for the preparation of an ink composition and is particularly preferably used for the preparation of an ink composition for ink jet recording.

The aqueous additive solution according to the present invention and the ink composition prepared using the aqueous additive solution according to the present invention have excellent storage stability. Although the detailed mechanism is not completely clear, when the compound represented by the general formula (A) and the compound represented by the general formula (II) are used in combination as additives, presumably, a strong intermolecular interaction is formed, the compatibility is enhanced, water solubility and dissolution stability are improved, and therefore, the storage stability is improved.

Compound Represented by General Formula (A)

The compound represented by general formula (A) will be described. The compound represented by general formula (A) is also referred to as a "compound (A)".

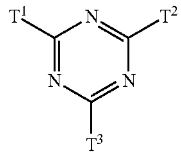

(A)

In general formula (A), $T^1$, $T^2$, and $T^3$ each independently represent *—NH—$(CH_2)_n$-Rt, *—NH—$(CH_2)_n$—OH, *—N—{$(CH_2)_n$—OH}$_2$, *—NH—$CH_2CH(OH)CH_2$-Rt, *-OM, a halogen atom, or a substituted or unsubstituted arylamino group. However, at least one of $T^1$, $T^2$, or $T^3$ represents *—NH—$(CH_2)_n$-Rt, *—NH—$(CH_2)_n$—OH, *—N—{$(CH_2)_n$—OH}$_2$, or *—NH—$CH_2CH(OH)CH_2$-Rt. * represents a bonding site to a triazine ring, n represents an integer of 1 to 5, and Rt represents $CO_2M$, $SO_3M$, or $PO(OM)_2$. M represents a hydrogen atom or a counter cation. If a plurality of n are present, the plurality of n may be the same or different. If a plurality of M are present, the plurality of M may be the same or different.

In general formula (A), $T^1$, $T^2$, and $T^3$ each independently represent *—NH—$(CH_2)_n$-Rt, *—NH—$(CH_2)_n$—OH, *—N—{$(CH_2)_n$—OH}$_2$, *—NH—$CH_2CH(OH)CH_2$-Rt, *-OM, a halogen atom, or a substituted or unsubstituted arylamino group. The halogen atom is preferably a chlorine atom. The arylamino group is preferably an arylamino group having 6 to 20 carbon atoms, more preferably an arylamino group having 6 to 10 carbon atoms, and still more preferably a phenylamino group. The arylamino group may have a substituent, and the substituent is not particularly limited but is preferably an amino group.

However, at least one of $T^1$, $T^2$, or $T^3$ represents *—NH—$(CH_2)_n$-Rt, *—NH—$(CH_2)_n$—OH, *—N—{$(CH_2)_n$—OH)}$_2$, or *—NH—$CH_2CH(OH)CH_2$-Rt. One of $T^1$, $T^2$, and $T^3$ may represent *—NH—$(CH_2)_n$-Rt, *—NH—$(CH_2)_n$—OH, *—N—{$(CH_2)_n$—OH)}$_2$, or *—NH—$CH_2CH(OH)CH_2$-Rt. Two of $T^1$, $T^2$, and $T^3$ may represent *—NH—$(CH_2)_n$-Rt, *—NH—$(CH_2)_n$—OH, *—N—{$(CH_2)_n$—OH)}$_2$, or *—NH—$CH_2CH(OH)CH_2$-Rt. All of $T^1$, $T^2$, and $T^3$ may represent —NH—$(CH_2)_n$-Rt, NH—$(CH_2)_n$—OH, *—N—($(CH_2)_n$—OH)$_2$, or *—NH—$CH_2CH(OH)CH_2$-Rt.

n represents an integer of 1 to 5, and more preferably represents an integer of 2 to 4, still more preferably represents 2 or 3, and most preferably represents 2, from the viewpoints of inexpensive availability of raw materials of the compound represented by general formula (A), water solubility, and storage stability in the ink composition for ink jet recording.

M represents a hydrogen atom or a counter cation. A single type of M may be present, or a plurality of types of M may be present. If a plurality of M are present in one compound (A), the plurality of M may be the same or different.

The compound (A) can also be in the form of an inner salt.

M represents a hydrogen atom or a counter cation.

Examples of the counter cation include, but are not particularly limited to, alkali metal ions, an ammonium ion, and organic cations (such as tetramethylammonium, guanidinium, and pyridinium).

M is preferably a hydrogen atom, an alkali metal ion, or an ammonium ion, more preferably an alkali metal ion or an ammonium ion, still more preferably a lithium ion, a sodium ion, or a potassium ion, particularly preferably a lithium ion or a sodium ion, and most preferably a lithium ion.

When M represents a particular cation (e.g., a lithium ion), all M need not necessarily be lithium ions, but substantially, the counter cation having the highest presence ratio is preferably a lithium ion. Under the condition of such a presence ratio, a hydrogen atom, an alkali metal ion (for example, a sodium ion or a potassium ion), an ammonium ion, or the like can be included as M. The amount of lithium ions is preferably 50% or more, more preferably 60% or more, still more preferably 80% or more, and particularly preferably 90% or more relative to the whole of M, and the upper limit thereof is preferably 100%.

The case of a lithium ion also applies to a case where the particular cation represents a cation (e.g., a sodium ion) other than a lithium ion.

The compound (A) is preferably a compound having an ionic hydrophilic group, which enhances water solubility, for the purpose of being used in the form of an aqueous solution. Examples of the ionic hydrophilic group include a sulfo group (—$SO_3M$), a carboxy group (—$CO_2M$), a phosphate group (—$PO(OM)_2$), and a hydroxy group (—OM). As the ionic hydrophilic group, a sulfo group (—$SO_3M$), a carboxy group (—$CO_2M$), and a hydroxy group (—OM) are preferred, a sulfo group (—$SO_3M$) and a hydroxy group (—OM) are more preferred, and a sulfo group (—$SO_3M$) is most preferred. M is as described above. In particular, lithium salts of sulfo groups (—$SO_3Li$) are preferred because they enhance water solubility of the compound and improve solution stability.

As described above, the ionic hydrophilic group may be in the form of a free acid, in the form of a salt, or in the form of a mixture of a free acid and a salt.

In the present invention, when a compound is a salt, the salt is present in an aqueous solution in the form of being dissolved in a state where the salt is completely dissociated into ions. When a compound has an ionic hydrophilic group having a high acid dissociation constant (pKa), the compound may be present in the form of being dissolved in water in a state where most of the compound is dissociated and a part thereof is in a salt (an undissociated) state.

The compound represented by general formula (A) is preferably at least one compound selected from the following compound group (a).

The charge positions of a cation and an anion when the compound (A) is in the form of an inner salt are exemplified by a localized chemical structural formula. However, all possible canonical chemical structures within the common knowledge of organic chemistry can be included.

Compound group (a)

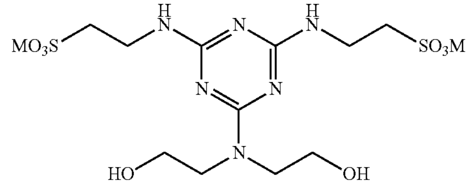

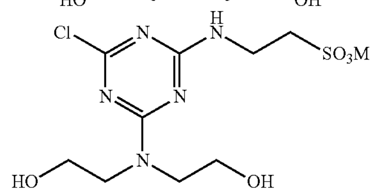

-continued
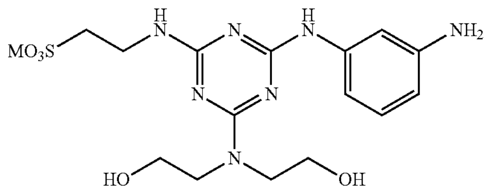
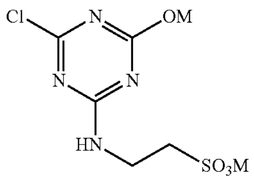
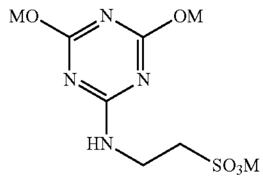
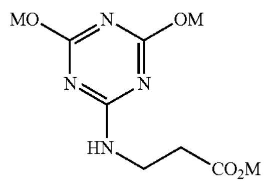
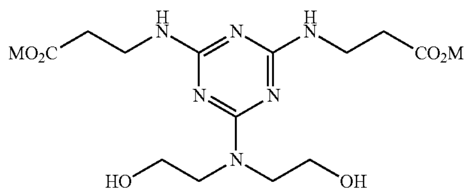
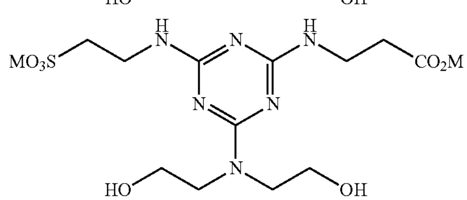
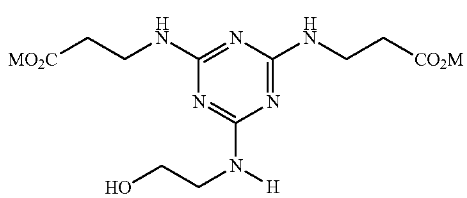
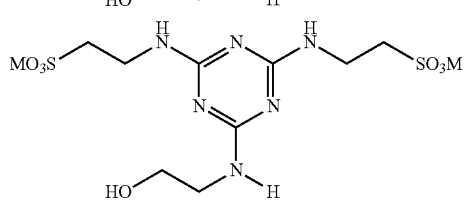
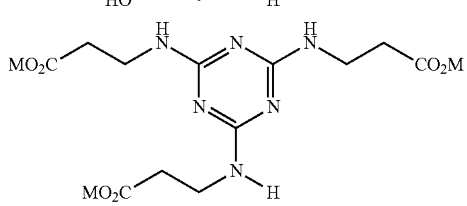
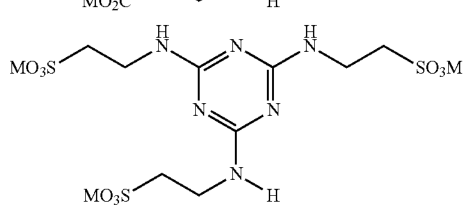
-continued
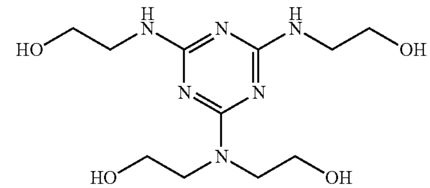
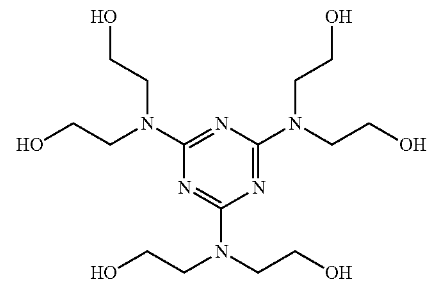
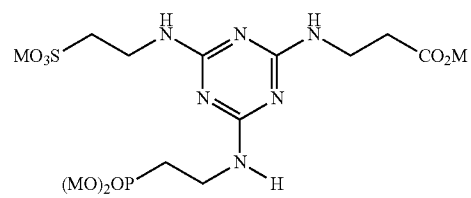
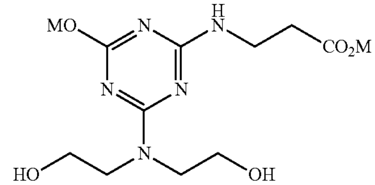
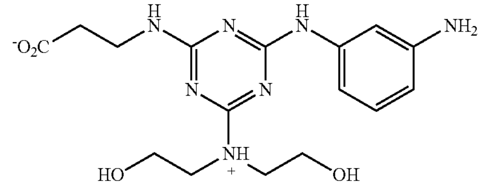
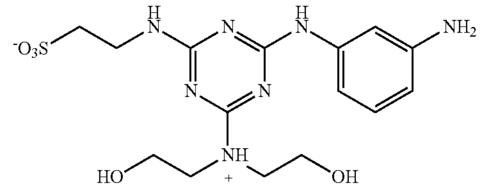
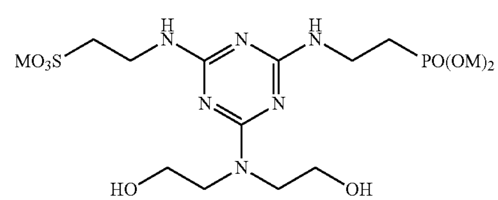
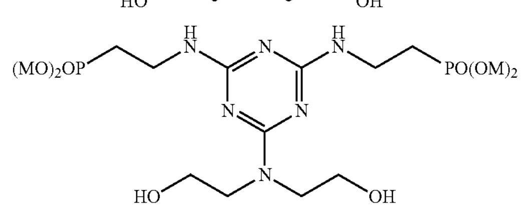

-continued
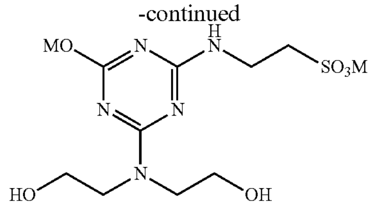
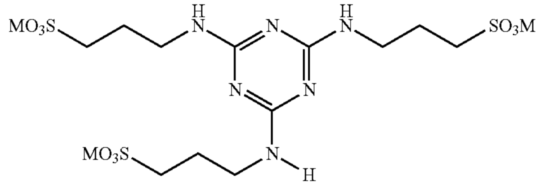
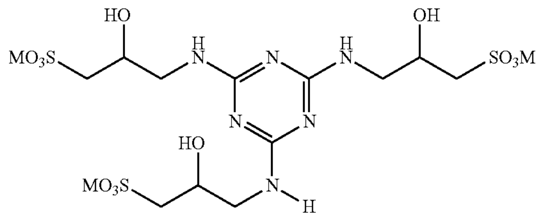
M in a compound of the compound group (a) represents a hydrogen atom or a counter cation. If a plurality of M are present in the compound, the plurality of M may be the same or different.
M is as described above.
Preferred specific examples of the compound (A) include, but are not limited to, the following.
(a)-1
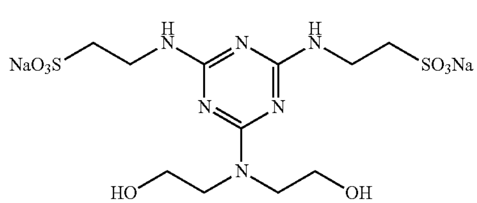
(a)-2
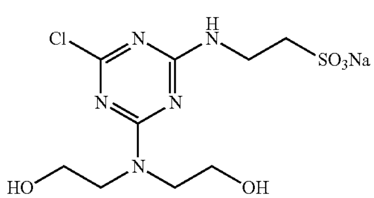
(a)-3
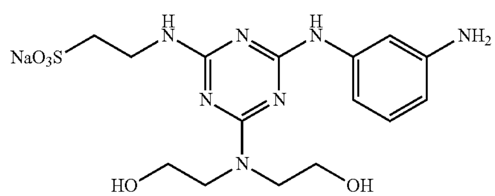
(a)-4
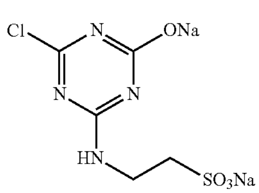
-continued
(a)-5
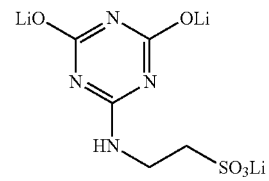
(a)-6
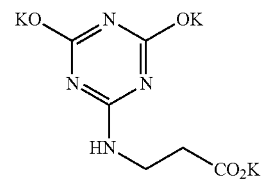
(a)-7
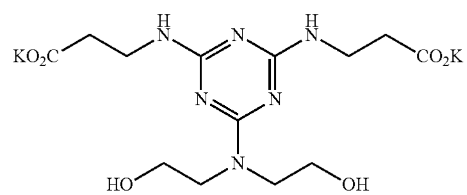
(a)-8
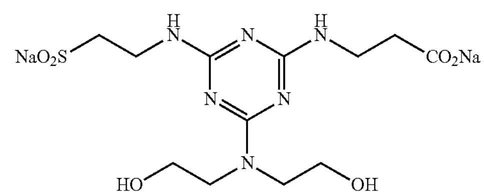
(a)-9
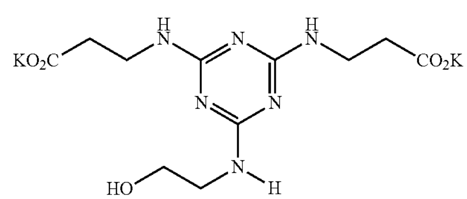
(a)-10
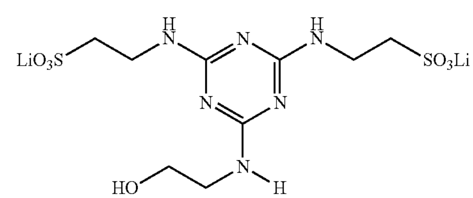
(a)-11
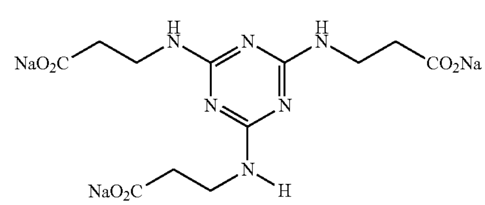
(a)-12
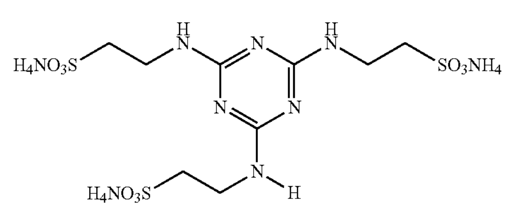

-continued (a)-13

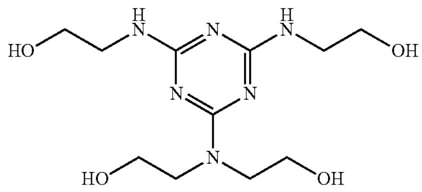

(a)-14

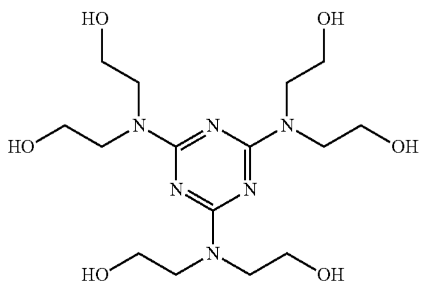

(a)-15

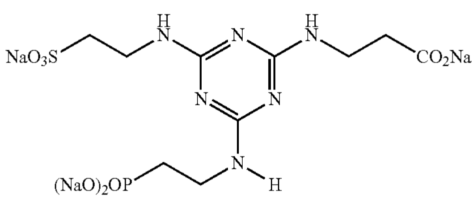

(a)-16

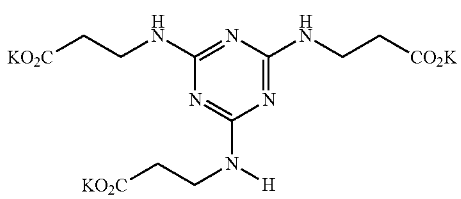

(a)-17

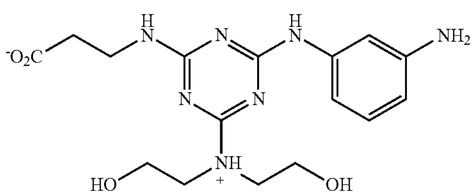

(a)-18

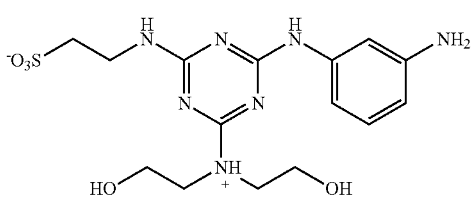

(a)-19

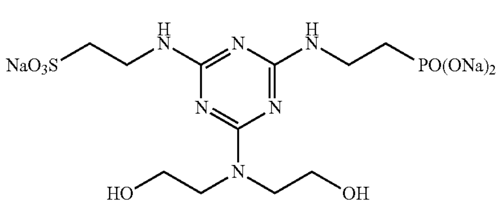

-continued (a)-20

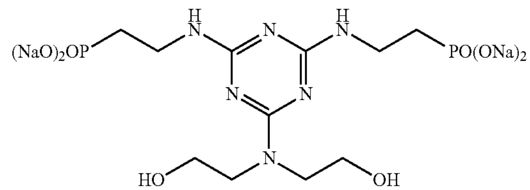

(a)-21

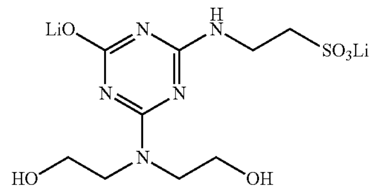

(a)-22

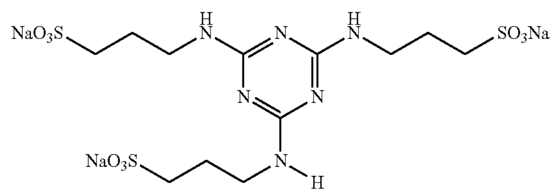

(a)-23

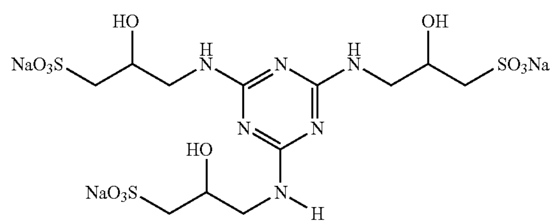

The compound (A) can be easily synthesized, isolated, and purified by using publicly known methods (for example, methods described in JP4686151B, etc.) alone or in combination of two or more, and further applying a reverse osmosis membrane purification method, a gel filtration chromatography purification method, and a preparative high-performance liquid chromatography purification method, as needed.

Specific examples of a typical synthesis scheme of the compound (A) are shown below, but the synthesis scheme is not limited to these.

A compound having an s-triazine ring can be easily synthesized using cyanuric chloride as a raw material by a single publicly known method or by combining a plurality of publicly known methods. Three types of substituents on the s-triazine ring can be introduced with good selectivity according to the reactivity of three chlorine atoms of cyanuric chloride and the types of substituents to be introduced by a publicly known method (for example, according to the pH value of the system during reaction, the nucleophilicity of the substituents to be introduced, and the order of introduction of the substituents).

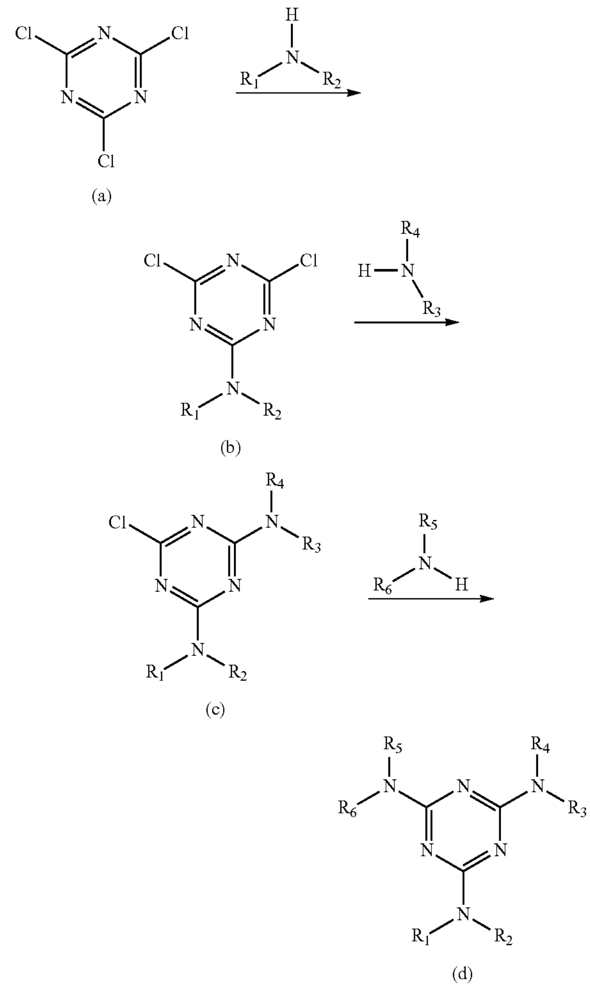

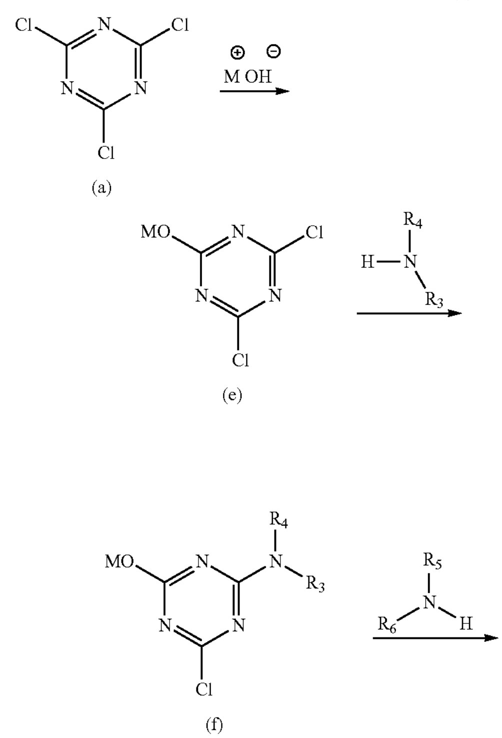

-continued

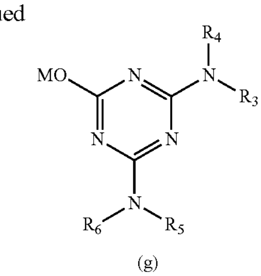

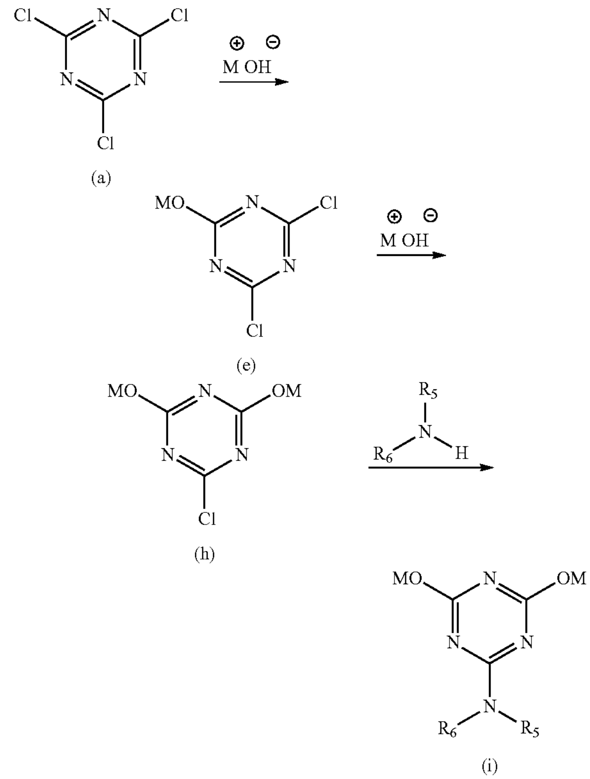

$R_1$, $R_2$, $R_3$, $R_4$, $R_5$, and $R_6$ above each independently represent a hydrogen atom or a corresponding substituent in the compound (A). M represents the same meaning as that in the compound (A).

The above compound (a)-2 corresponds to a compound represented by (c) above and can be synthesized according to the above synthesis scheme.

The above compounds (a)-1, (a)-3, (a)-7 to (a)-20, (a)-22, and (a)-23 correspond to compounds represented by (d) above and can be synthesized according to the above synthesis scheme.

The above compound (a)-4 corresponds to a compound represented by (f) above and can be synthesized according to the above synthesis scheme.

The above compound (a)-21 corresponds to a compound represented by (g) above and can be synthesized according to the above synthesis scheme.

The above compounds (a)-5 and (a)-6 correspond to compounds represented by (i) above and can be synthesized according to the above synthesis scheme.

The content of the compound (A) (the total amount of the compounds (A) if two or more compounds (A) are contained) in the aqueous additive solution according to the present invention is preferably 0.01% to 1.0% by mass, more preferably 0.05% to 1.0% by mass, and particularly preferably 0.1% to 1.0% by mass, based on the total mass of the aqueous additive solution.

When the content of the compound (A) in the aqueous additive solution is 0.01% by mass or more, the intermolecular interaction with the compound represented by general formula (II) in the aqueous additive solution is strengthened (compatibility is enhanced), and the effect of the long-term dissolution stability of the aqueous solution containing the compound represented by general formula (II) is more likely to be exhibited. On the other hand, when the content of the compound (A) in the aqueous additive solution is 1.0% by mass or less, the concentration of solid contents in the aqueous additive solution does not increase, and, during the storage of the aqueous additive solution, the range of variation in liquid physical properties over time is small, thus improving the continuous ejection stability (reliability) of an ink composition for ink jet recording, the ink composition being prepared using the aqueous additive solution.

Compound Represented by General Formula (II)

The compound represented by general formula (II) (also referred to as a "compound (II)") included in the aqueous additive solution according to the present invention will be described.

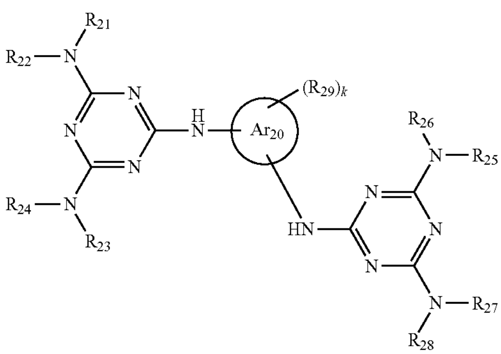

(II)

In general formula (II), $Ar_{20}$ represents a benzene ring or a naphthalene ring. $R_{21}$ to $R_{28}$ each independently represent a hydrogen atom or a substituent. $R_{21}$ and $R_{22}$ may be bonded to each other to form a ring. $R_{23}$ and $R_{24}$ may be bonded to each other to form a ring. $R_{25}$ and $R_{26}$ may be bonded to each other to form a ring. $R_{27}$ and $R_{28}$ may be bonded to each other to form a ring. $R_{29}$ represents a substituent. If $Ar_{20}$ represents a benzene ring, k represents an integer of 0 to 4. If $Ar_{20}$ represents a naphthalene ring, k represents an integer of 0 to 6. If a plurality of $R_{29}$ are present, the plurality of $R_{29}$ may be the same or different. If a plurality of $R_{29}$ are present, the plurality of $R_{29}$ may be bonded together to form a ring. However, the compound represented by general formula (II) has at least one hydrophilic group.

The compound represented by general formula (II) is preferably a colorless, water-soluble planar compound having more than 10 delocalized π electrons in one molecule.

When the number of π electrons constituting the delocalized π-electron system increases and the π-electron system extends, compounds often have an absorption in the visible range. In the present invention, "colorless" also includes a state of being very slightly colored as long as an image is not affected. The water-soluble compound represented by general formula (II) may be a fluorescent compound, but is preferably a non-fluorescent compound, more preferably a compound having an absorption peak wavelength (λmax) of 350 nm or less, still more preferably 320 nm or less on the longest wavelength side and having a molar absorption coefficient of 10,000 or less.

The upper limit of the number of delocalized π electrons in one molecule of the compound represented by general formula (II) is not particularly limited, but is preferably 80 or less, more preferably 50 or less, and particularly preferably 30 or less. More than 10 π electrons may form a single large delocalized system or may form two or more delocalized systems.

The compound represented by general formula (II) is preferably water-soluble and is preferably a compound that dissolves in an amount of at least 1 g or more in 100 g of water at 20° C. The compound represented by general formula (II) is more preferably a compound that dissolves in an amount of 5 g or more, and most preferably a compound that dissolves in an amount of 10 g or more.

The compound represented by general formula (II) has at least one hydrophilic group in one molecule. The compound represented by general formula (II) preferably has at least two hydrophilic groups in one molecule.

Examples of the hydrophilic group include, but are not limited to, a sulfo group ($—SO_3M$), a carboxy group ($—CO_2M$), a hydroxy group (—OM), a phosphate group ($—PO(OM)_2$), a carbonamide group, a sulfonamide group, and a quaternary ammonium group. The hydrophilic group is preferably an ionic hydrophilic group, more preferably a sulfo group ($—SO_3M$) and a carboxy group ($—CO_2M$), and most preferably a sulfo group ($—SO_3M$).

M represents a hydrogen atom or a counter cation. Examples of the counter cation include, but are not particularly limited to, alkali metal ions, an ammonium ion, and organic cations (such as tetramethylammonium, guanidinium, and pyridinium).

M is preferably a hydrogen atom, an ammonium ion, or an alkali metal ion, more preferably an alkali metal ion, still more preferably a lithium ion, a sodium ion, or a potassium ion, and particularly preferably a lithium ion or a sodium ion. The counter cation may be a single salt or a mixed salt.

The compound represented by general formula (II) preferably has one to ten hydrophilic groups and more preferably has two to eight hydrophilic groups in one molecule.

The compound represented by general formula (II) preferably has two to six ionic hydrophilic groups and more preferably has two to four ionic hydrophilic groups in one molecule.

At least any one of $R_{21}$ to $R_{29}$ in general formula (II) preferably has an ionic hydrophilic group and more preferably has $—SO_3M$. Still more preferably, two to six of $R_{21}$ to $R_{29}$ have $—SO_3M$, and particularly preferably, two to four of $R_{21}$ to $R_{29}$ have $—SO_3M$.

In general formula (II), $R_{21}$ to $R_{28}$ each independently represent a hydrogen atom or a substituent, and examples of the substituent include alkyl groups, aryl groups, aralkyl groups, heterocyclic groups, alkoxy groups, aryloxy groups, amino groups (including an anilino group and heterocyclic amino groups), acyl groups, acylamino groups, a ureido group, halogen atoms, a sulfamoyl group, a carbamoyl group, a sulfonamide group, a sulfonyl group, a sulfenyl group, a sulfinyl group, and the aforementioned hydrophilic groups. When these substituents can further have at least one substituent, groups having, as the additional substituent, a substituent selected from the group consisting of the aforementioned substituents are also included in examples of the substituent.

$R_{21}$ to $R_{28}$ preferably each independently represent a hydrogen atom or an alkyl group. The alkyl group is preferably an alkyl group having 1 to 12 carbon atoms, more preferably an alkyl group having 1 to 8 carbon atoms, and most preferably an alkyl group having 1 to 6 carbon atoms. The alkyl group preferably has the aforementioned hydrophilic group as a substituent from the viewpoint of storage stability.

$R_{21}$ and $R_{22}$, $R_{23}$ and $R_{24}$, $R_{25}$ and $R_{26}$, and $R_{27}$ and $R_{28}$ may each be bonded to each other to form a ring. The ring is not particularly limited, may be an aromatic ring or a non-aromatic ring, and is preferably a five-membered ring or a six-membered ring. The ring may include a heteroatom (such as an oxygen atom, a nitrogen atom, or a sulfur atom) besides the nitrogen atoms to which $R_{21}$ to $R_{28}$ are bonded.

$R_{29}$ represents a substituent. Examples of the substituent include alkyl groups, aryl groups, aralkyl groups, heterocyclic groups, alkoxy groups, aryloxy groups, amino groups (including an anilino group and heterocyclic amino groups), acyl groups, acylamino groups, a ureido group, halogen atoms, a sulfamoyl group, a carbamoyl group, a sulfonamide group, a sulfonyl group, a sulfenyl group, a sulfinyl group, and the aforementioned hydrophilic groups. When these substituents can further have at least one substituent, groups having, as the additional substituent, a substituent selected from the group consisting of the aforementioned substituents are also included in examples of the substituent.

If a plurality of $R_{29}$ are present, the plurality of $R_{29}$ may be the same or different. If a plurality of $R_{29}$ are present, the plurality of $R_{29}$ may be bonded together to form a ring. The ring is not particularly limited, may be an aromatic ring or a non-aromatic ring, and is preferably a five-membered ring or a six-membered ring. The ring may include a heteroatom (such as an oxygen atom, a nitrogen atom, or a sulfur atom).

In general formula (II), $Ar_{20}$ represents a benzene ring or a naphthalene ring and preferably represents a benzene ring.

If $Ar_{20}$ represents a benzene ring, k represents an integer of 0 to 4 and is preferably an integer of 0 to 2, and more preferably 0 or 1.

If $Ar_{20}$ represents a naphthalene ring, k represents an integer of 0 to 6 and is preferably an integer of 0 to 4, more preferably an integer of 0 to 2, and still more preferably 0 or 1.

The content of the compound (II) (the total amount of the compounds (II) if two or more compounds (II) are contained) in the aqueous additive solution according to the present invention is preferably 5.0% to 20.0% by mass, more preferably 10.0% to 20.0% by mass, and most preferably 12.0% to 18.0% by mass, based on the total mass of the aqueous additive solution.

Although the detailed mechanism of action remains speculative, when the content of the compound (II) in the aqueous additive solution is 5.0% by mass or more, presumably, the intermolecular interaction between the compound (A) and the compound (II) in the aqueous additive solution is strengthened, and, as a result, the compatibility is enhanced and the interaction is in an optimum range, and the effect of the long-term dissolution stability of the aqueous additive solution containing the compound (II) is more likely to be exhibited.

On the other hand, when the content of the compound (II) in the aqueous additive solution is 20.0% by mass or less, presumably, the concentration of solid contents in the aqueous additive solution does not increase, and, during the storage of the aqueous additive solution, the range of variation in liquid physical properties over time is very small, thus improving the continuous ejection stability (reliability) of an ink composition for ink jet recording, the ink composition being prepared using the aqueous additive solution.

The compound (II) can be easily synthesized, isolated, and purified by using publicly known methods (for example, methods described in JP4686151B, etc.) alone or in combination of two or more, and further applying a reverse osmosis membrane purification method, a gel filtration chromatography purification method, and a preparative high-performance liquid chromatography purification method, as needed.

Specific examples of the compound (II) include, but are not limited to, the following.

(P-1)

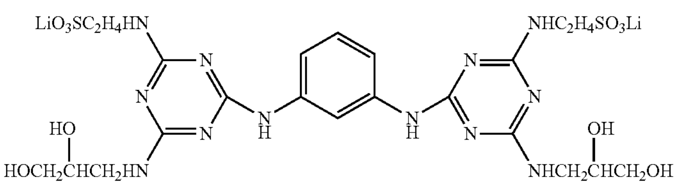

(P-2)

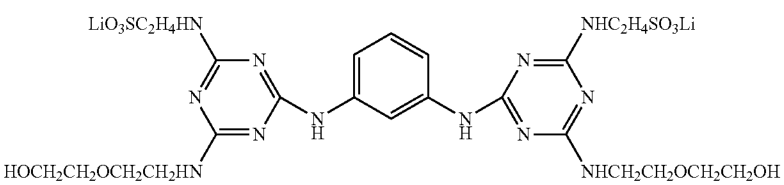

(P-3)

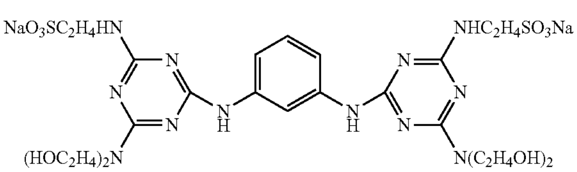

(P-4)

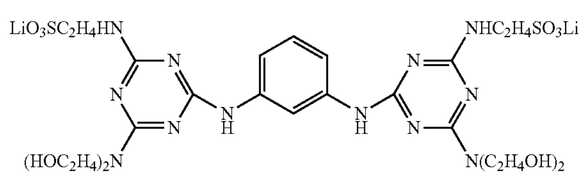

-continued
(P-5)
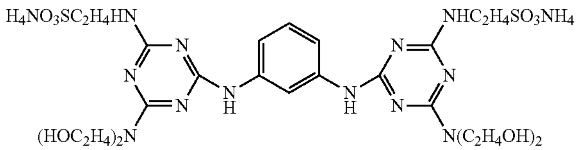
(P-6)
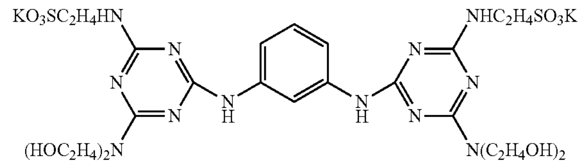
(P-7)
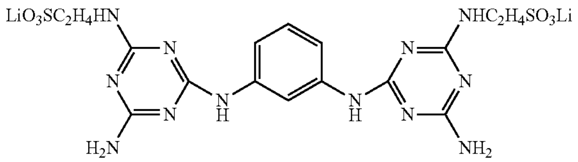
(P-8)
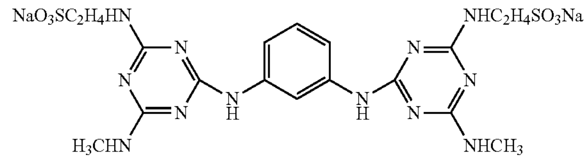
(P-9)
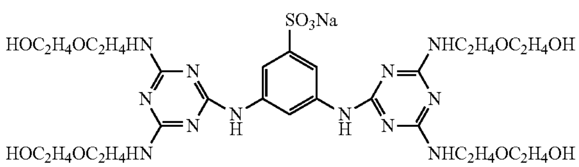
(P-10)
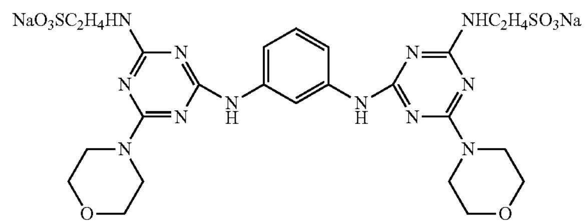
(P-11)
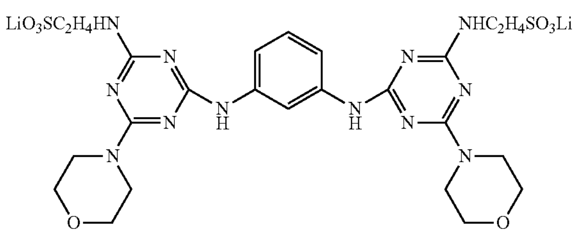
(P-12)
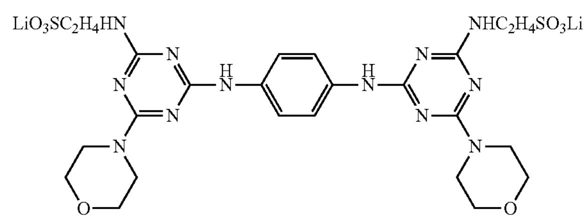
(P-13)
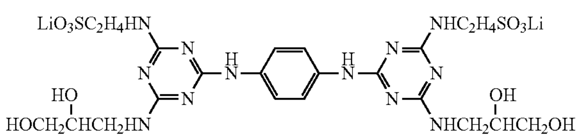
(P-14)
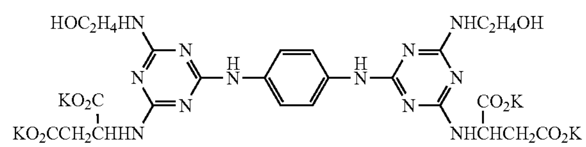
(P-15)
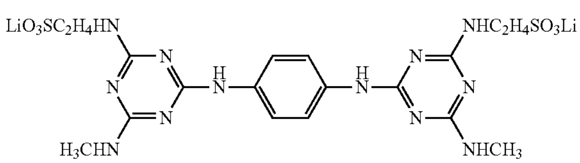
(P-16)
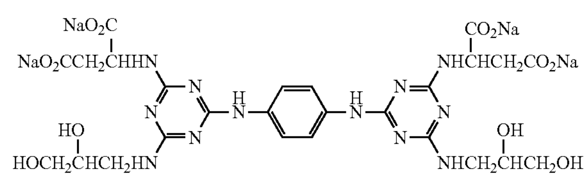
(P-17)
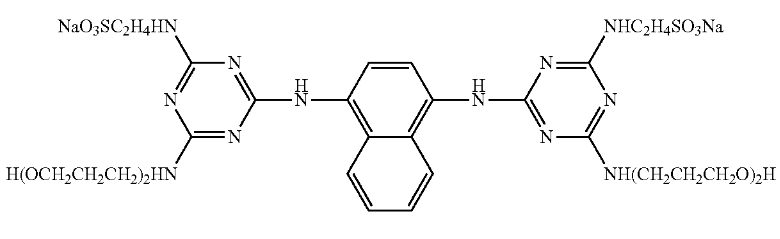

-continued
(P-18)
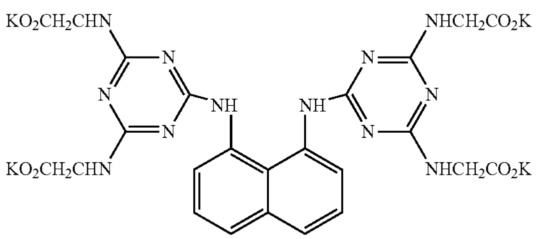
(P-19)
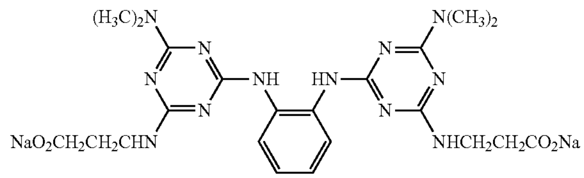
(P-20)
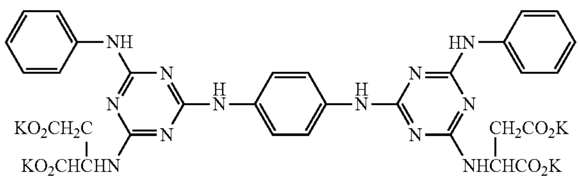
(P-21)
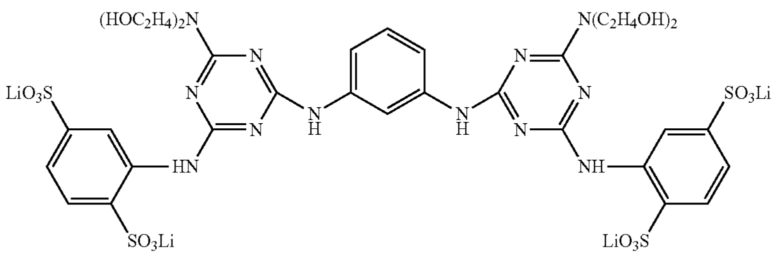
(P-22)
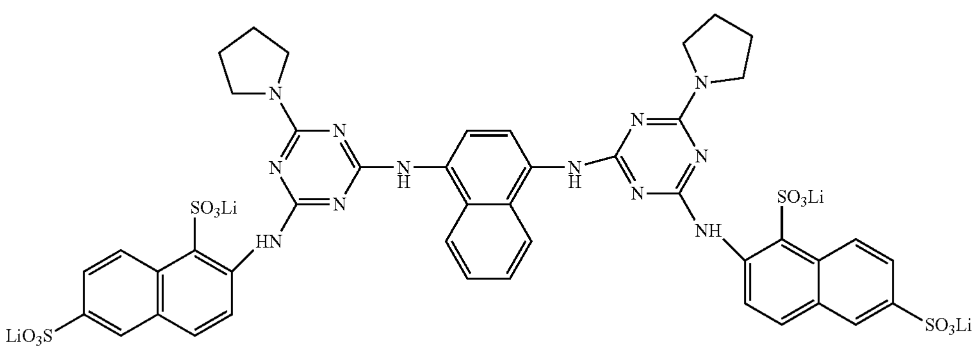
(P-23)
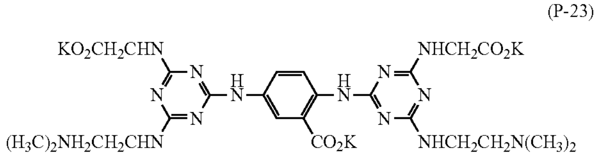
(P-24)
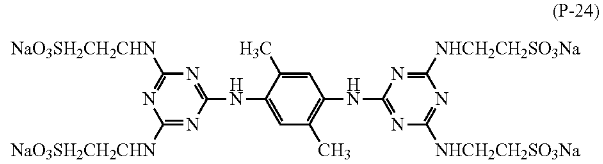
(P-25)
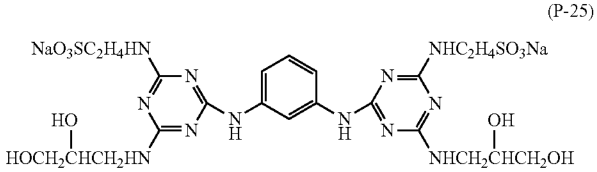
(P-26)
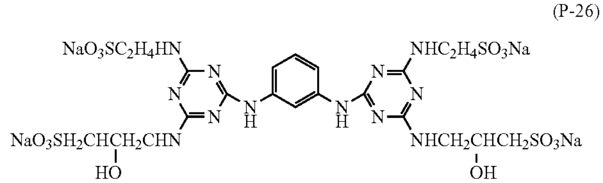
(P-27)
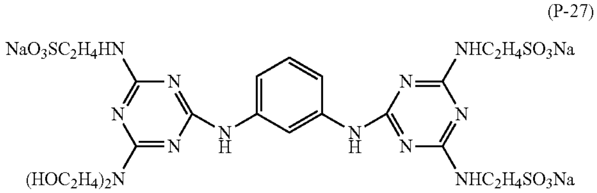
(P-28)
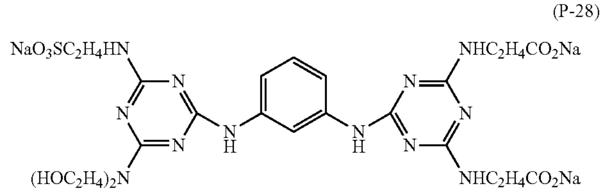

Chelating Agent

The aqueous additive solution according to the present invention may contain a chelating agent.

The chelating agent (also referred to as a "chelator") is a compound that binds to an inorganic or metal cation (particularly preferably, a polyvalent cation) to produce a chelate compound.

In the present invention, the chelating agent has a function of preventing the formation and growth (that is, functions as a solubilizing agent) of insoluble, precipitated foreign matter derived from an inorganic or metal cation (in particular, a polyvalent cation) in the aqueous additive solution and the ink composition.

When the aqueous additive solution according to the present invention contains a chelating agent, the generation of precipitated foreign matter can be suppressed during long-term storage of the aqueous additive solution and the ink composition using the aqueous additive solution. When an image is printed with an ink jet printer using an ink composition for ink jet recording obtained by using the aqueous additive solution and the ink composition after long-term storage, ink clogging in a nozzle or the like is less likely to occur, and high-quality printed matter can be obtained. The chelating agent that can be used in the present invention is not particularly limited, and various chelating agents can be used.

The chelating agent may be any solubilizing agent that forms a complex with a cation present in the aqueous additive solution and the ink composition due to a chelating action to exhibit the effect of reducing the generation and growth of precipitated foreign matter in the aqueous additive solution and the ink composition, and various types of such chelating agents can be used alone or in combination of two or more thereof. The chelating agent is preferably a water-soluble compound.

Examples of the chelating agent include ethylenediaminetetraacetic acid (EDTA) and salts thereof (e.g., EDTA-4 sodium (tetrasodium salt) and EDTA-4 lithium (tetralithium salt)), picolinic acid and salts thereof (e.g., picolinic acid sodium salt), quinolinic acid and salts thereof (e.g., quinolinic acid sodium salt), 1,10-phenanthroline, 8-hydroxyquinoline, 3-hydroxy-2,2'-iminodisuccinic acid tetrasodium salt, methylglycinediacetic acid (MGDA) and salts thereof, L-glutamic acid diacetic acid (GLDA) and salts thereof, L-aspartic acid diacetic acid (ASDA) and salts thereof, hydroxyethyliminodiacetic acid (HIDA) and salts thereof, 3-hydroxy-2,2'-iminodisuccinic acid (HIDS) and salts thereof, dicarboxymethyl glutamic acid (CMGA) and salts thereof, and (S,S)-ethylenediaminedisuccinic acid (EDDS) and salts thereof. The salts among the above chelating agents are preferably, for example, salts of ammonium, amine, or the like besides salts of a monovalent metal such as sodium, potassium, or lithium. Among the above chelating agents, these exhibit a chelating action that is less likely to decrease with respect to a change in the pH of the aqueous additive solution and the ink composition. Therefore, the chelating action is exhibited in a wider pH range, and for example, it is possible to further improve the response to a change in the pH of the aqueous additive solution and the ink composition, such as a change with time.

The content of the chelating agent is preferably 0.001% to 1.0% by mass, more preferably 0.01% to 0.5% by mass, and particularly preferably 0.01% to 0.1% by mass, based on the total mass of the aqueous additive solution.

When the content of the chelating agent is 0.001% by mass or more, the chelating action can be effectively exhibited. When the content of the chelating agent is 1.0% by mass or less, it is possible to suppress an excessive increase in the viscosity of the aqueous additive solution and an excessive increase in the pH thereof due to the addition of the chelating agent.

Water

The aqueous additive solution according to the present invention can be prepared using water as a medium. The aqueous additive solution can also be prepared by further optionally using a lipophilic medium or an aqueous medium to dissolve or disperse the compound (A) and the compound (II) in the medium.

Examples of water included in the aqueous additive solution according to the present invention include pure water and ultrapure water such as ion-exchanged water, ultrafiltered water, reverse osmosis water, and distilled water.

The content of water in the aqueous additive solution according to the present invention is not particularly limited, but is preferably 50% to 95% by mass, more preferably 60% to 95% by mass, still more preferably 70% to 95% by mass, and particularly preferably 80% to 95% by mass, based on the total mass of the aqueous additive solution, from the viewpoint of storage stability.

Water-Miscible Organic Solvent

The aqueous additive solution according to the present invention can contain other solvents in addition to water. The other solvents are preferably water-miscible organic solvents.

Examples of water-miscible organic solvents include alcohols (e.g., methanol, ethanol, propanol, isopropanol, butanol, isobutanol, sec-butanol, t-butanol, pentanol, hexanol, cyclohexanol, and benzyl alcohol); polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol); glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monoethyl ether, and ethylene glycol monophenyl ether); amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine); and other polar solvents (e.g., formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone). Two or more water-miscible organic solvents may be used in combination.

When the aqueous additive solution according to the present invention contains a water-miscible organic solvent, the content of the water-miscible organic solvent is preferably 0.01% to 50% by mass, more preferably 0.01% to 30% by mass, and still more preferably 0.01% to 20% by mass, based on the total mass of the aqueous additive solution.

Preservative

The preservative will be described.

In the present invention, the preservative refers to an agent having a function of preventing microorganisms, in particular, bacteria and fungi (mold) from appearing and growing. Preservatives also encompass fungicides.

The aqueous additive solution according to the present invention may contain a preservative.

The use of the preservative in the aqueous additive solution according to the present invention enables the appearance and growth of bacteria and mold to be reduced even when the aqueous additive solution is stored for a long period of time. Consequently, when an image is printed with an ink jet printer using an ink composition for ink jet recording obtained by using the aqueous additive solution after long-term storage, ink clogging in a nozzle or the like is less likely to occur, and high-quality printed matter can be obtained.

In the present invention, various preservatives can be used.

First, examples of the preservative include inorganic preservatives containing heavy metal ions (e.g., silver ion-containing substances) and salts. Examples of organic preservatives that can be used include quaternary ammonium salts (such as tetrabutylammonium chloride, cetylpyridinium chloride, and benzyltrimethylammonium chloride), phenol derivatives (such as phenol, cresol, butylphenol, xylenol, and bisphenol), phenoxy ether derivatives (such as phenoxyethanol), heterocyclic compounds (such as benzotriazole, PROXEL, and 1,2-benzisothiazolin-3-one), alkane diols (such as pentylene glycol (1,2-pentanediol), isopentyldiol (3-methyl-1,3-butanediol), hexanediol (such as 1,2-hexanediol), and caprylyl glycol (1,2-octanediol)), acid amides, carbamic acid, carbamates, amidines/guanidines, pyridines (such as sodium pyridinethione-1-oxide), diazines, triazines, pyrroles/imidazoles, oxazoles/oxazines, thiazoles/thiadiazines, thioureas, thiosemicarbazides, dithiocarbamates, sulfides, sulfoxides, sulfones, sulfamides, antibiotic substances (such as penicillin and tetracycline), sodium dehydroacetate, sodium benzoate, p-hydroxybenzoic acid ethyl ester, and salts thereof.

At least one preservative selected from the group consisting of heterocyclic compounds, phenol derivatives, phenoxy ether derivatives, and alkanediols is preferably used as the preservative. Preservatives described in, for example, Bokin Bobai Handbook (Antibacterial and antifungal handbook) (GIHODO SHUPPAN Co., Ltd.: 1986) and Bokin-bobai-zai Jiten (Encyclopedia of antibacterial and antifungal agents) (edited by encyclopedia editorial committee of The Society for Antibacterial and Antifungal Agents, Japan) can also be used as the preservatives.

Various compounds having, for example, an oil-soluble structure or a water-soluble structure can be used as these compounds; however, these compounds are preferably water-soluble compounds.

The aqueous additive solution according to the present invention may contain two or more preservatives. When two or more preservatives are used in combination, the effects of the present invention are more satisfactorily exhibited. For example, the preservation stability, in particular, the hue stability, of a recorded image formed using the aqueous additive solution and the ink composition for ink jet recording obtained by using the aqueous additive solution is improved, and when an image is printed with an ink jet printer using the ink composition for ink jet recording obtained by using the aqueous additive solution after long-term storage, the ink ejection stability is remarkably improved. This is probably because bacteria and fungi come in contact with two or more preservatives, and the acquisition of resistance of the bacteria and fungi to individual preservatives is thereby suppressed.

When two or more preservatives are combined, the preservatives preferably have skeletons having different chemical structures. When two or more preservatives are contained, at least one of the preservatives is preferably a heterocyclic compound, a phenol derivative, a phenoxy ether derivative, or an alkanediol, and particularly preferably a heterocyclic compound. Preferred examples thereof include a combination of a heterocyclic compound and a phenoxy ether derivative, a combination of a heterocyclic compound and a phenol derivative, and a combination of a heterocyclic compound and an alkanediol.

Furthermore, the heterocyclic compound is preferably a thiazole compound or a benzotriazole compound.

Thiazole compounds particularly function as fungicides among preservatives. Examples of thiazole compounds include benzisothiazoline, isothiazoline, 1,2-benzisothiazolin-3-one, 5-chloro-2-methyl-4-isothiazolin-3-one, 2-(thiocyanomethylthio)benzothiazole, 2-mercaptobenzothiazole, and 3-allyloxy-1,2-benzisothiazole-1,1-oxide. PROXEL (registered trademark) series (such as BDN, BD20, GXL, LV, XL2, XL2(s), and Ultra 10) manufactured and sold by LONZA can also be used as the thiazole fungicides.

Benzotriazole compounds also function as anticorrosives and can prevent, for example, formation of rust, one cause of which is contact of a metal material (in particular, 42 alloy (nickel-iron alloy containing 42% nickel)) constituting an ink jet head with the aqueous additive solution and the ink composition. Examples of benzotriazole compounds include 1H-benzotriazole, 4-methyl-1H-benzotriazole, 5-methyl-1H-benzotriazole, sodium salts thereof, and potassium salts thereof.

When two or more preservatives are combined, the content ratio is not particularly limited, but the content of each of the preservatives is preferably 1% by mass or more, more preferably 10% by mass or more, and still more preferably 20% by mass or more of the total content of the preservatives. In addition, the content of each of the preservatives is preferably 99% by mass or less, more preferably 90% by mass or less, and still more preferably 80% by mass or less of the total content of the preservatives. Within the above-described range, the effect of each preservative can be efficiently obtained, and the synergistic effect between the preservatives can also be easily obtained. In addition, it is also possible to reduce the possibility that a person who touches the aqueous additive solution or the ink composition, in particular, a person who is sensitive to the preservatives develops a rash or the like while maintaining the effects of the preservatives.

When the aqueous additive solution according to the present invention contains a preservative, the content of the preservative (the total content of preservatives if two or more preservatives are contained) is not particularly limited, but is preferably 0.001% to 1.0% by mass, more preferably 0.005% to 1.0% by mass, still more preferably 0.01% to 1.0% by mass, particularly preferably 0.01% to 0.5% by mass, and most preferably 0.01% to 0.4% by mass, based on the total amount of the aqueous additive solution. When the content is within the above range, the effect of the preservative can be more efficiently obtained, and the spoiling of water and the generation of precipitates can be suppressed.

In the aqueous additive solution according to the present invention, the mass ratio of the total amount of the compound (A) and the compound (II) to the preservative (compound (A)+compound (II))/preservative is preferably 90/10 to 99/1.

Within the above range, the compound (A) and the compound (II) can be stably dissolved in the aqueous additive solution according to the present invention, and the effect of preventing the appearance and growth of bacteria and fungi (mold) can also be achieved.

Buffering Agent

The aqueous additive solution according to the present invention may include a buffering agent (pH value stabilizer).

From the viewpoint of improving storage stability of the aqueous additive solution according to the present invention and storage stability of an ink composition using the aqueous additive solution, the aqueous additive solution according to the present invention is preferably weakly acidic to neutral to basic, more preferably neutral to basic, still more preferably neutral to weakly basic, and most preferably weakly basic. For example, the pH value of the aqueous additive solution at 25° C. is preferably 6.5 to 9.0, more preferably 6.8 to 9.0, and most preferably 7.0 to 9.0.

When the pH value of the aqueous additive solution at 25° C. is 6.5 or more, dissolution stability in preparation of the aqueous additive solution and the ink composition is improved, and the generation of precipitates is suppressed. On the other hand, when the pH value of the aqueous additive solution at 25° C. is 9.0 or less, the possibility of decomposition of a part of a colorant used in an aqueous colorant solution for an ink composition, the aqueous colorant solution being obtained by incorporating the colorant in the aqueous additive solution, and the ink composition is reduced to improve storage stability and reliability of the aqueous colorant solution for an ink composition and the ink composition.

The buffering agent (pH value stabilizer) is not particularly limited as long as it is a buffering agent that suppresses the variation in the pH value in the aqueous additive solution. Preferred examples of the buffering agent include lithium carbonate, lithium hydrogen carbonate, sodium carbonate, sodium hydrogen carbonate, potassium carbonate, potassium hydrogen carbonate, an acetic acid/triethylamine mixture, and a phosphoric acid/triethylamine mixture.

The buffering agent is preferably lithium carbonate, lithium hydrogen carbonate, sodium carbonate, sodium hydrogen carbonate, potassium carbonate, or potassium hydrogen carbonate, more preferably sodium carbonate, sodium hydrogen carbonate, potassium carbonate, or potassium hydrogen carbonate, and most preferably sodium hydrogen carbonate.

Other Additives

The aqueous additive solution according to the present invention may optionally contain other additives as long as the effects of the present invention are not impaired.

Examples of the other additives include publicly known additives (described in JP2003-306623A) such as anti-drying agents (humectants), anti-fading agents, emulsion stabilizers, penetration enhancing agents, ultraviolet absorbers, surface-tension adjusting agents, anti-foaming agents, viscosity modifiers, dispersing agents, dispersion stabilizers, anticorrosives, and pH adjusting agents.

The aqueous additive solution according to the present invention is usually a colorless aqueous solution when it contains no colorant. The aqueous additive solution according to the present invention can be used for the preparation of colorless and colored ink compositions having various color tones. For example, the aqueous additive solution can be used for an ink composition having a yellow color tone, an ink composition having an orange color tone, an ink composition having a magenta color tone, an ink composition having a cyan color tone, an ink composition having a gray color tone, an ink composition having a black color tone, an ink composition having a brown color tone, an ink composition having a red color tone, an ink composition having a green color tone, an ink composition having a blue color tone, an ink composition having a metallic color tone, and the like.

Aqueous Colorant Solution for Ink Composition

The aqueous additive solution according to the present invention can be not only used as a colorless aqueous additive solution but also added to an aqueous colorant solution for the purpose of improving storage stability of a colorant.

An aqueous colorant solution for an ink composition (also simply referred to as an "aqueous colorant solution") according to the present invention is obtained by adding the aqueous additive solution according to the present invention to an aqueous solution of a colorant. More specifically, the aqueous colorant solution according to the present invention contains a compound represented by the general formula (A), a compound represented by the general formula (II), water, and a colorant.

The compound (A), the compound (II), and water contained in the aqueous colorant solution according to the present invention are the same as those described in the aqueous additive solution.

The aqueous colorant solution according to the present invention may further contain a water-miscible organic solvent, a chelating agent, a preservative, and a buffering agent. The water-miscible organic solvent, the chelating agent, the preservative, and the buffering agent are the same as those described in the aqueous additive solution.

The aqueous colorant solution according to the present invention may further contain other additives. The other additives that may be contained in the aqueous colorant solution according to the present invention are also the same as those described in the aqueous additive solution.

The preferred ranges of the contents of water, the water-miscible organic solvent, the chelating agent, and the preservative in the aqueous colorant solution are the same as the preferred ranges of the contents (addition blending proportion) of the respective components in the aqueous additive solution.

The pH value of the aqueous colorant solution at 25° C. is preferably 6.5 to 9.0, more preferably 6.8 to 9.0, and most preferably 7.0 to 9.0.

The content of the compound (A) (the total amount of the compounds (A) if two or more compounds (A) are contained) in the aqueous colorant solution according to the present invention is preferably 0.001% to 0.3% by mass, more preferably 0.005% to 0.1% by mass, and particularly preferably 0.01% to 0.05% by mass, based on the total mass of the aqueous colorant solution.

Although the detailed mechanism of action remains speculative, when the content of the compound (A) in the aqueous colorant solution is 0.001% by mass or more, presumably, not only the intermolecular interaction between the compound (A) and the compound (II) but also the intermolecular interactions between the compound (A) and the colorant and between the compound (II) and the colorant are also strengthened (the compatibility is further enhanced by the synergistic effect), and the effect of long-term dissolution stability of the aqueous colorant solution containing the compound represented by general formula (II) and the colorant is more likely to be exhibited.

On the other hand, when the content of the compound (A) in the aqueous colorant solution is 0.3% by mass or less, presumably, the concentration of solid contents in the aqueous colorant solution does not increase, and, during the storage of the aqueous colorant solution, the range of variation in liquid physical properties over time is small, thus improving the continuous ejection stability (reliability) of an ink composition for ink jet recording, the ink composition being prepared using the aqueous colorant solution.

The content of the compound (II) (the total amount of the compounds (II) if two or more compounds (II) are contained) in the aqueous colorant solution according to the present invention is preferably 0.5% to 8.0% by mass, more preferably 0.9% to 7.5% by mass, and most preferably 0.95% to 3.0% by mass, based on the total mass of the aqueous colorant solution.

Although the detailed mechanism of action remains speculative, when the content of the compound (II) in the aqueous colorant solution is 0.5% by mass or more, presumably, not only the intermolecular interaction between the compound (A) and the compound (II) but also the intermolecular interactions between the compound (A) and the colorant and between the compound (II) and the colorant are strengthened, and, as a result, the compatibility is enhanced and the interaction is in an optimum range, and the effect of the long-term dissolution stability of the aqueous colorant solution containing the compound (II) and the colorant is more likely to be exhibited.

On the other hand, when the content of the compound (II) in the aqueous colorant solution is 8.0% by mass or less, presumably, the concentration of solid contents in the aqueous colorant solution does not increase, and, during the storage of the aqueous colorant solution, the range of variation in liquid physical properties over time is very small, thus improving the continuous ejection stability (reliability) of an ink composition for ink jet recording, the ink composition being prepared using the aqueous colorant solution.

The colorant used in the aqueous colorant solution is preferably a dye, more preferably a water-soluble dye.

The content of the colorant in the aqueous colorant solution according to the present invention is preferably 5.0% to 20.0% by mass based on the total mass of the aqueous colorant solution.

Although the detailed mechanism of action remains speculative, presumably, when the content of the colorant in the aqueous colorant solution is 5.0% by mass or more, not only the intermolecular interaction between the compound (A) and the compound (II) but also the intermolecular interactions between the compound (A) and the colorant and between the compound (II) and the colorant are further strengthened (the compatibility is particularly enhanced by the synergistic effect), and the effect of long-term dissolution stability of the aqueous colorant solution containing the compound (II) and the colorant is more likely to be exhibited.

On the other hand, when the content of the colorant in the aqueous colorant solution is 20.0% by mass or less, presumably, the concentration of solid contents in the aqueous colorant solution does not increase, and, during the storage of the aqueous colorant solution, the range of variation in liquid physical properties over time is small, thus improving the continuous ejection stability (reliability) of an ink composition for ink jet recording, the ink composition being prepared using the aqueous colorant solution.

The aqueous colorant solution according to the present invention can be made into aqueous colorant solutions having various color tones. From the viewpoint of the interaction with a colorant to be combined, the aqueous colorant solution is particularly suitable for an aqueous colorant solution for an ink composition having a cyan color tone, an aqueous colorant solution for an ink composition having a gray color tone, or an aqueous colorant solution for an ink composition having a black color tone.

Colorant

A description will be made of preferred colorants when the aqueous colorant solution according to the present invention is an aqueous colorant solution for an ink composition having a cyan color tone, an aqueous colorant solution for an ink composition having a gray color tone, or an aqueous colorant solution for an ink composition having a black color tone.

The colorant is preferably a dye, more preferably a water-soluble dye, and most preferably a dye having at least one hydrophilic group in one molecule of the dye, from the viewpoints of preparation operability of the aqueous colorant solution and long-term storage stability of the aqueous colorant solution.

Examples of the hydrophilic group include, but are not limited to, a sulfo group ($—SO_3M$), a carboxy group ($—CO_2M$), a hydroxy group (—OM), a phosphate group ($—PO(OM)_2$), a carbonamide group, a sulfonamide group, and a quaternary ammonium group. The hydrophilic group is preferably an ionic hydrophilic group, more preferably a sulfo group ($—SO_3M$) and a carboxy group ($—CO_2M$), and most preferably a sulfo group ($—SO_3M$).

M represents a hydrogen atom or a counter cation. Examples of the counter cation include, but are not particularly limited to, alkali metal ions, an ammonium ion, and organic cations (such as tetramethylammonium, guanidinium, and pyridinium).

M is preferably a hydrogen atom, an ammonium ion, or an alkali metal ion, more preferably an alkali metal ion, still more preferably a lithium ion, a sodium ion, or a potassium ion, and particularly preferably a lithium ion or a sodium ion. The counter cation may be a single salt or a mixed salt.

The colorant preferably has one to ten hydrophilic groups, more preferably two to five hydrophilic groups in one molecule of the water-soluble dye.

Aqueous Colorant Solution for Ink Composition Having Cyan Color Tone

When the aqueous colorant solution according to the present invention is an aqueous colorant solution for an ink composition having a cyan color tone, the colorant is preferably, for example, a cyan dye described in JP3949385B, JP4145153B, and WO2021/039651A.

Specific examples of preferred cyan dyes include, but are not limited to, the following. Note that the specific examples below are each a mixture including positional isomers (refer to (2A) to (2D) below) of specific substituents R, and therefore, the introduction positions of substituents are not specified, and the positional isomers are treated as the same compound. In the specific examples below, it is indicated that the substituents R each replace any hydrogen atom at a β position but do not replace a portion having "H" in each structural formula.

(2A)
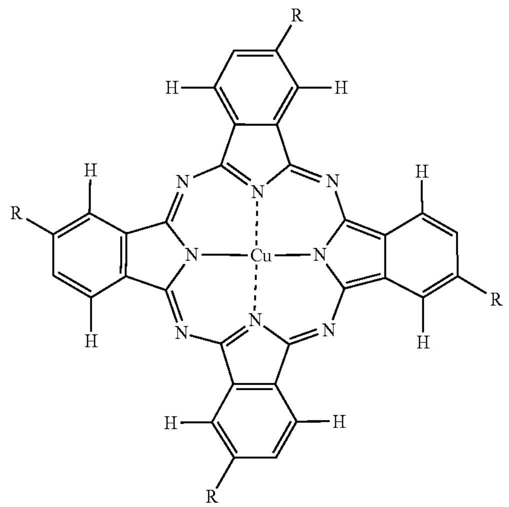
(2B)
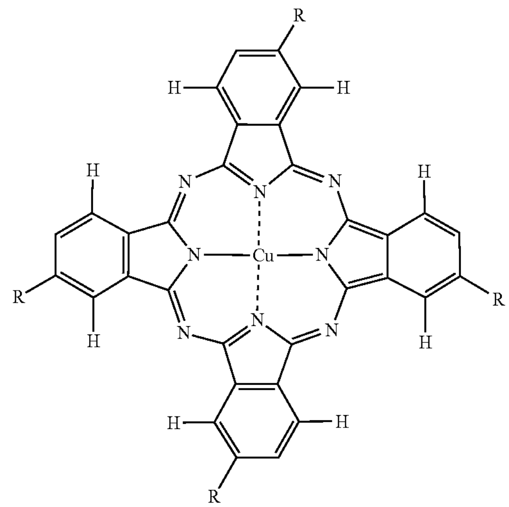
(2C)
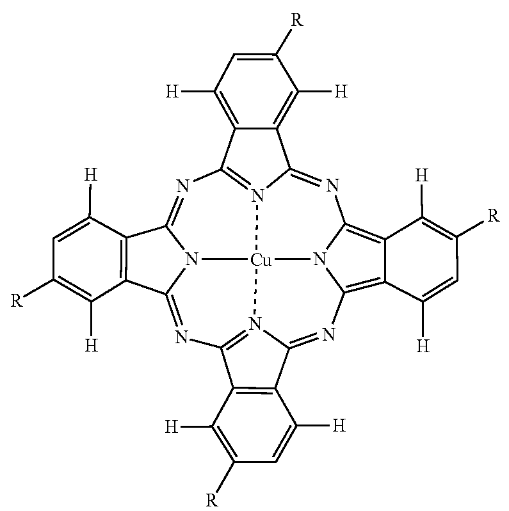
(2D)
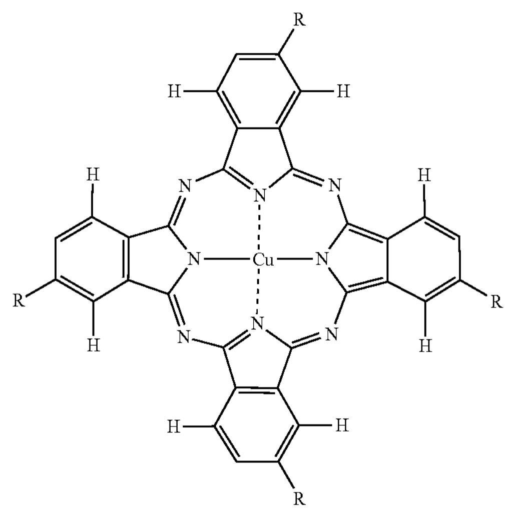
C-1
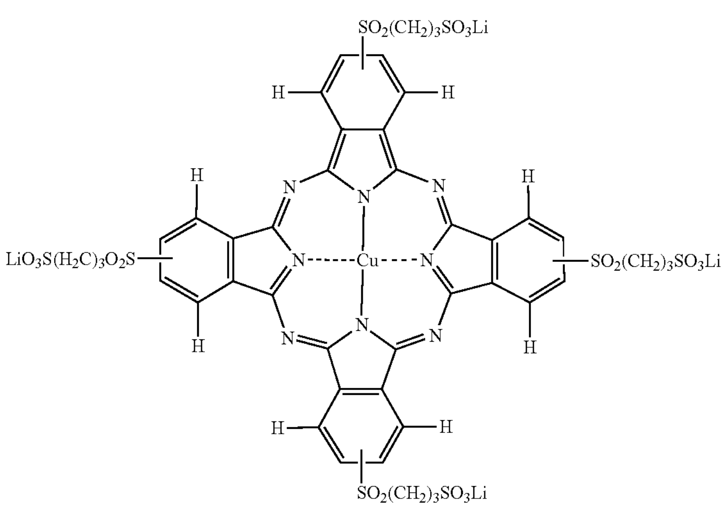

-continued
C-2
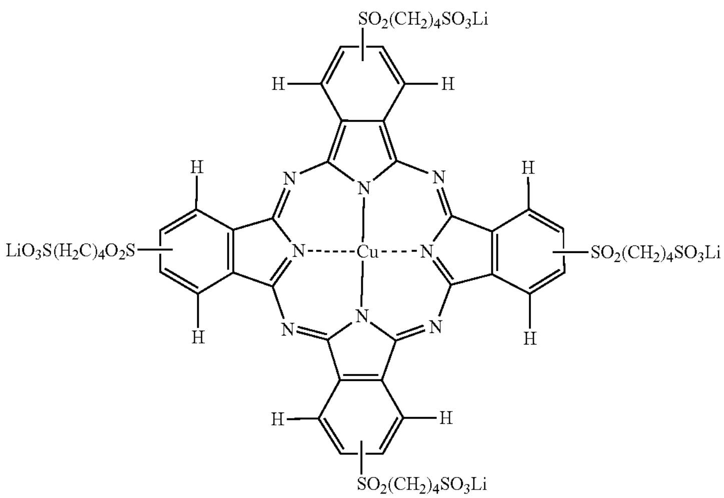
C-3
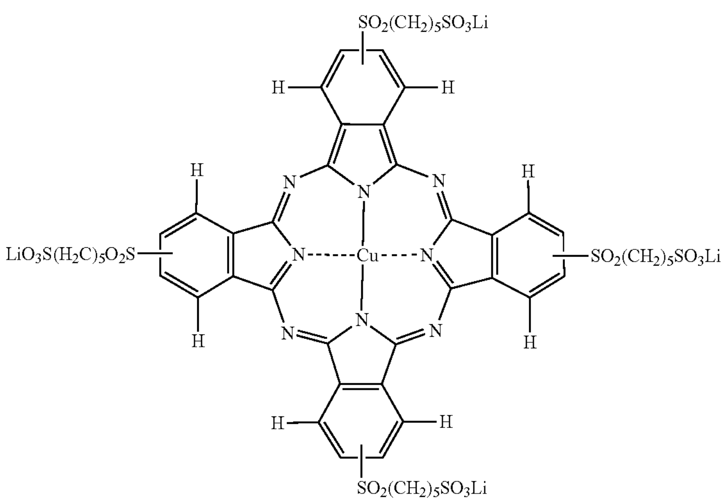
C-4
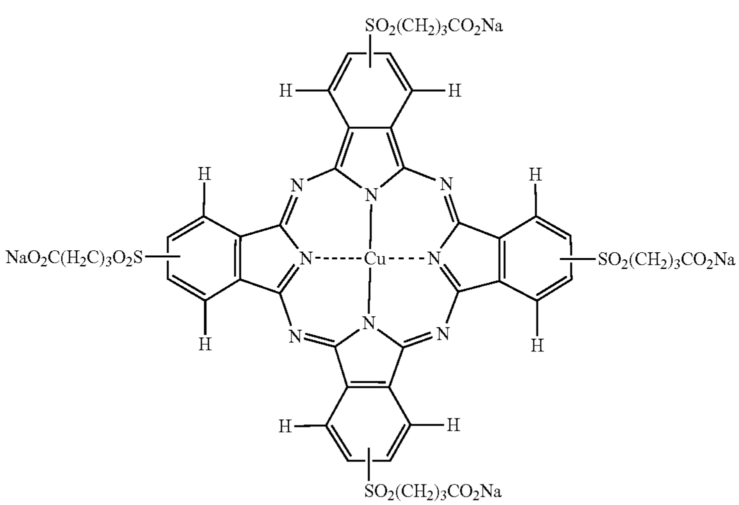

-continued
C-5
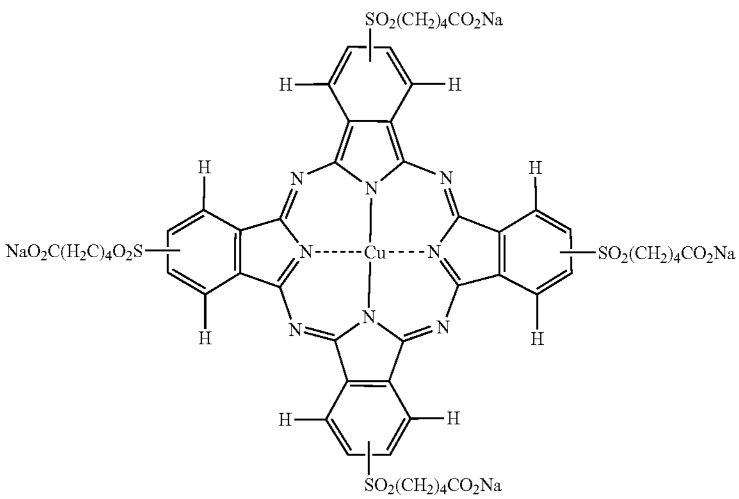
C-6
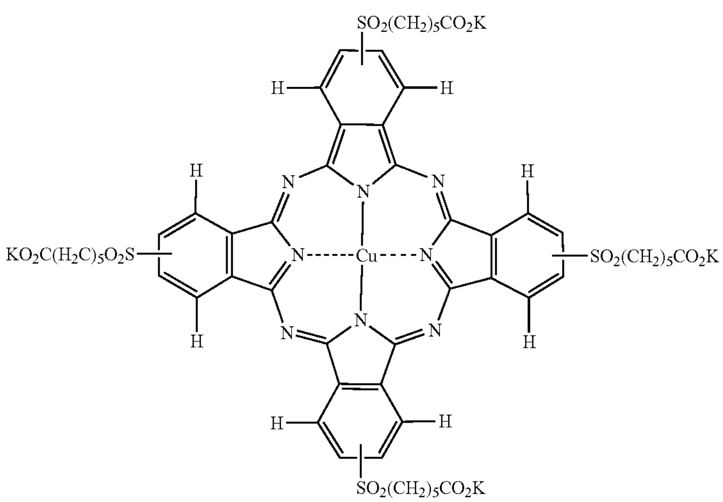
C-7
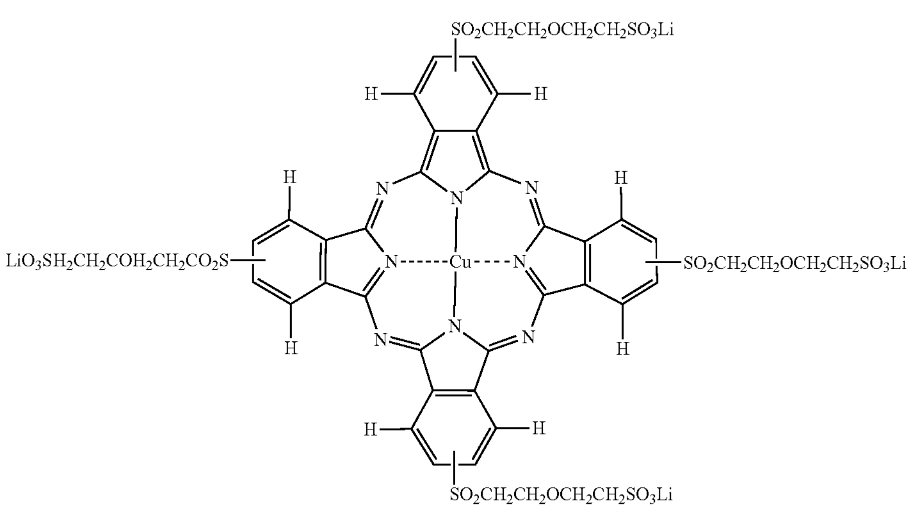

-continued
C-8
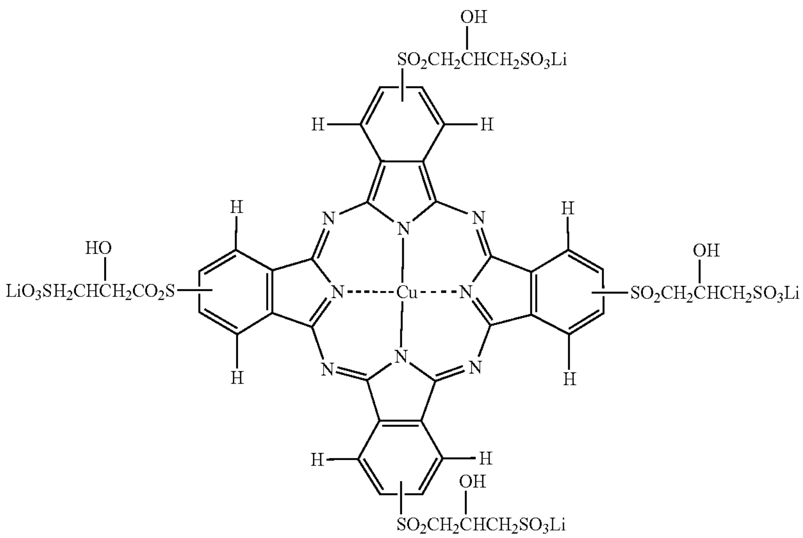
C-9
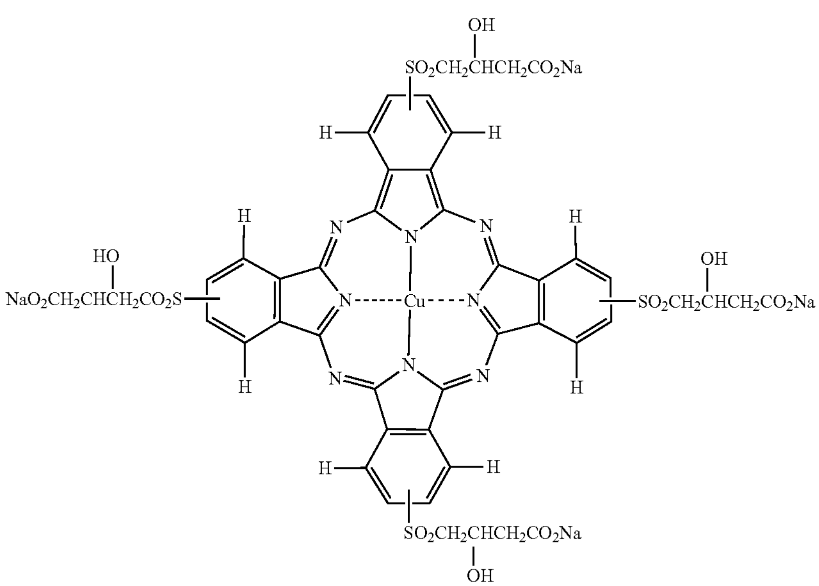

-continued
C-10
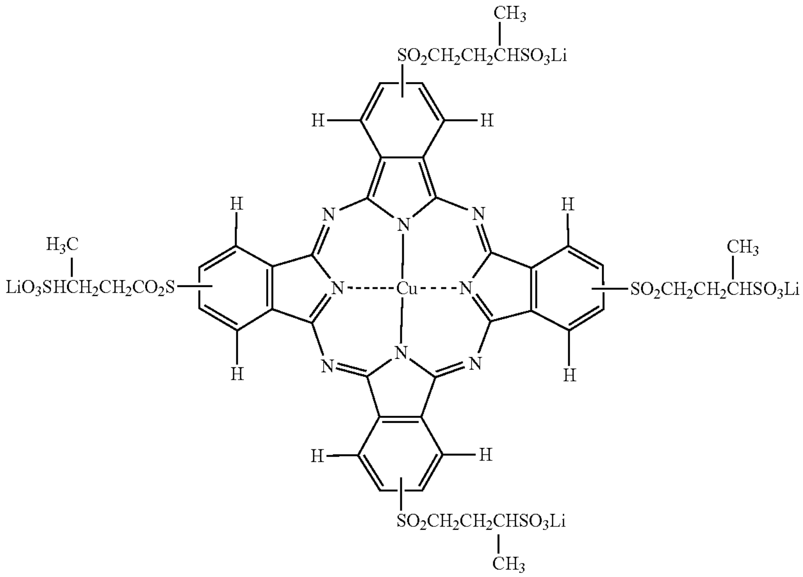
C-11
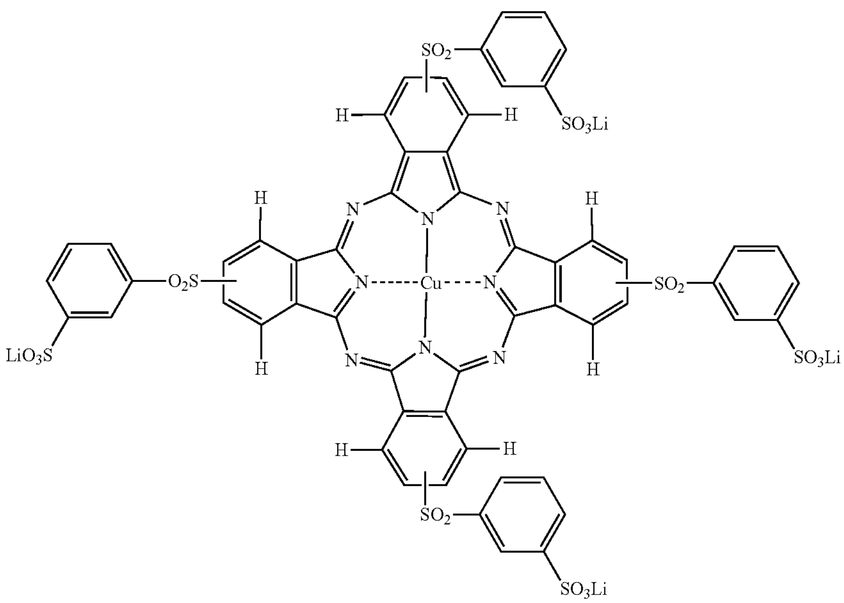
C-12
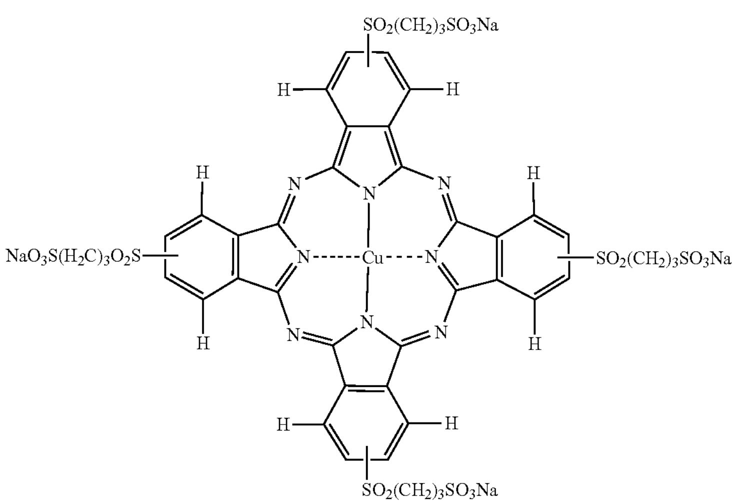

-continued
C-13
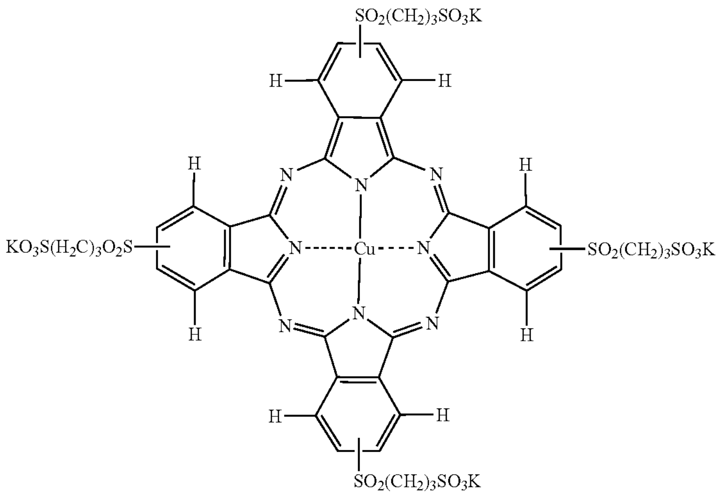
C-14
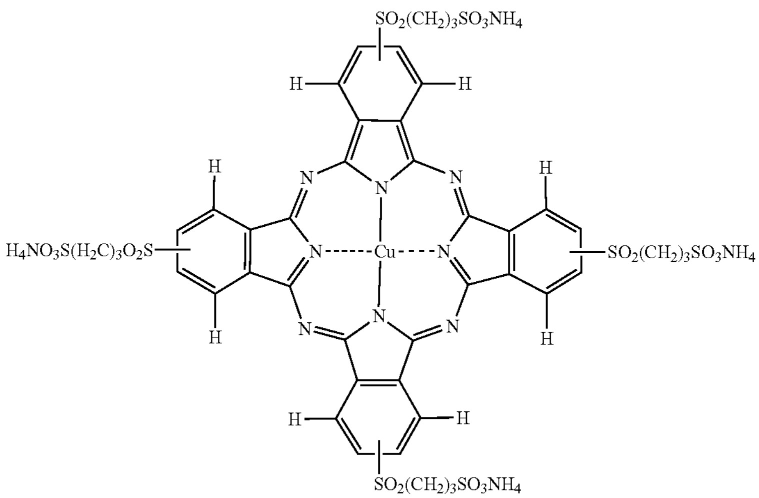
C-15
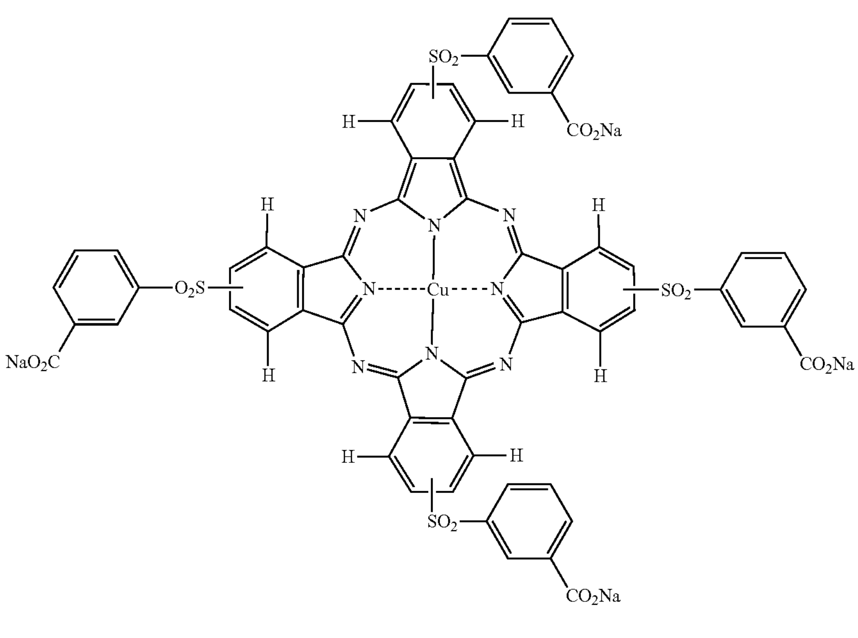

-continued
C-16
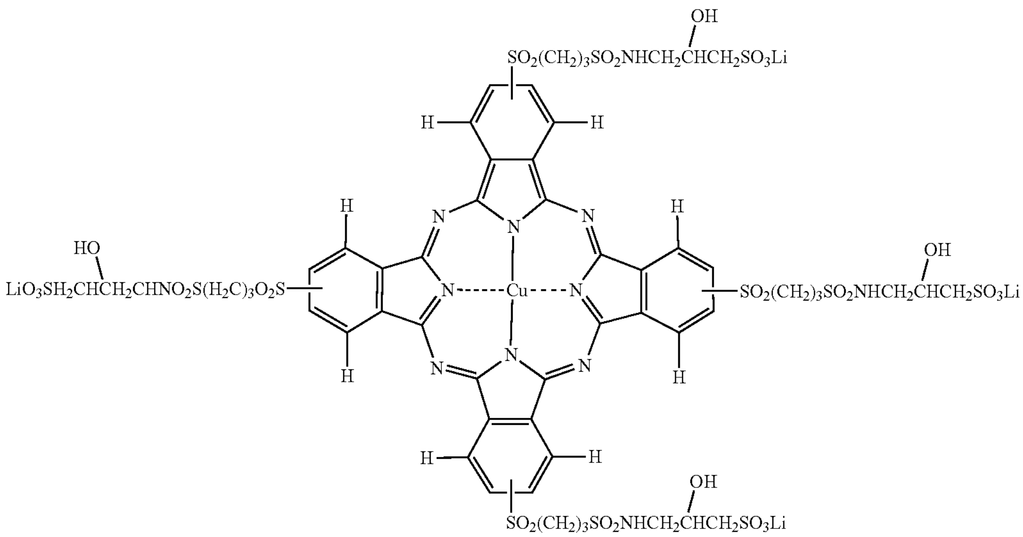
C-17
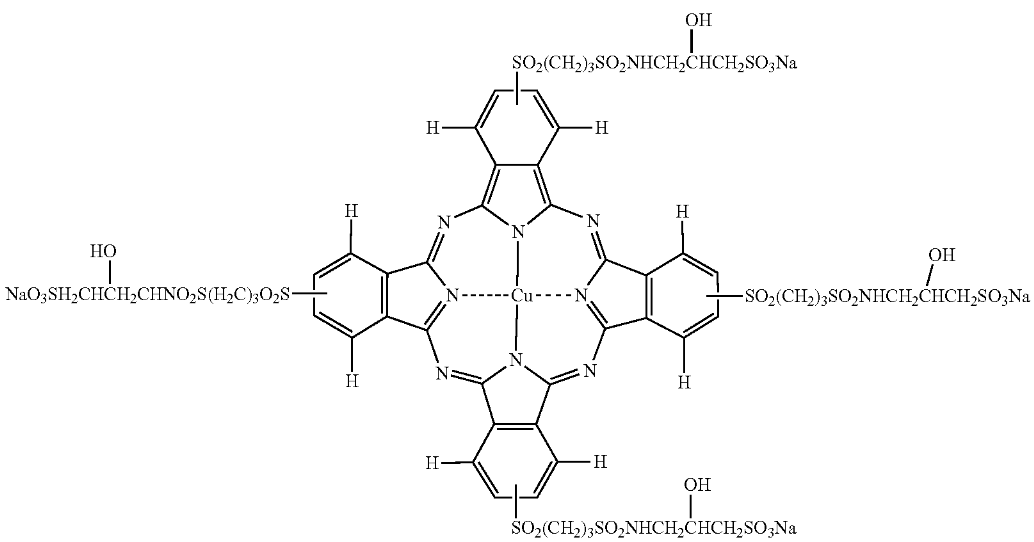
C-18
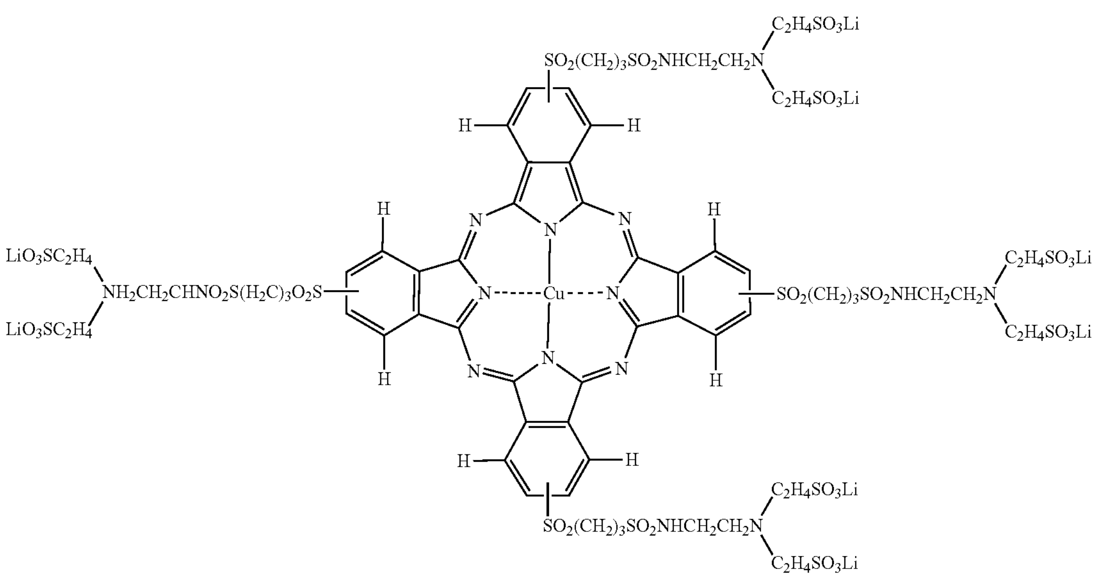

-continued
C-19
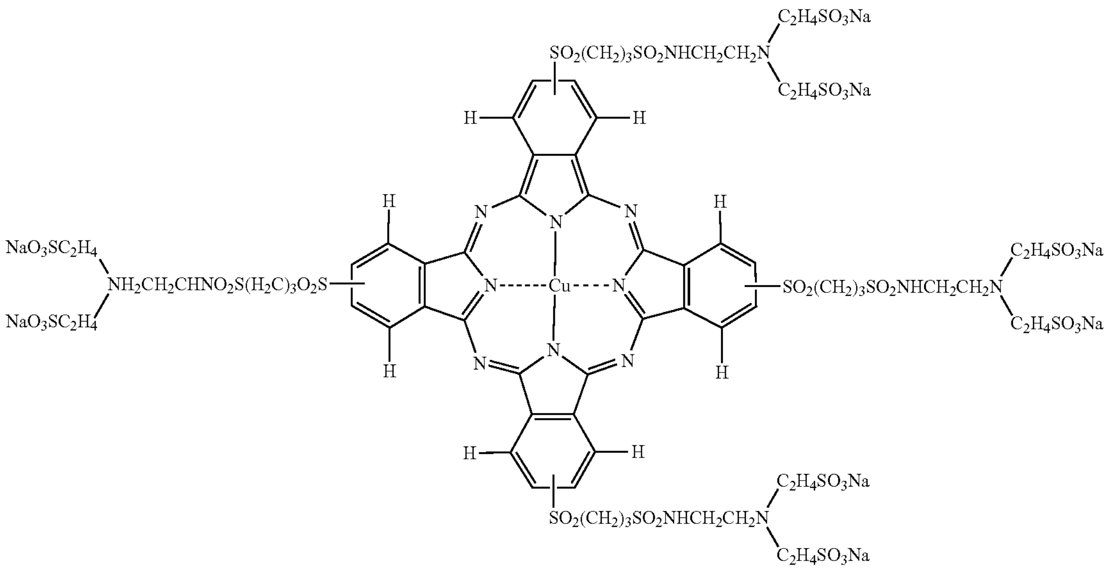
C-20
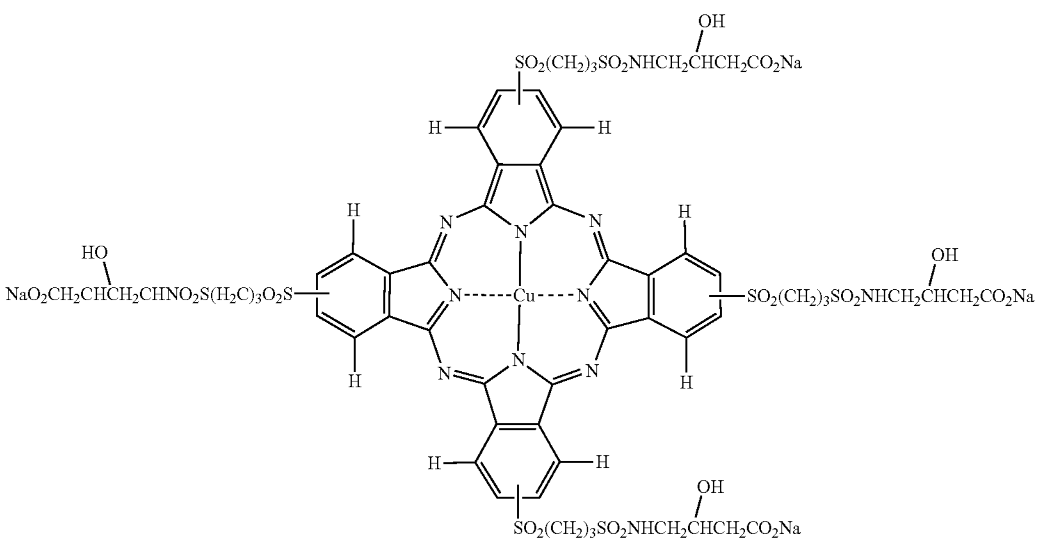
C-21
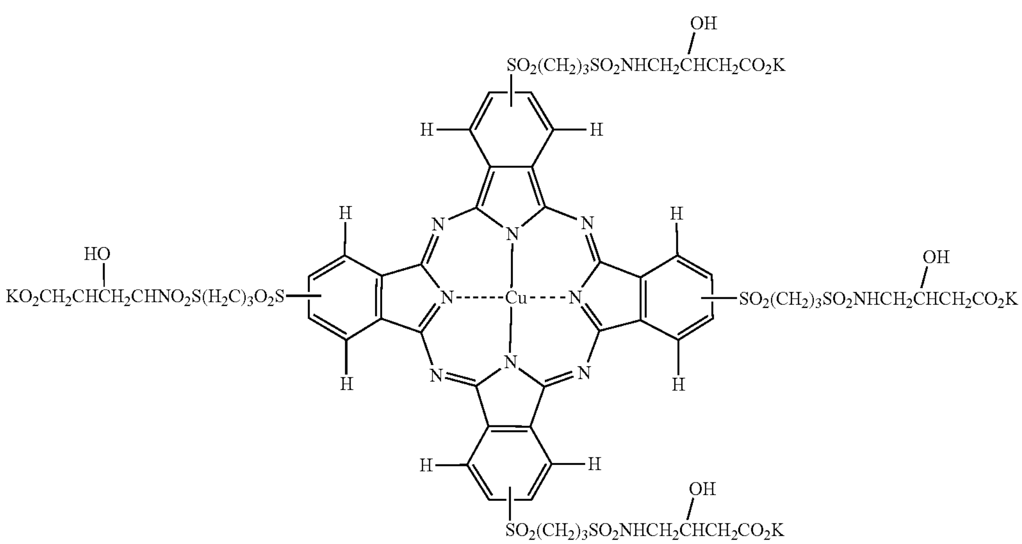

-continued
C-22
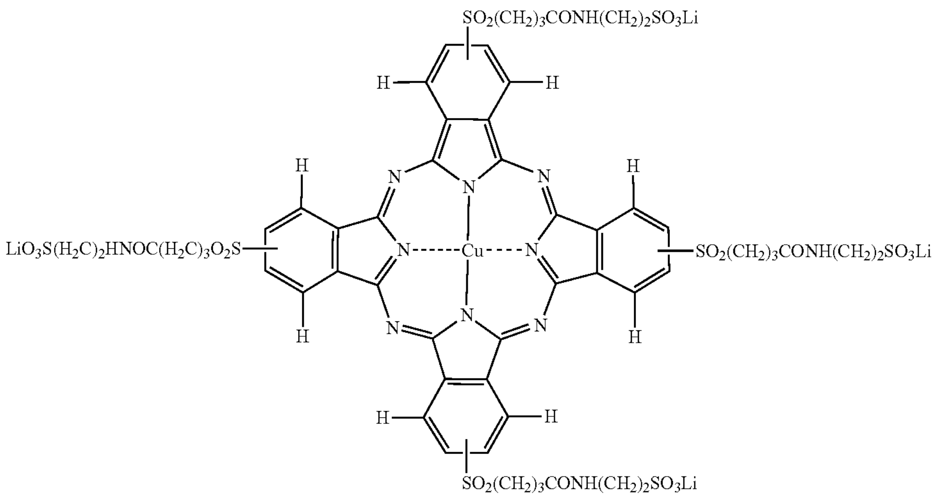
C-23
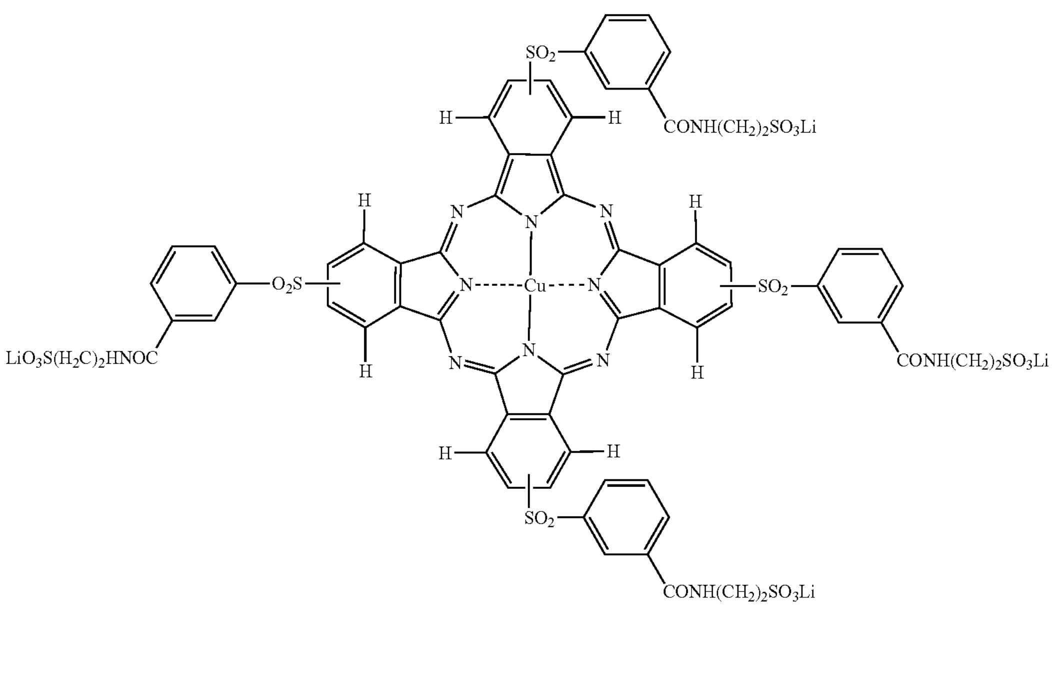

-continued
C-24
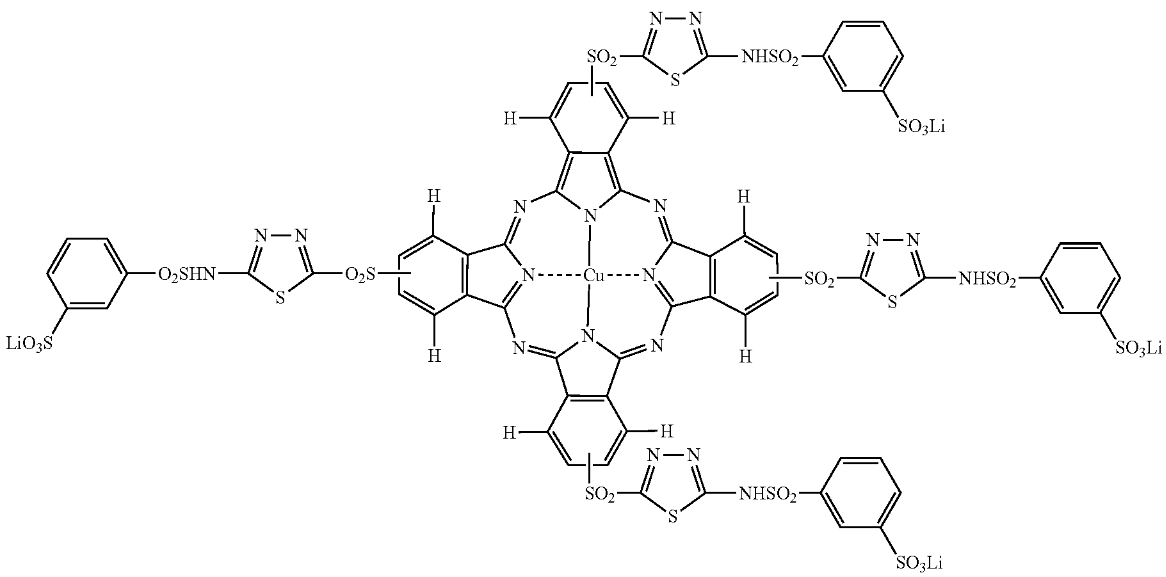
C-25
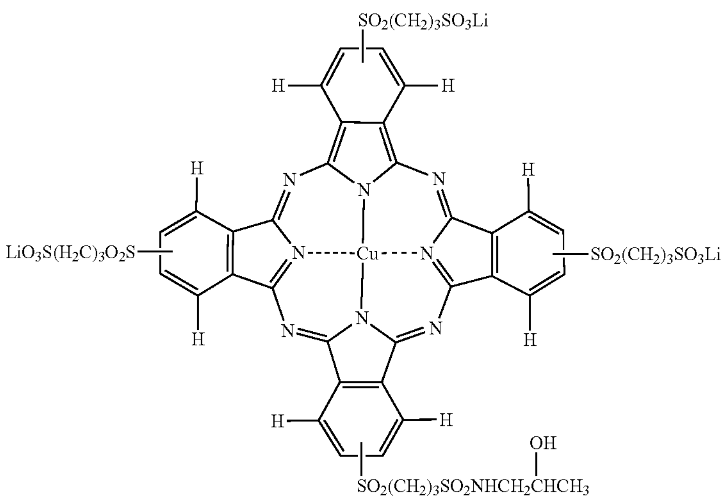
C-26
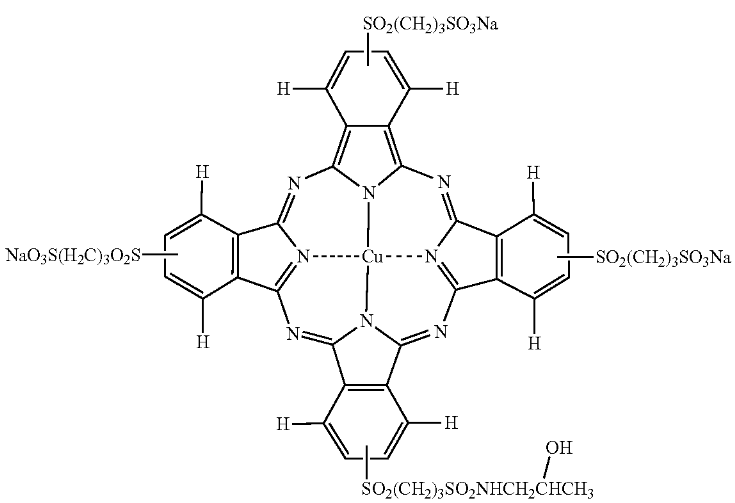

-continued
C-27
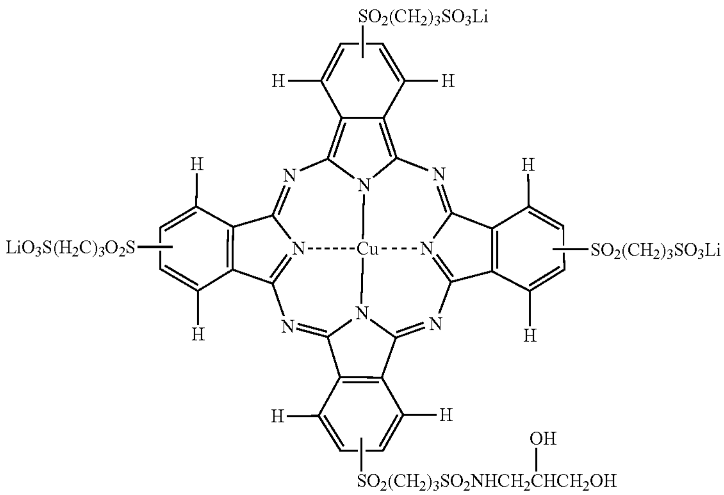
C-28
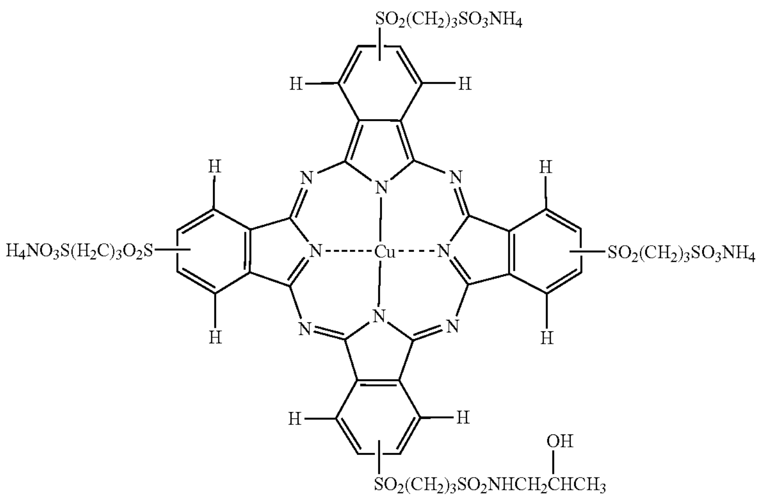
C-29
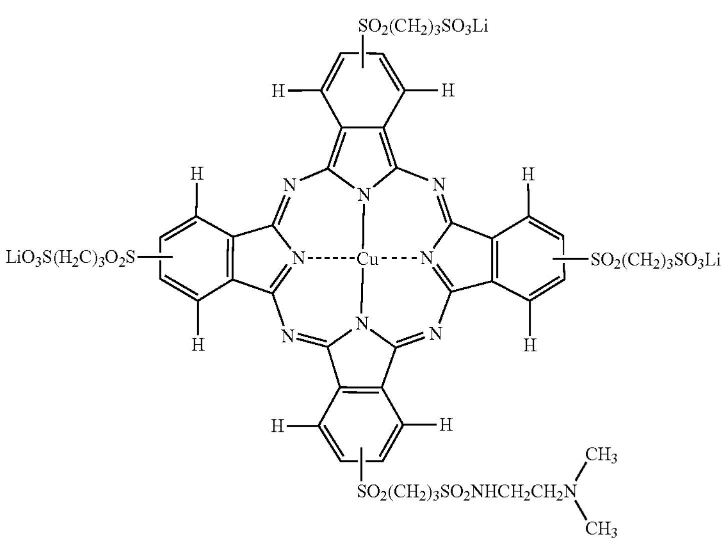

-continued
C-30
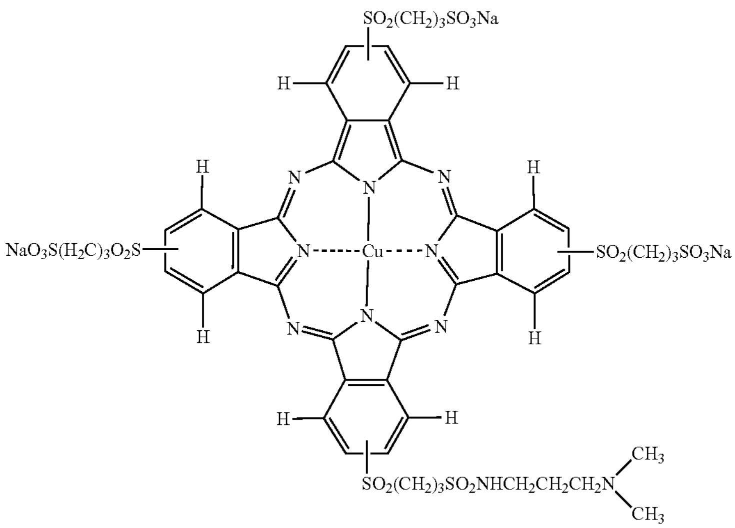
C-31
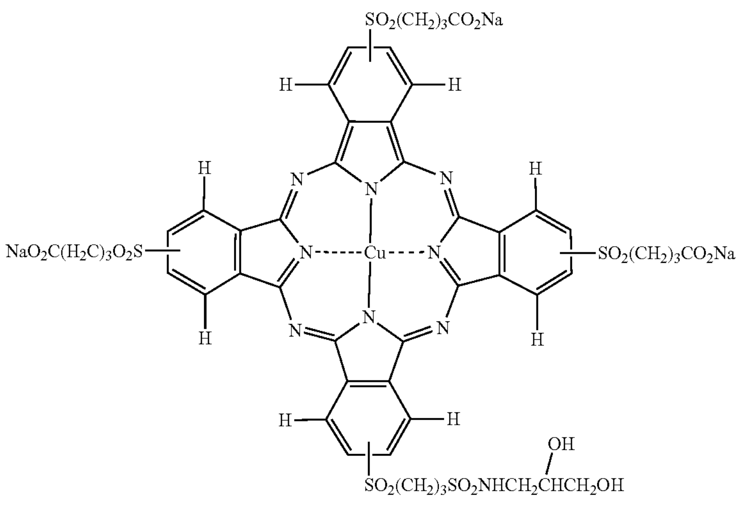
C-32
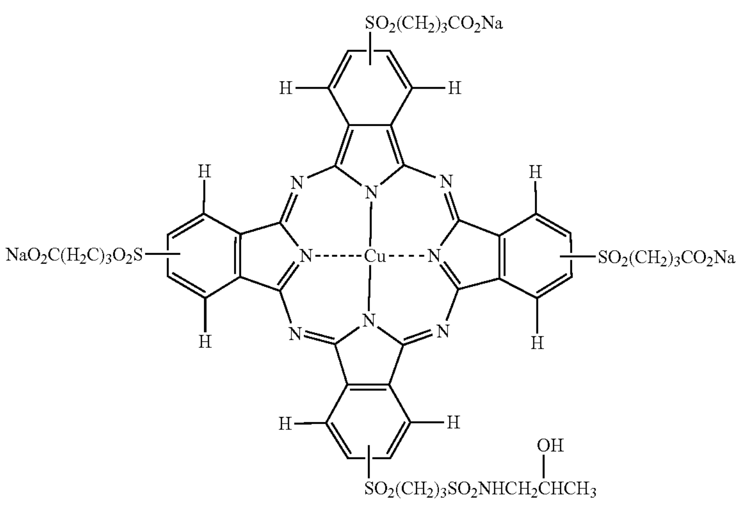

-continued
C-33
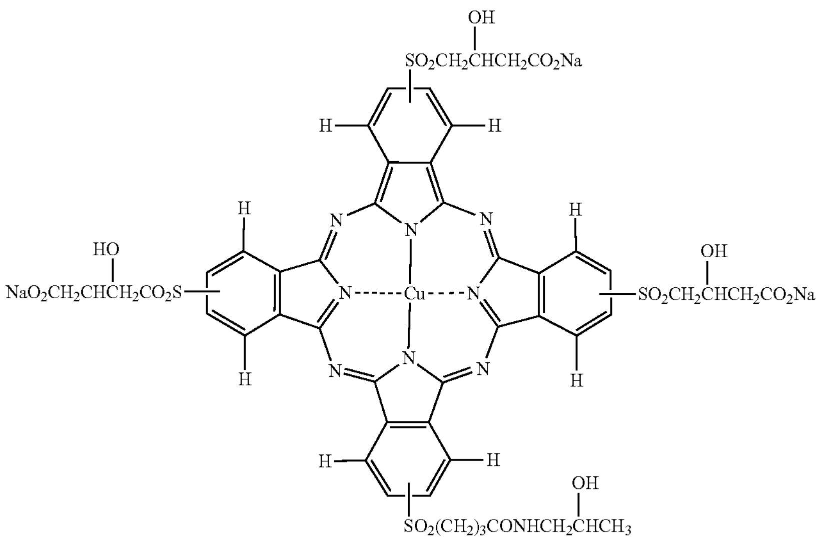
C-34
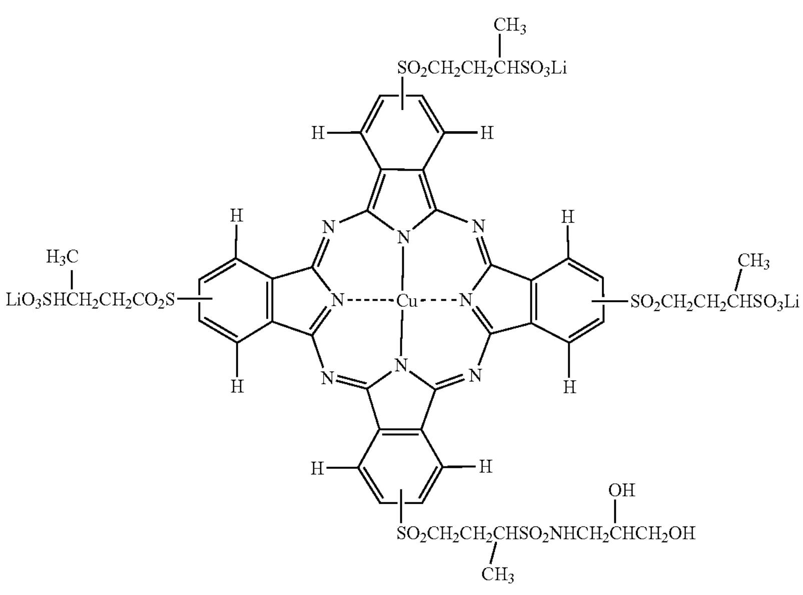

-continued
C-35
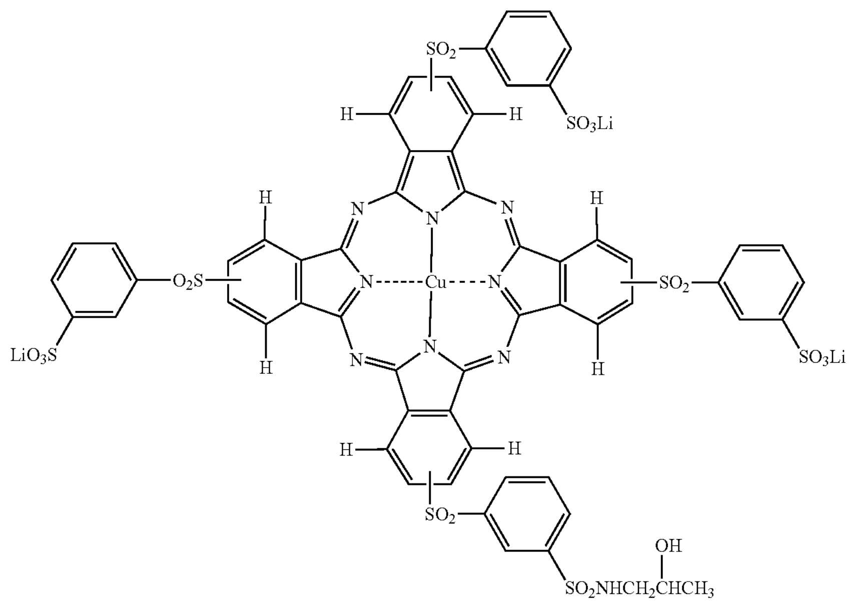
C-36
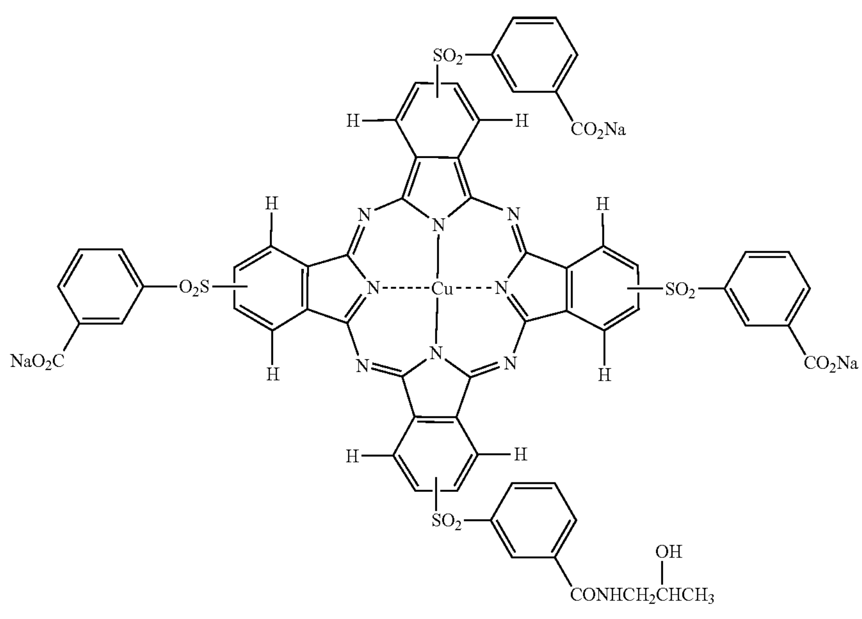

-continued
C-37
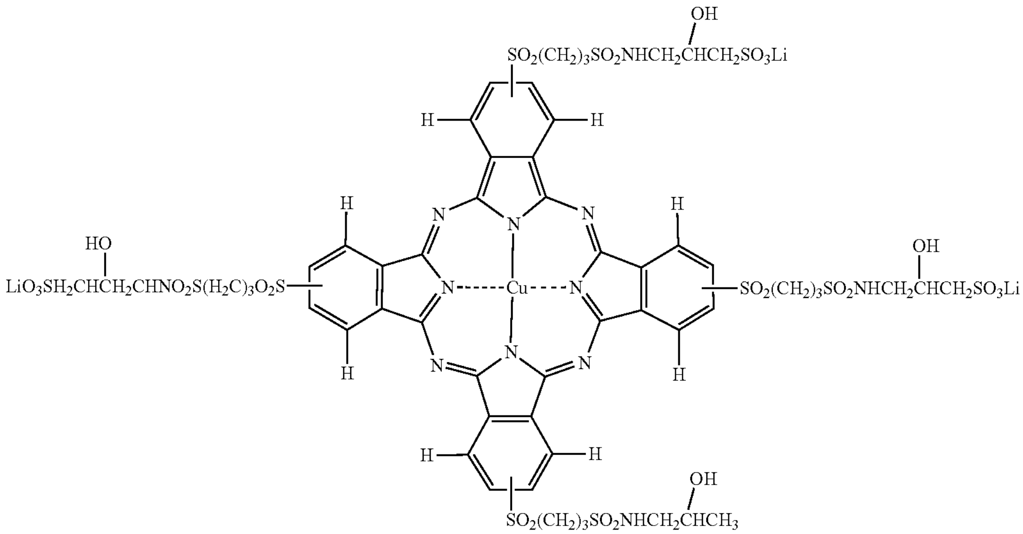
C-38
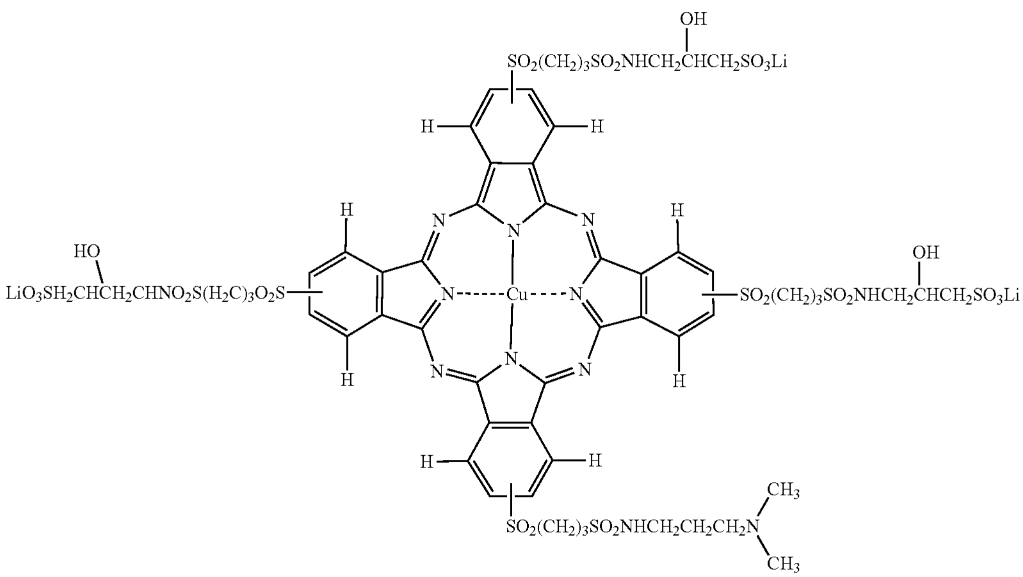
C-39
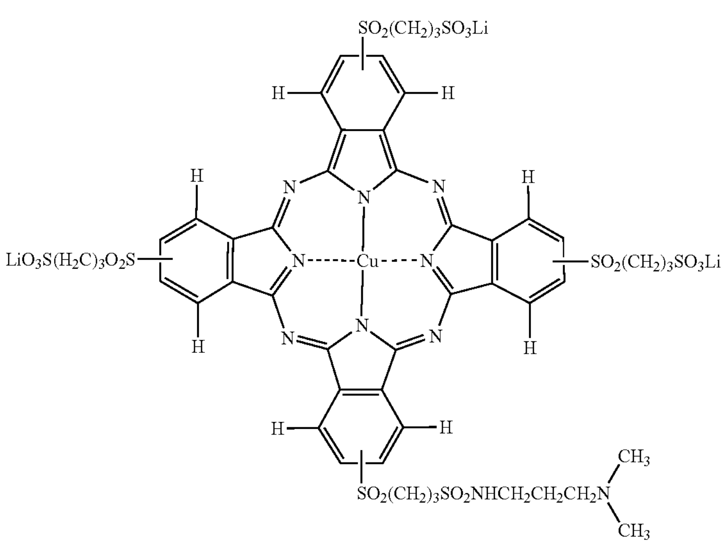

-continued
C-40
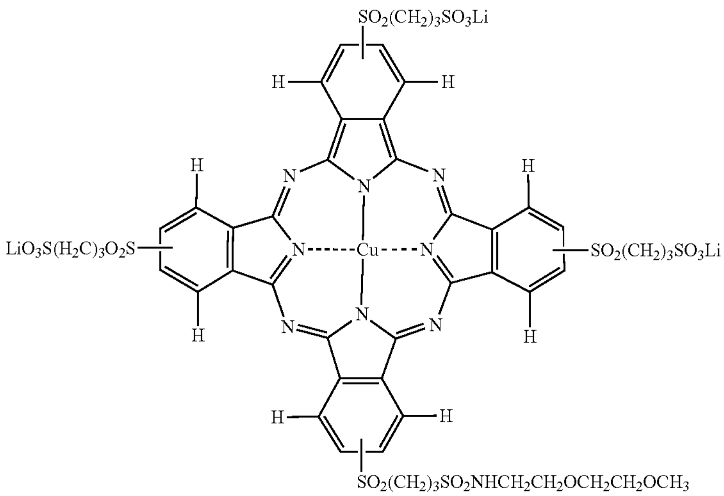
C-41
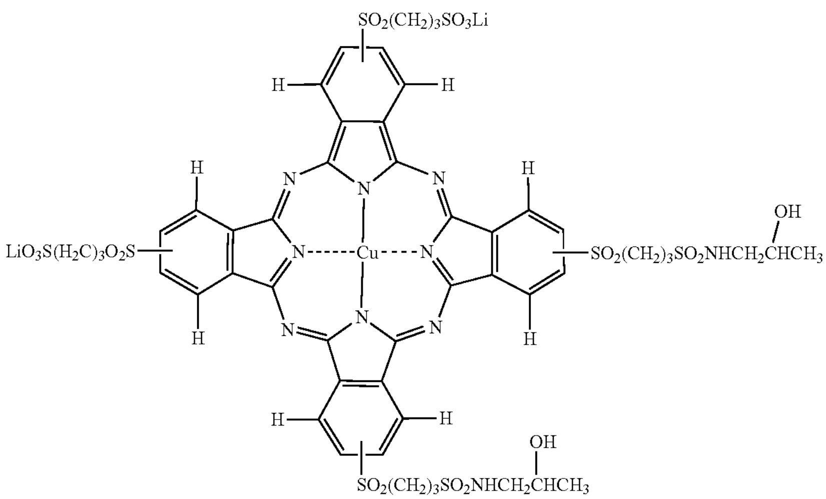
C-42
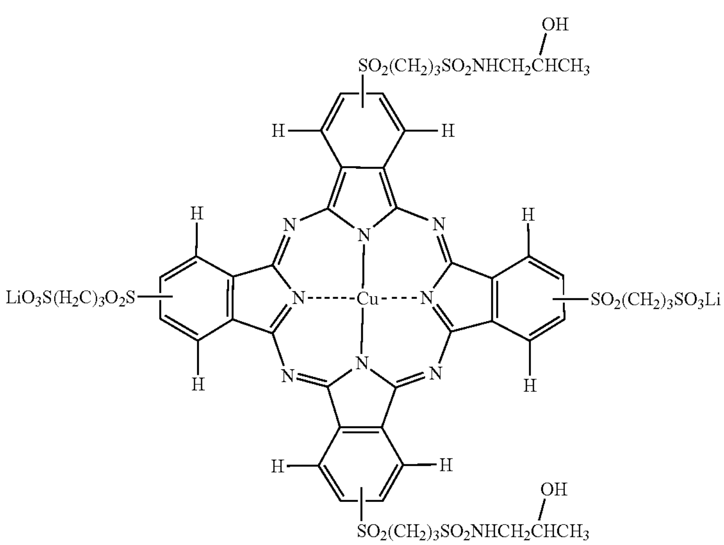

-continued
C-43
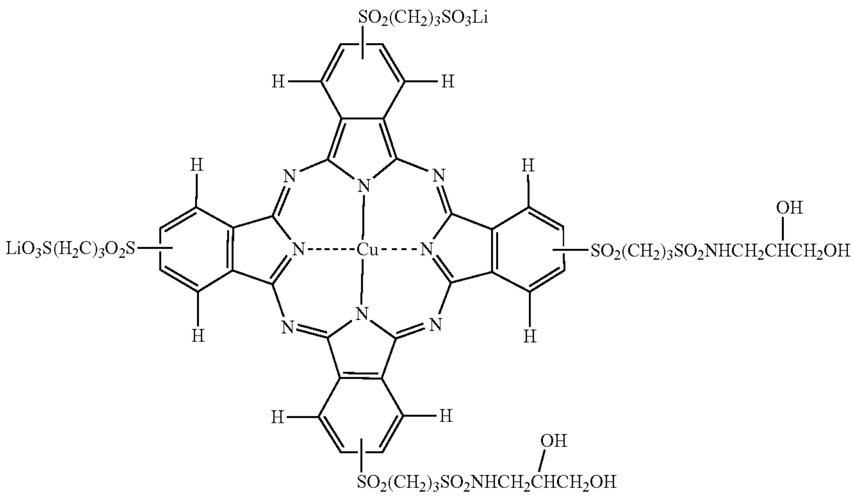
C-44
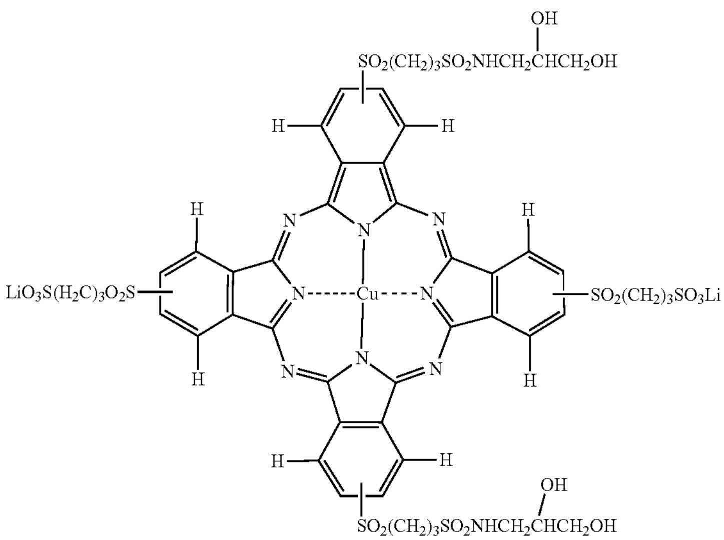
C-45
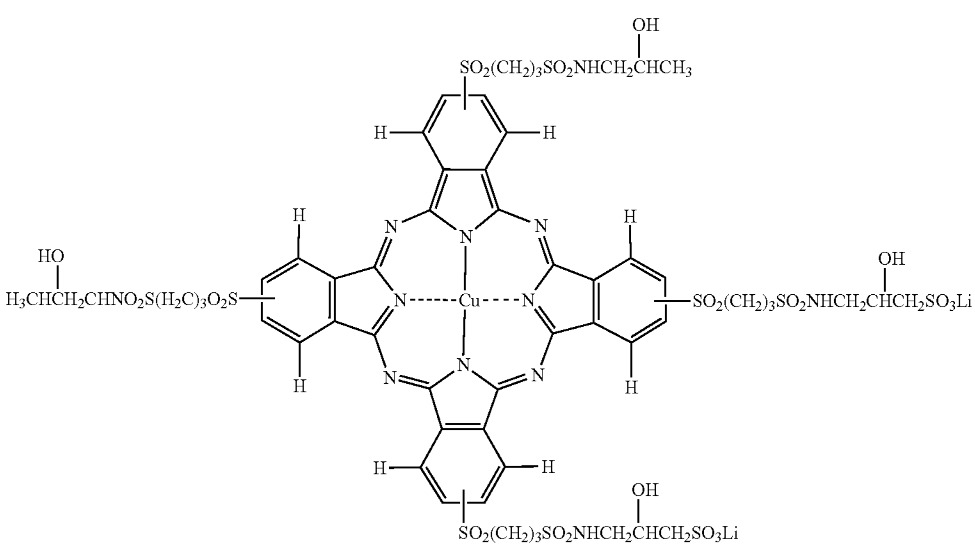

-continued
C-46
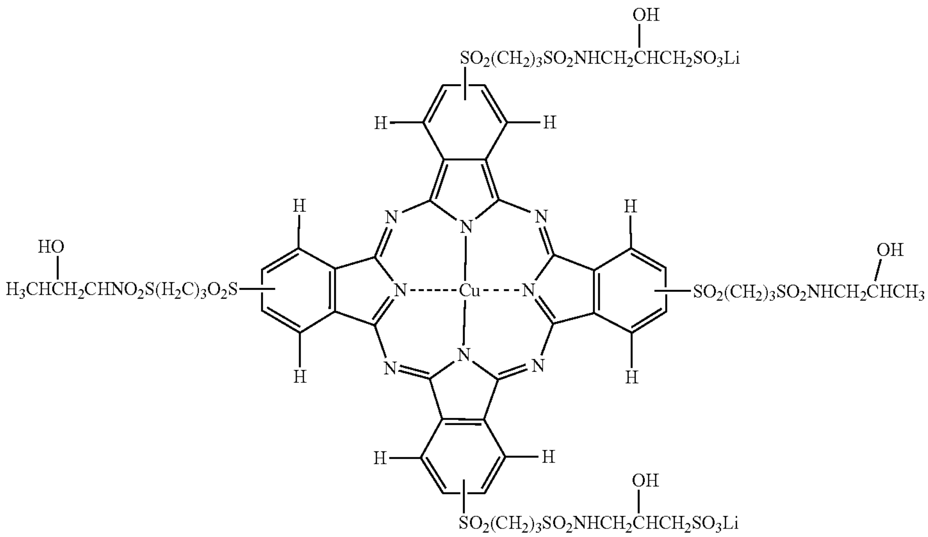
C-47
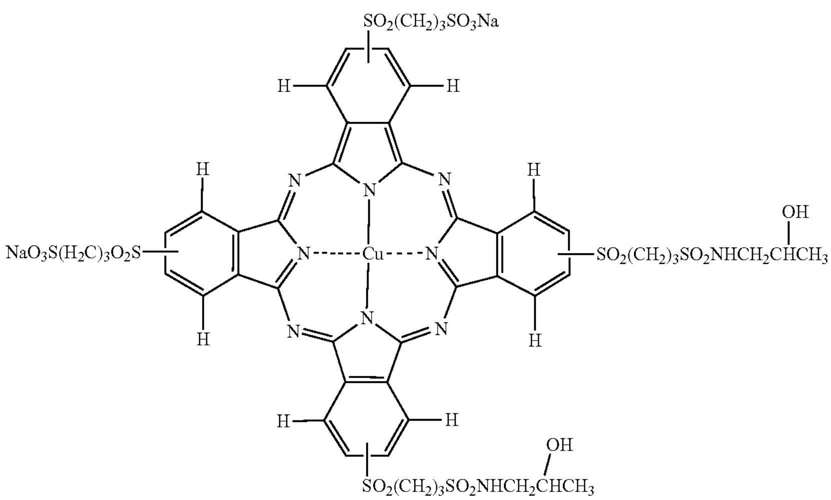
C-48
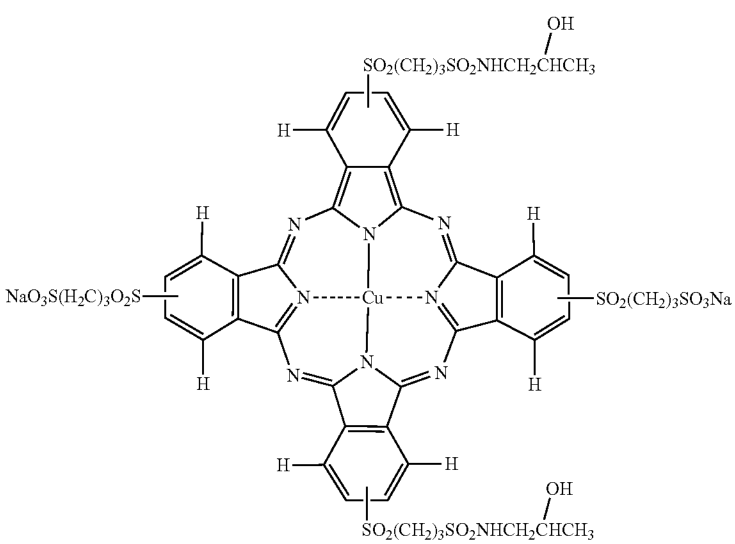

-continued
C-49
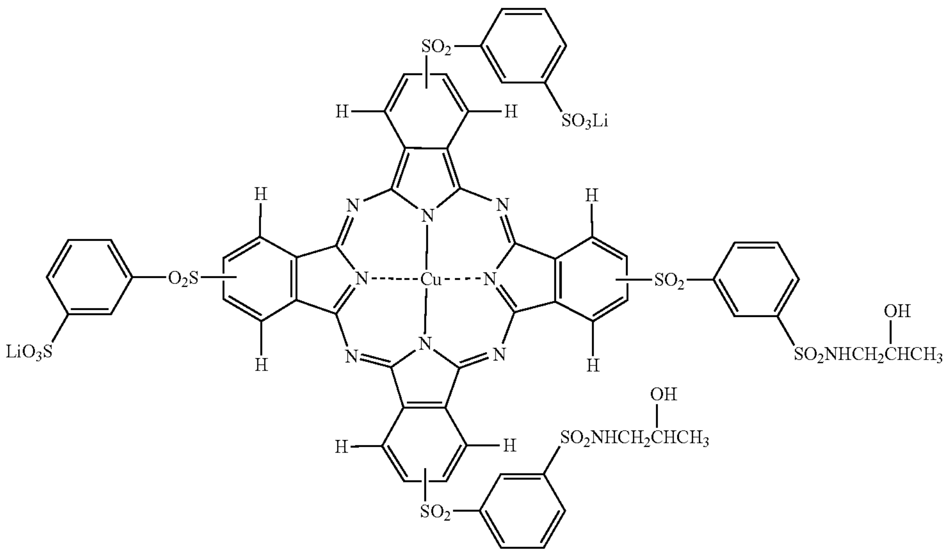
C-50
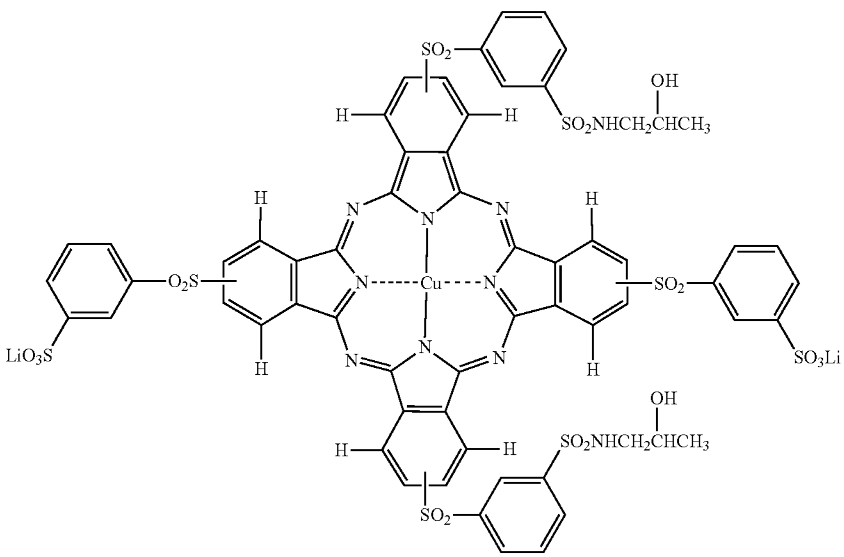
C-51
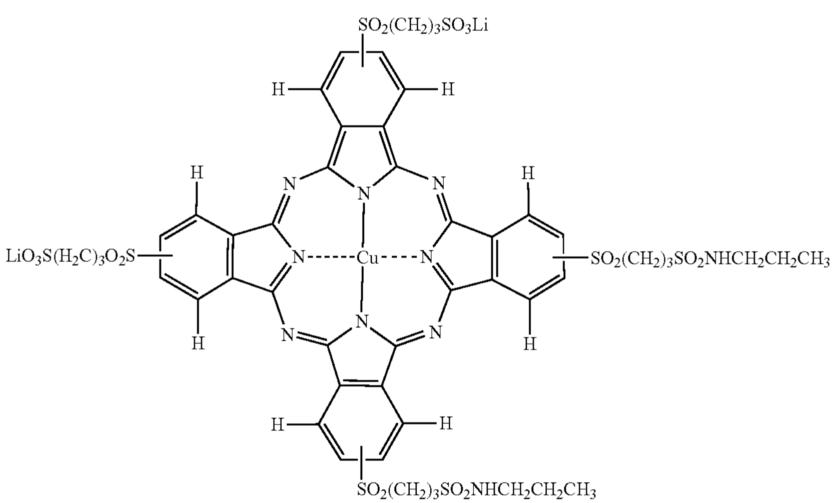

-continued
C-52
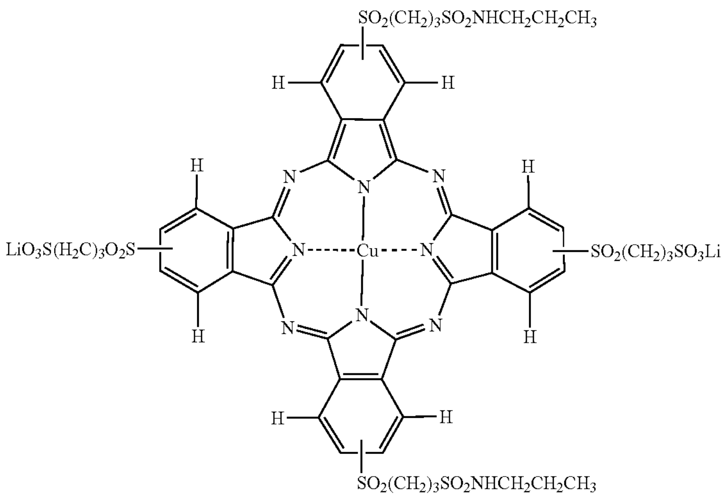
C-53
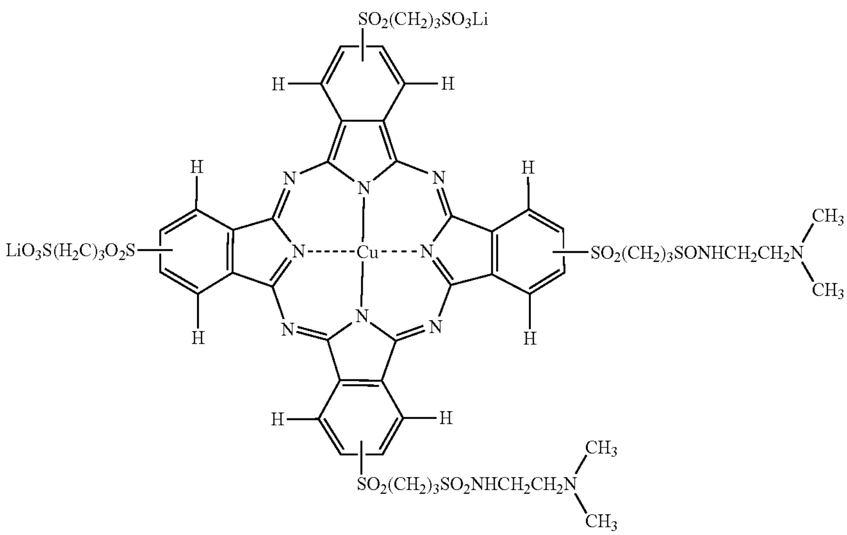
C-54
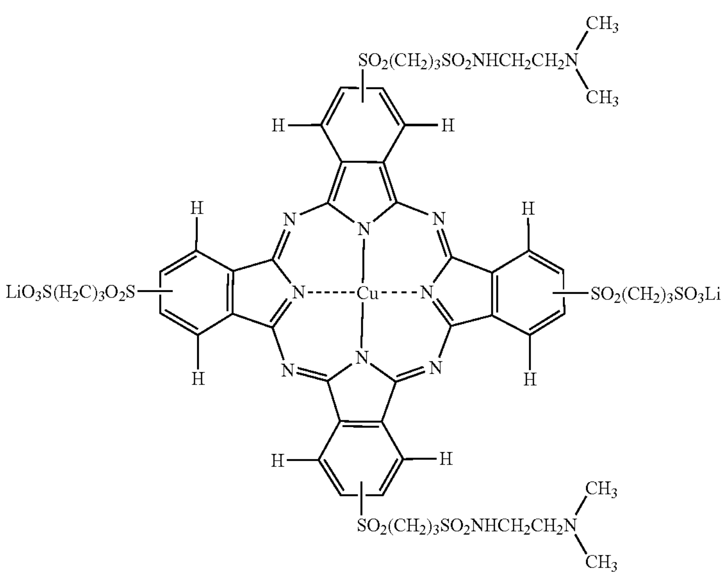

-continued
C-55
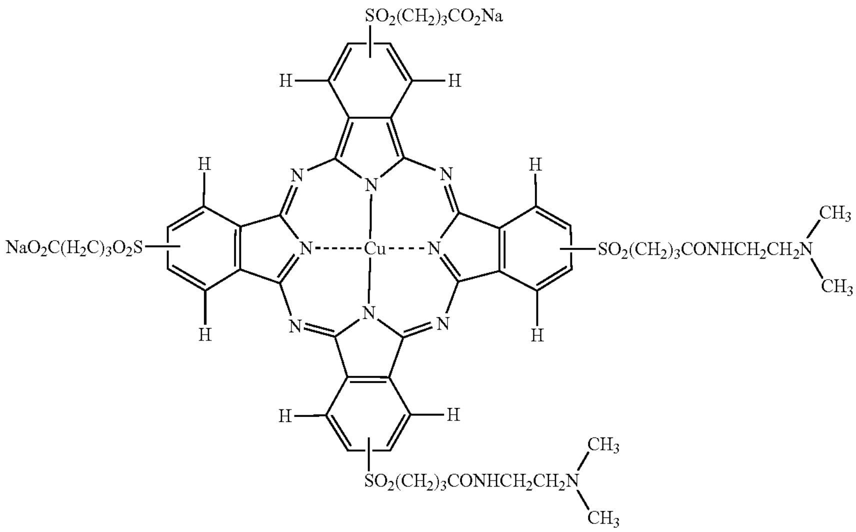
C-56
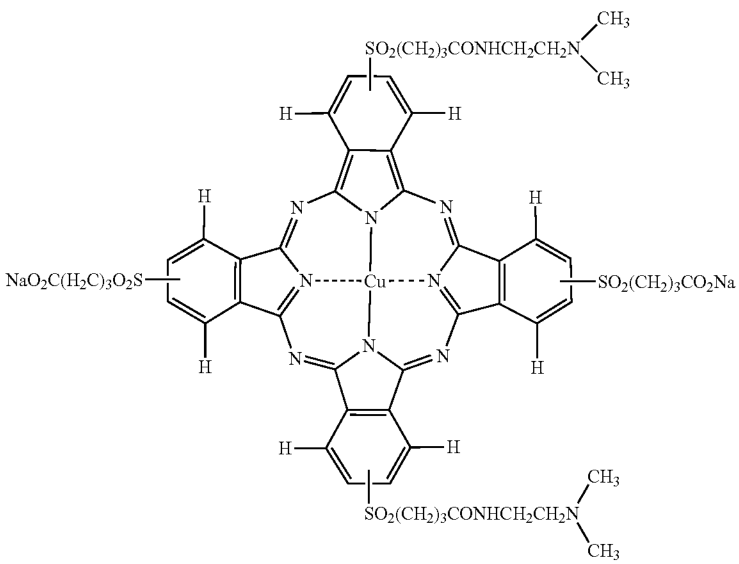
C-57
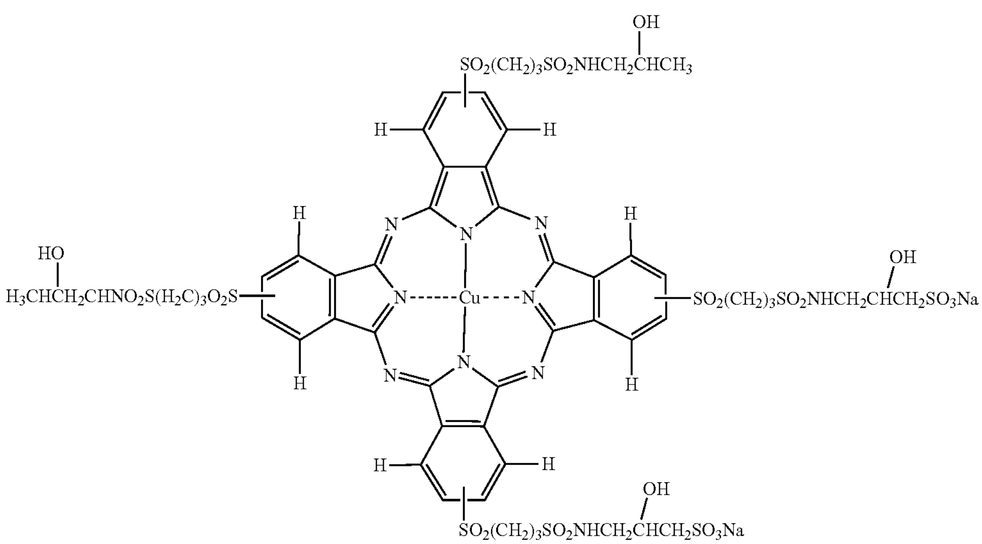

-continued
C-58
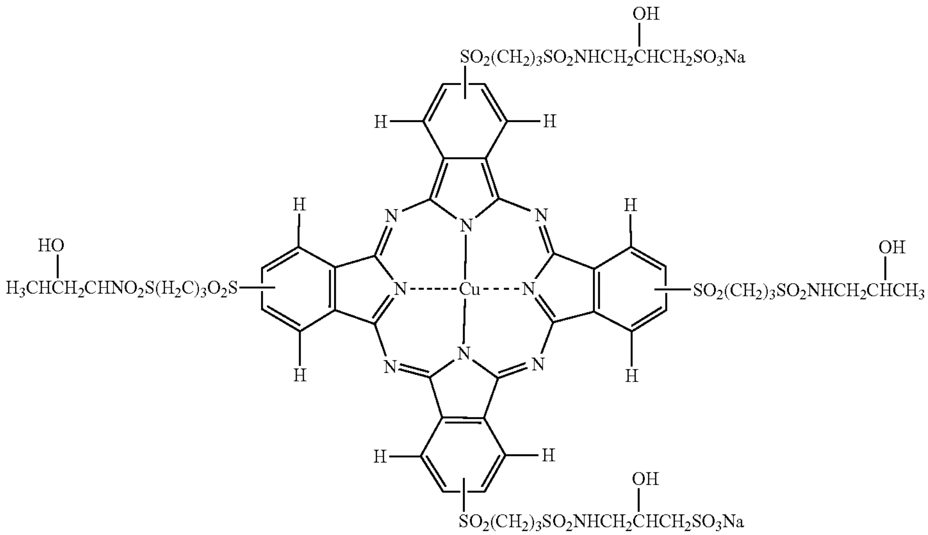
C-59
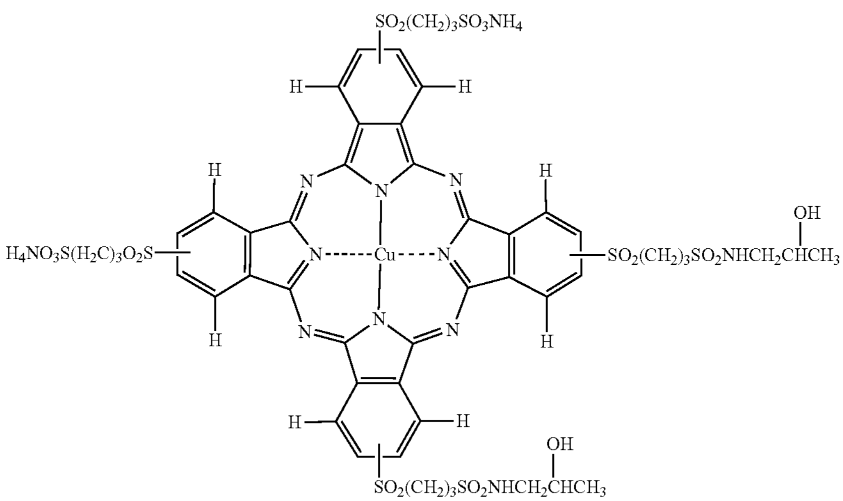
C-60
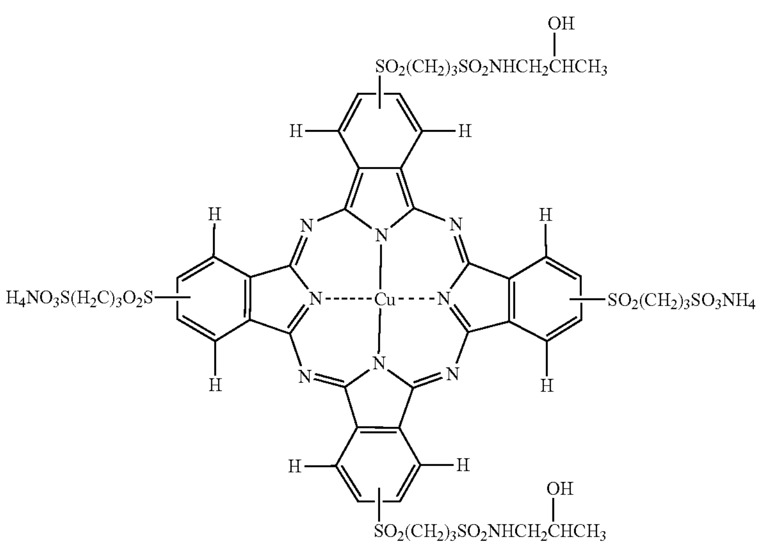

-continued
C-61
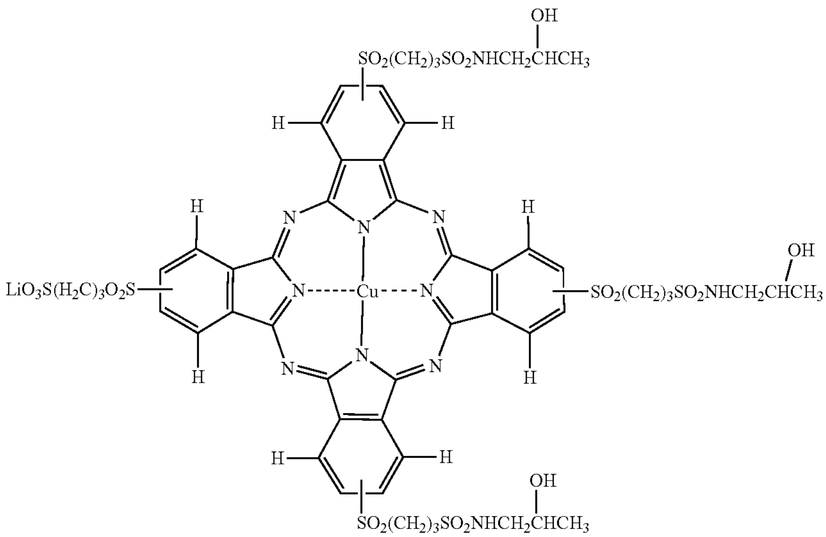
C-62
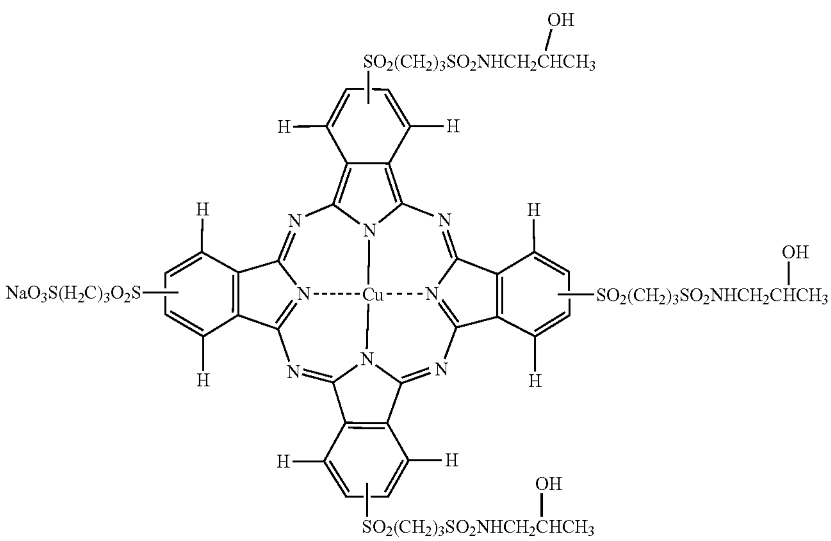
C-63
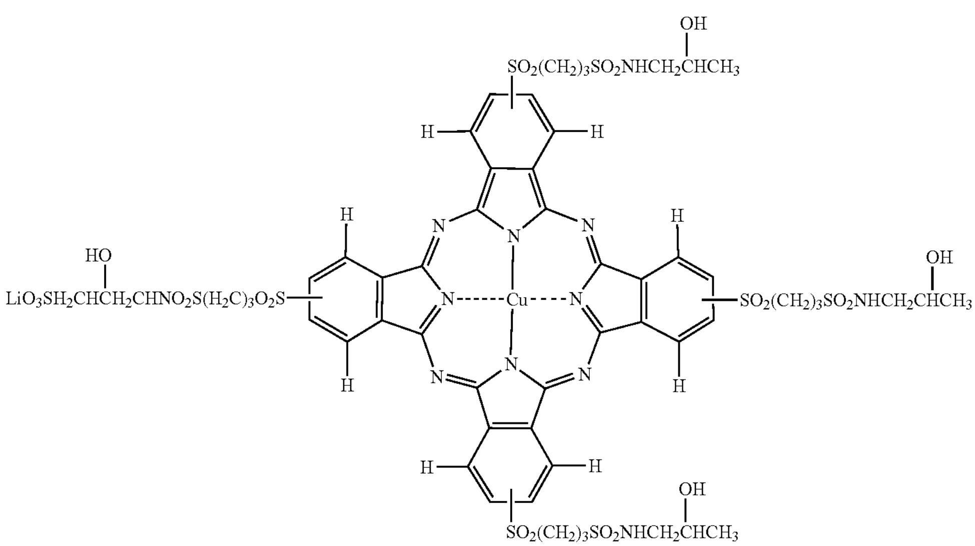

-continued
C-64
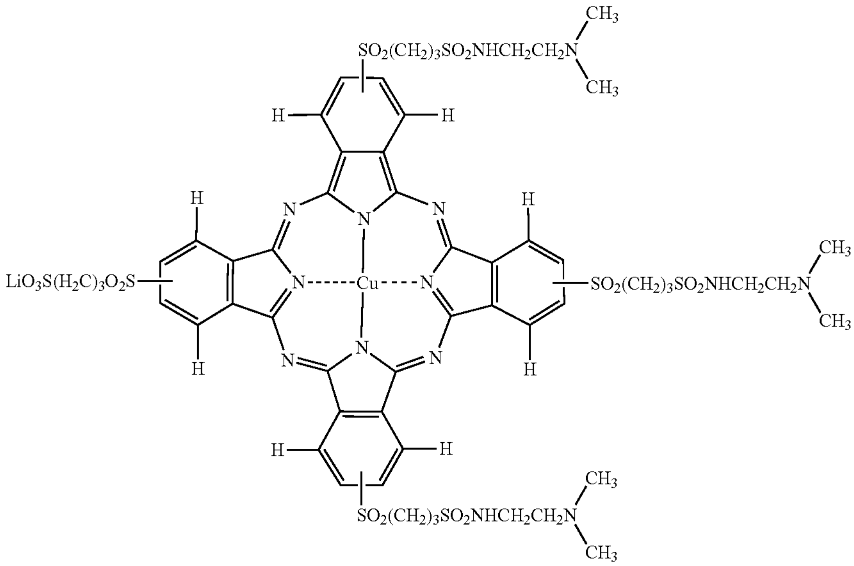
C-65
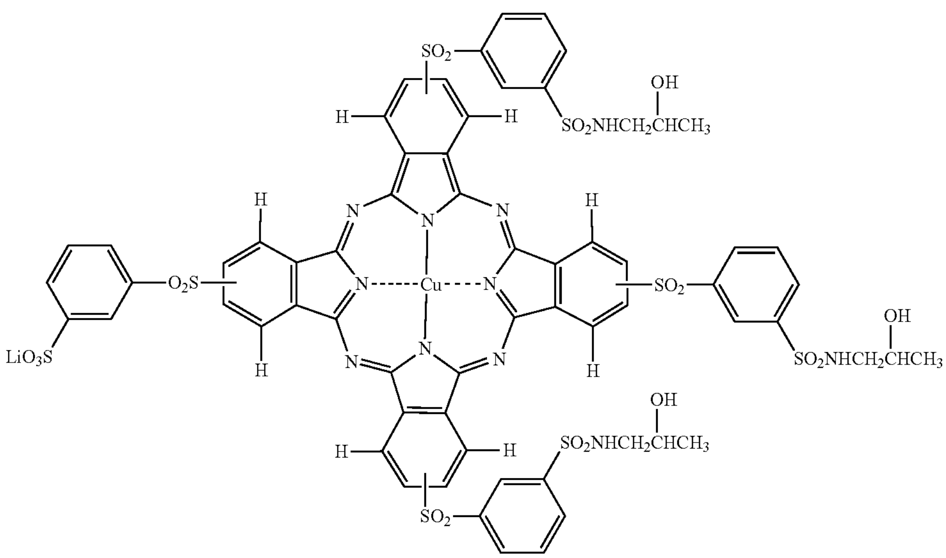
C-66
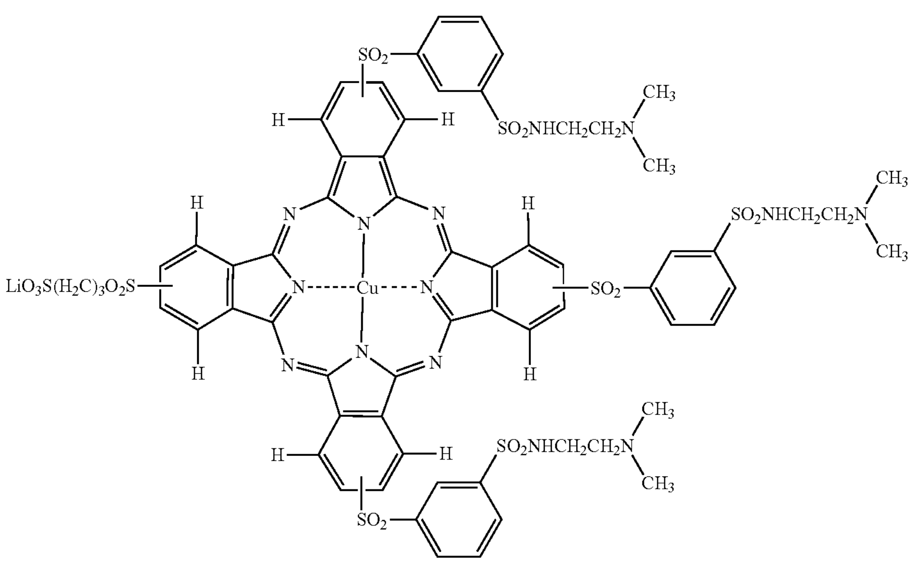

-continued
C-67
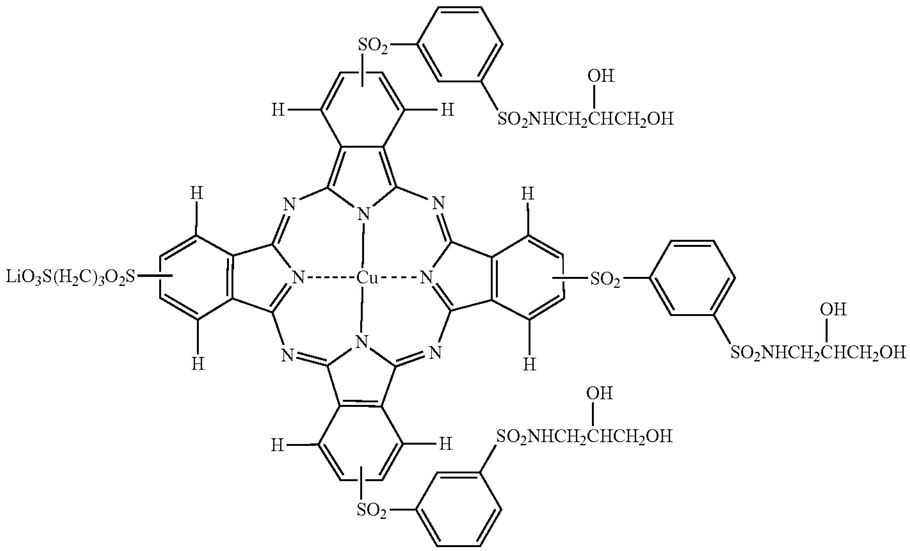
C-68
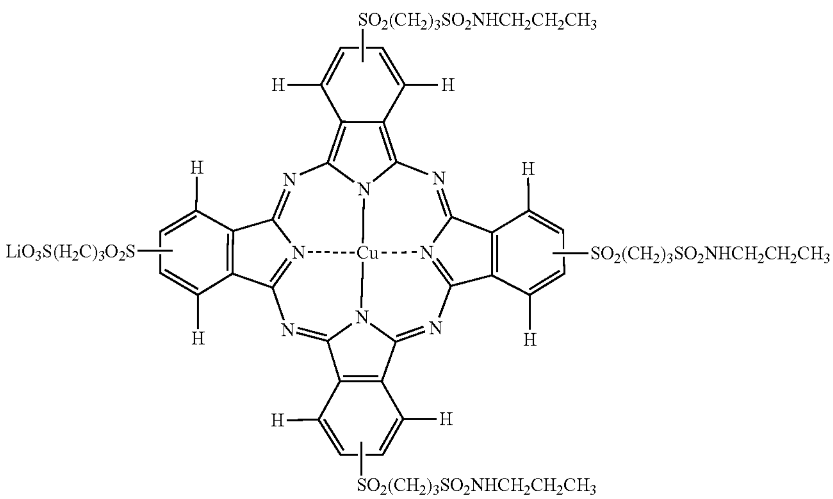
C-69
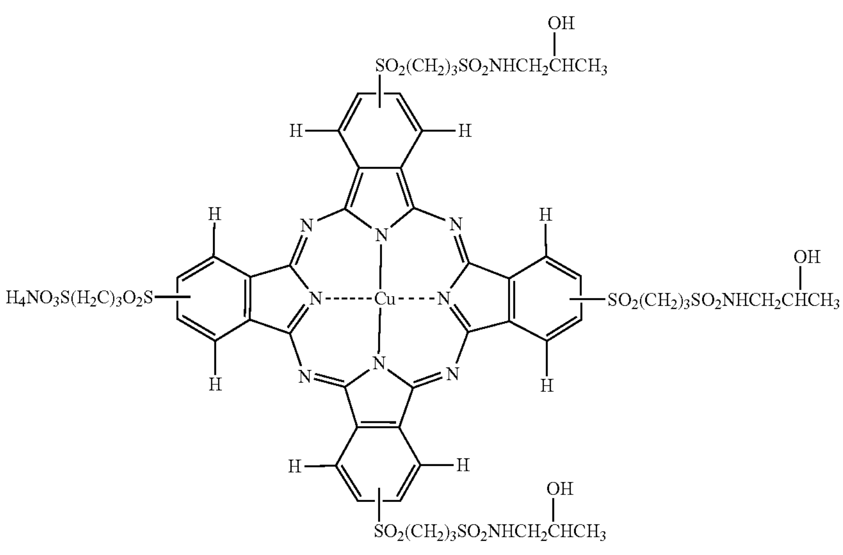

-continued
C-70
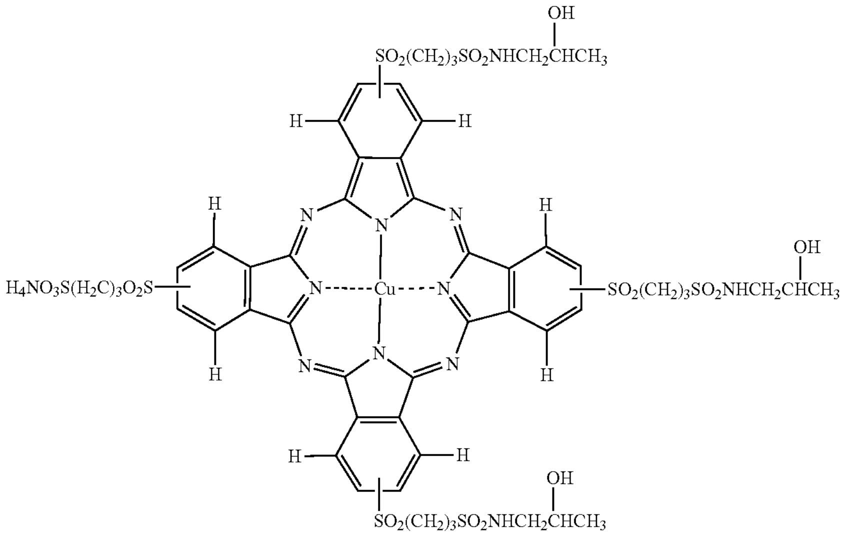
C-71
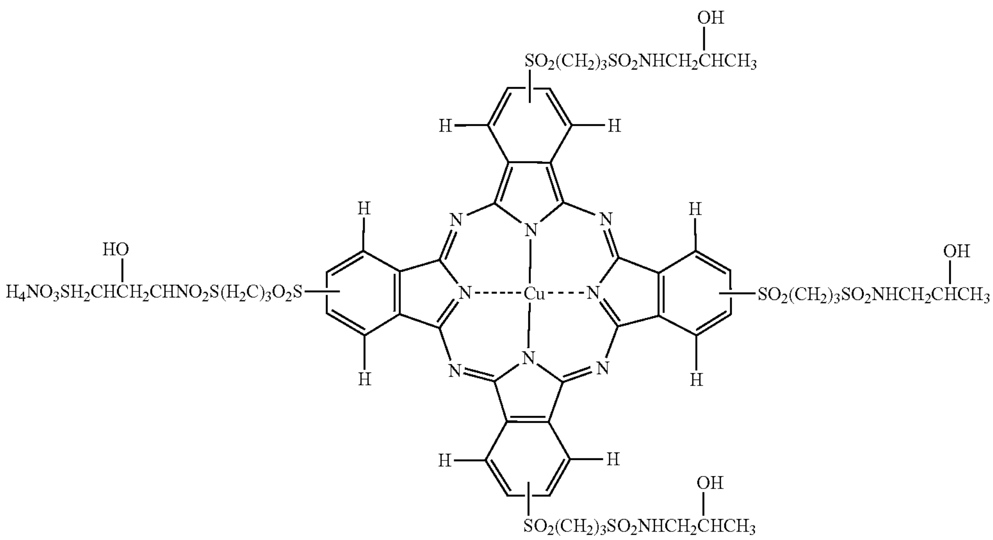
C-72
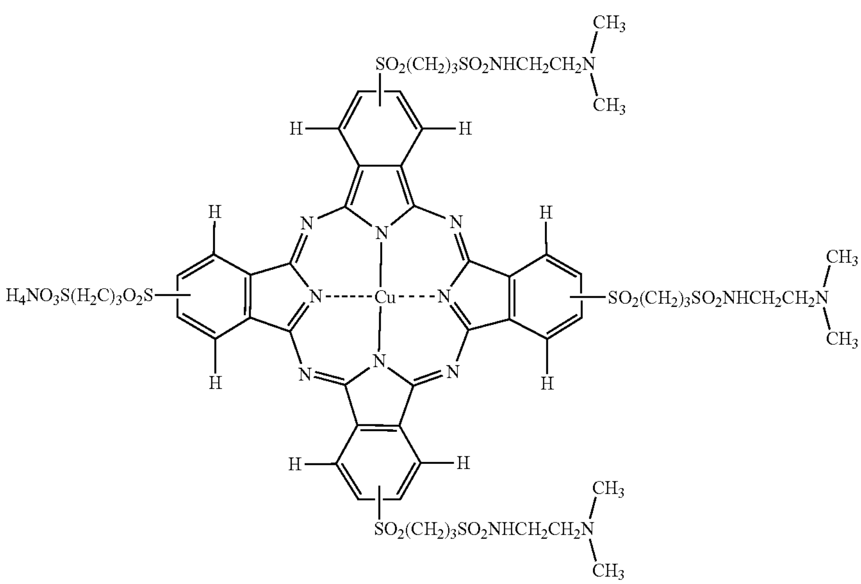

-continued
C-73
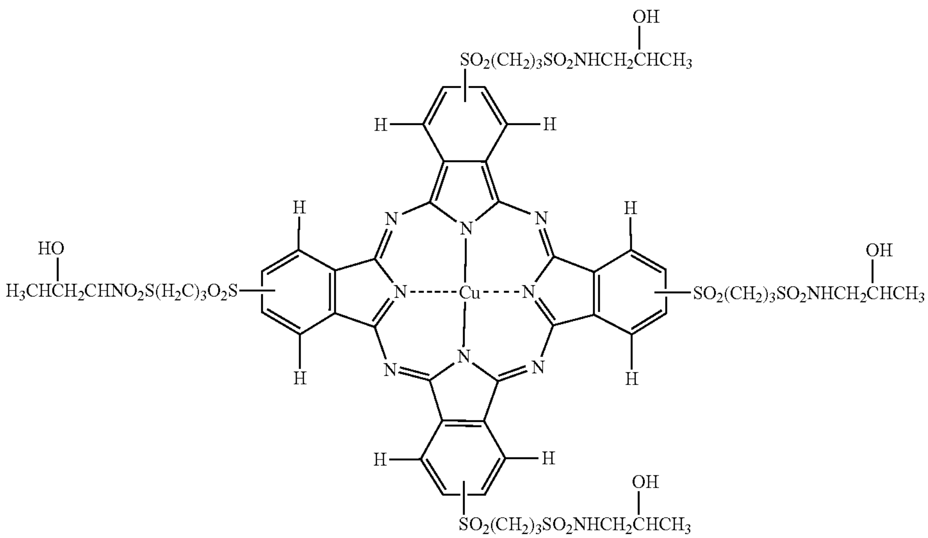
C-74
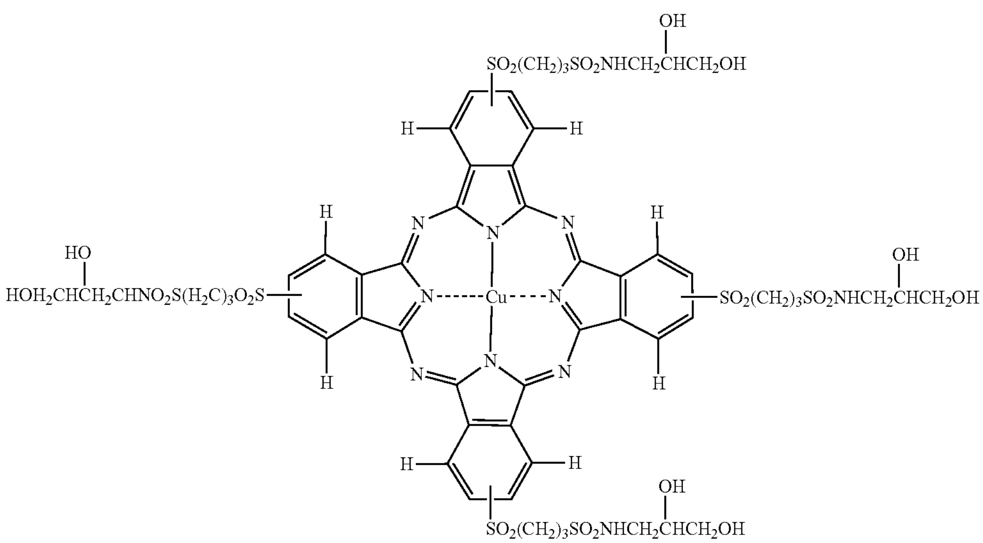
C-75
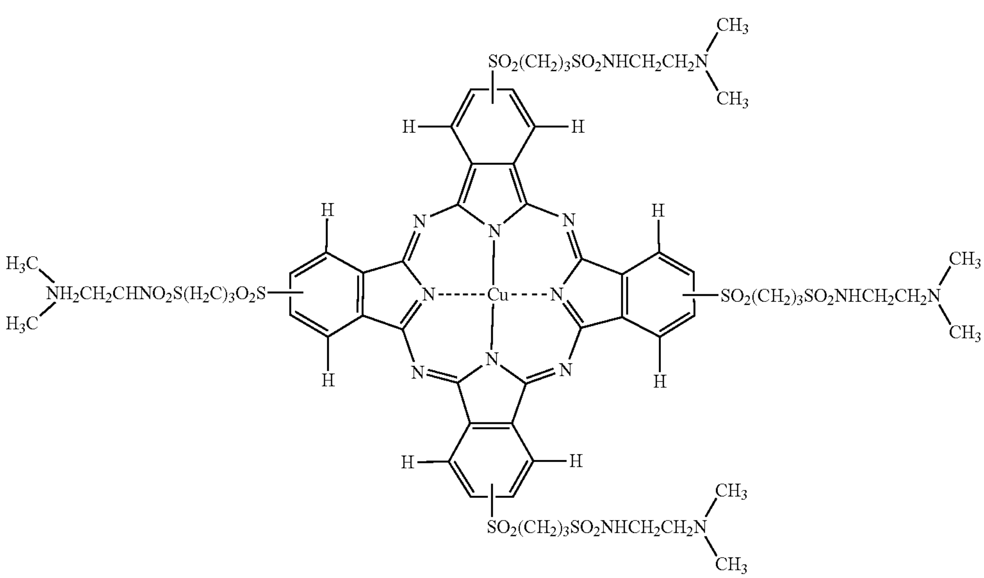

-continued
C-76
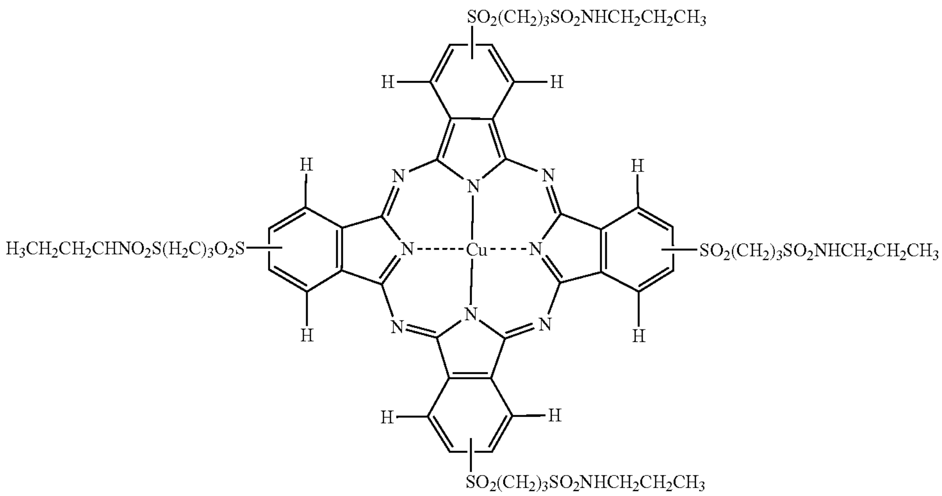
C-77
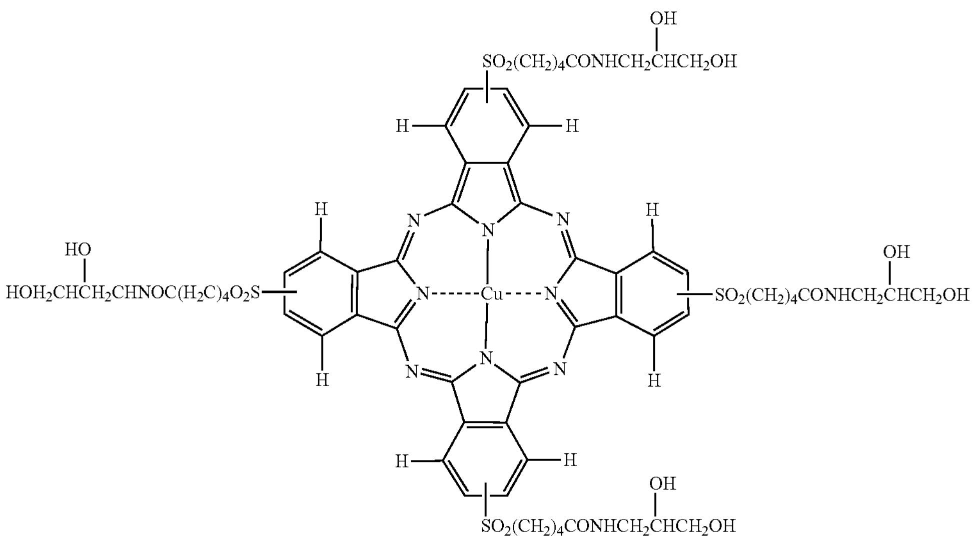
C-78
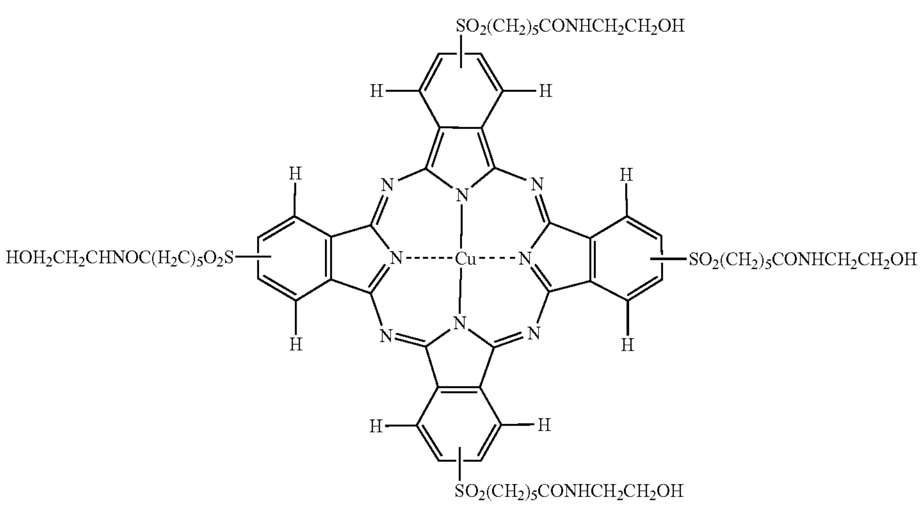

-continued
C-79
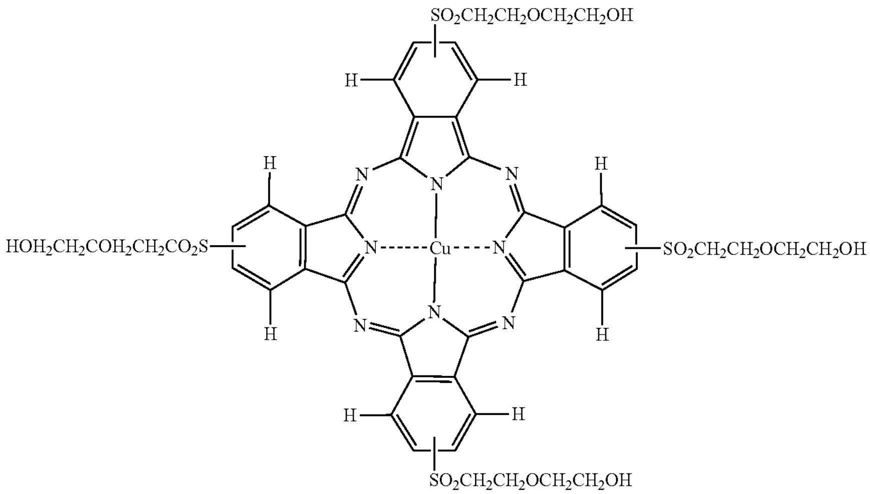
C-80
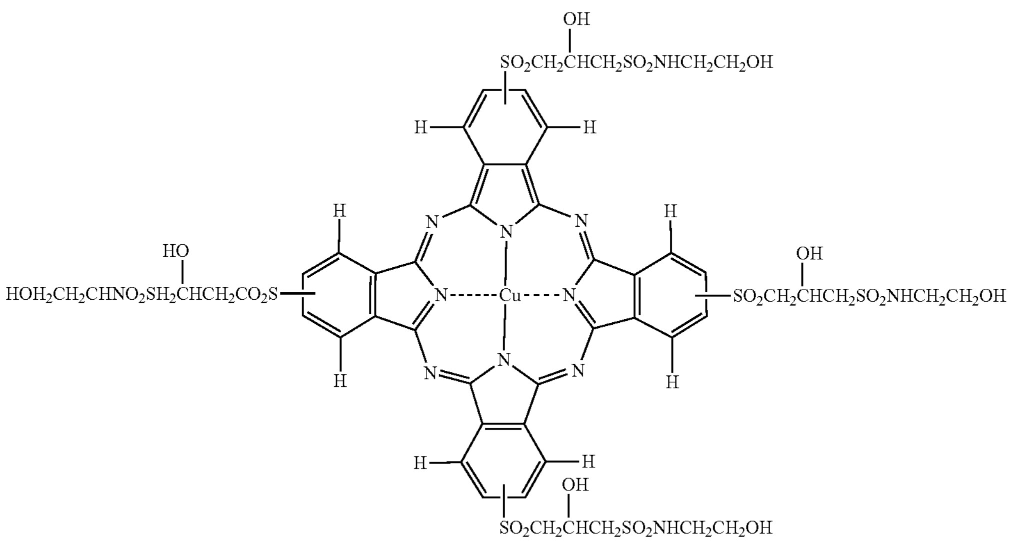
C-81
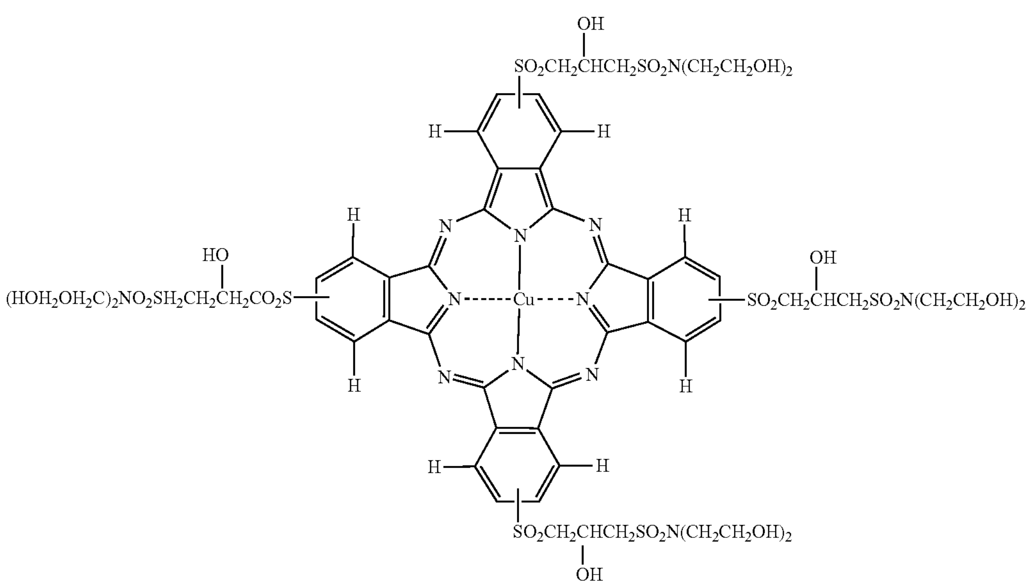

-continued
C-82
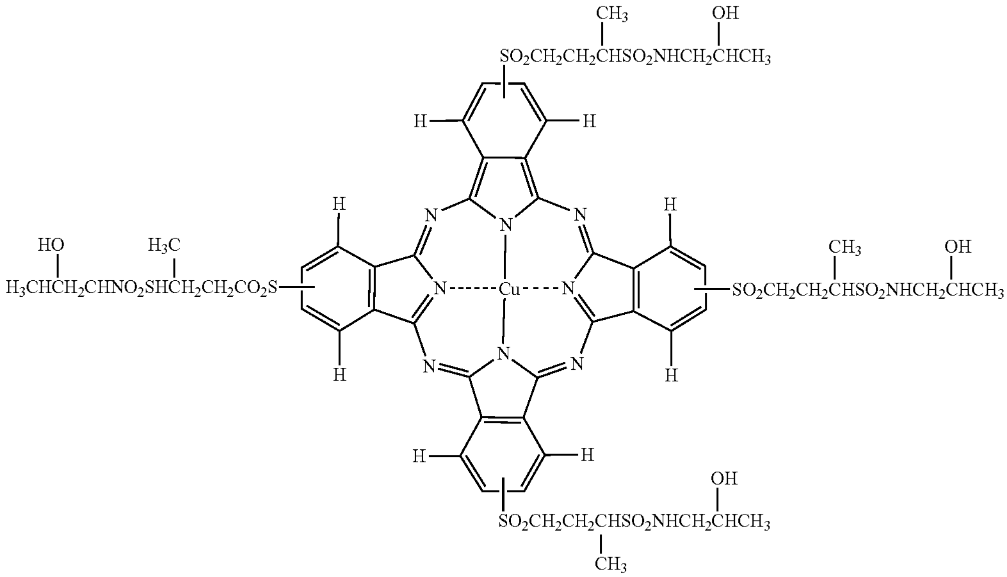
C-83
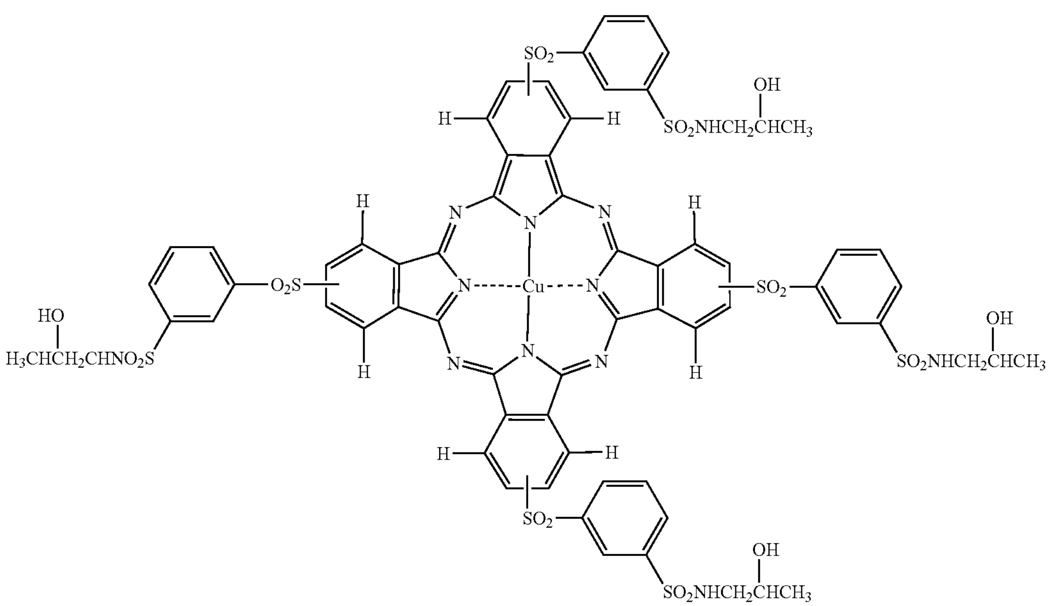

-continued

C-84

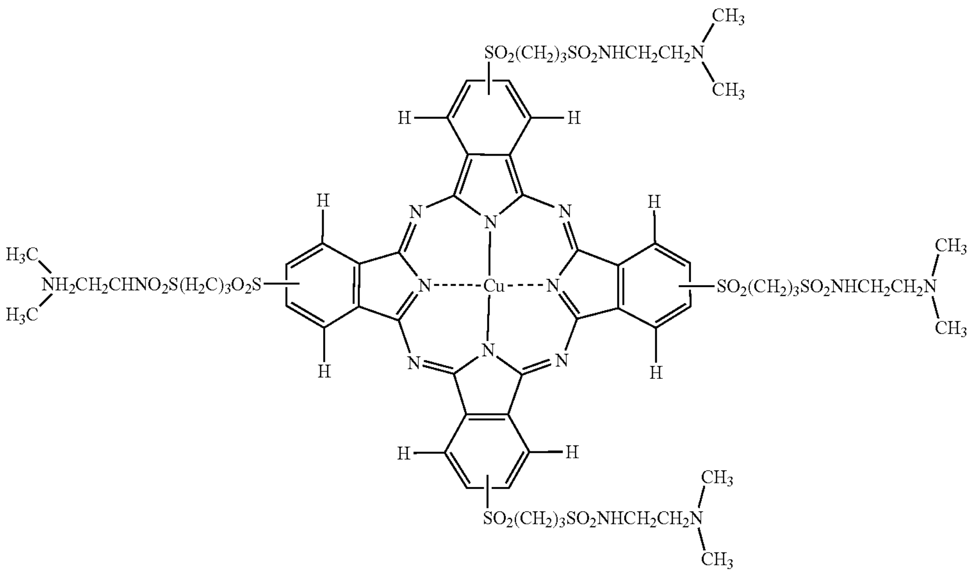

When the aqueous colorant solution according to the present invention is an aqueous colorant solution for an ink composition having a cyan color tone, the content of the colorant is preferably 5.0% to 20.0% by mass, more preferably 5.0% to 15.0% by mass, still more preferably 5.0% to 12.0% by mass, and particularly preferably 5.0% to 10.0% by mass, based on the total mass of the aqueous colorant solution. When the content of the colorant is within the above range, the intermolecular interaction among the colorant, the compound (A), and the compound (II) in the aqueous colorant solution is good, and long-term storage stability of the aqueous colorant solution is improved.

When the content of the colorant in the aqueous colorant solution for an ink composition having a cyan color tone is 5.0% by mass or more, presumably, not only is an ink composition having a light/dark cyan color tone easily prepared, but also the effect of long-term dissolution stability of the aqueous colorant solution is more easily exhibited.

On the other hand, when the content of the colorant in the aqueous colorant solution for an ink composition having a cyan color tone is 20.0% by mass or less, presumably, the concentration of solid contents in the aqueous colorant solution does not increase, and, during the storage of the aqueous colorant solution, the range of variation in liquid physical properties (in particular, dissolution stability, change in absorbance, increase and decrease in viscosity, and change in pH value) over time is small, thus improving the continuous ejection stability (reliability) of an ink composition for ink jet recording, the ink composition being prepared using the aqueous colorant solution.

When the aqueous colorant solution is an aqueous colorant solution for an ink composition having a light cyan color tone, the content of the colorant is preferably 5.0% to 20.0% by mass, more preferably 5.0% to 15.0% by mass, still more preferably 8.0% to 12.0% by mass, and particularly preferably 8.0% to 10.0% by mass, based on the total mass of the aqueous colorant solution. When the content of the colorant is within the above range, the intermolecular interaction among the colorant, the compound (A), and the compound (II) in the aqueous colorant solution is good, and storage stability of the aqueous colorant solution is improved.

When the aqueous colorant solution is an aqueous colorant solution for an ink composition having a dark cyan color tone, the content of the colorant is preferably 5.0% to 20.0% by mass, more preferably 8.0% to 15.0% by mass, still more preferably 10.0% to 15.0% by mass, and particularly preferably 10.0% to 12.0% by mass, based on the total mass of the aqueous colorant solution. When the content of the colorant is within the above range, the intermolecular interaction among the colorant, the compound (A), and the compound (II) in the aqueous colorant solution is good, and storage stability of the aqueous colorant solution is improved.

Aqueous Colorant Solution for Ink Composition Having Gray/Black Color Tone

When the aqueous colorant solution according to the present invention is an aqueous colorant solution for an ink composition having a gray color tone or an aqueous colorant solution for an ink composition having a black color tone (also collectively referred to as an "aqueous colorant solution for an ink composition having a gray/black color tone"), the colorant is preferably, for example, a colorant (gray dye or black dye) represented by general formula (I) described in JP2020-76048A.

Specific examples of preferred gray dyes or black dyes include, but are not limited to, the following.

Exemplary compound I-1
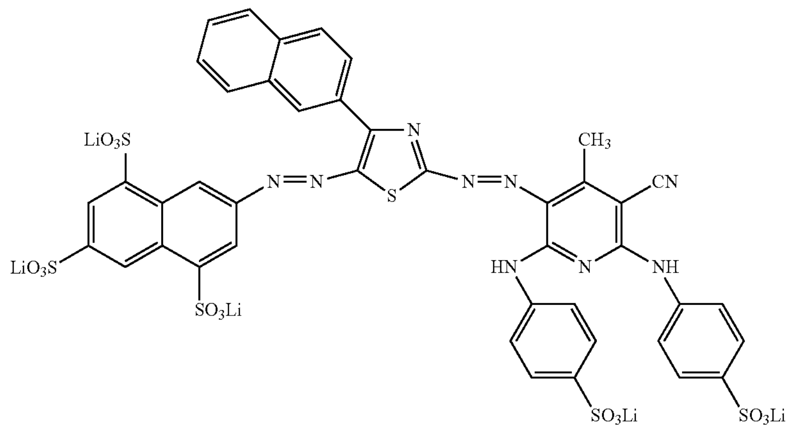
Exemplary compound I-2
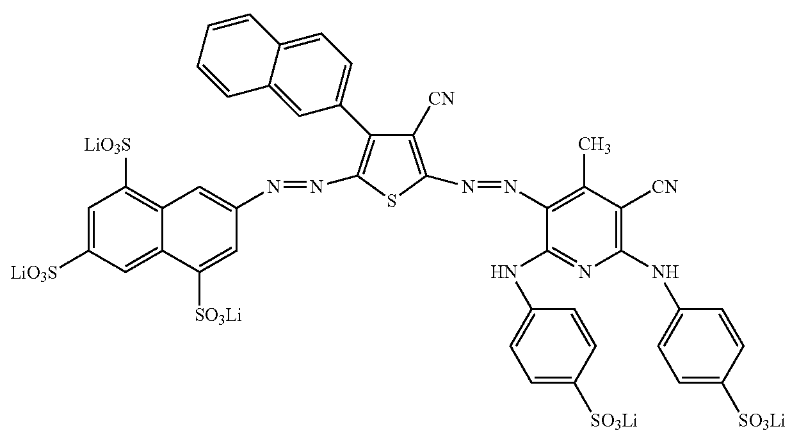
Exemplary compound I-3
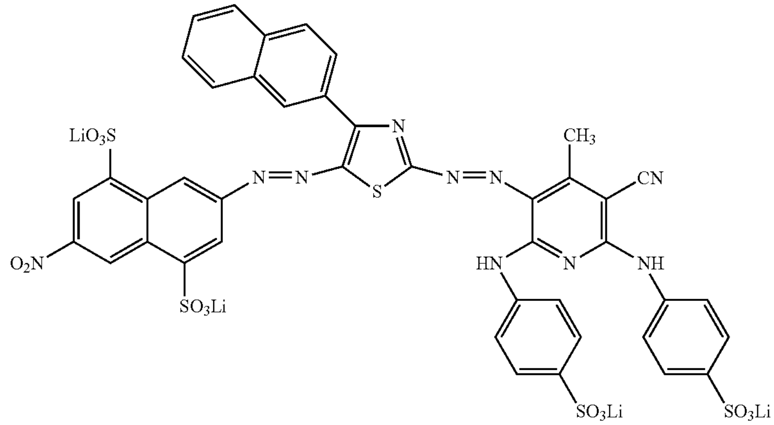

-continued
Exemplary compound I-4
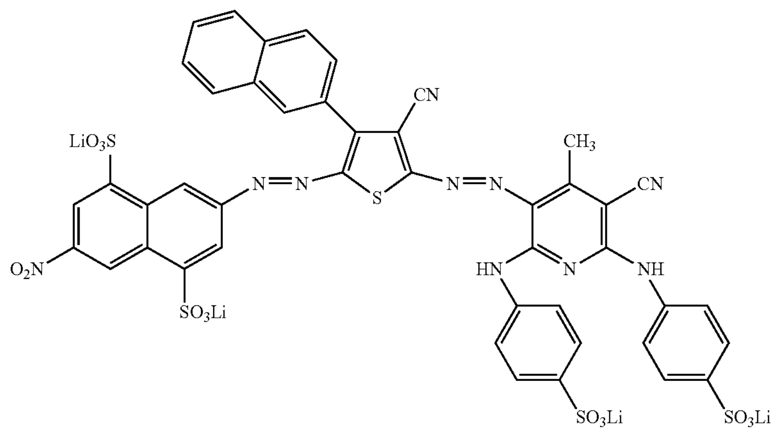
Exemplary compound I-5
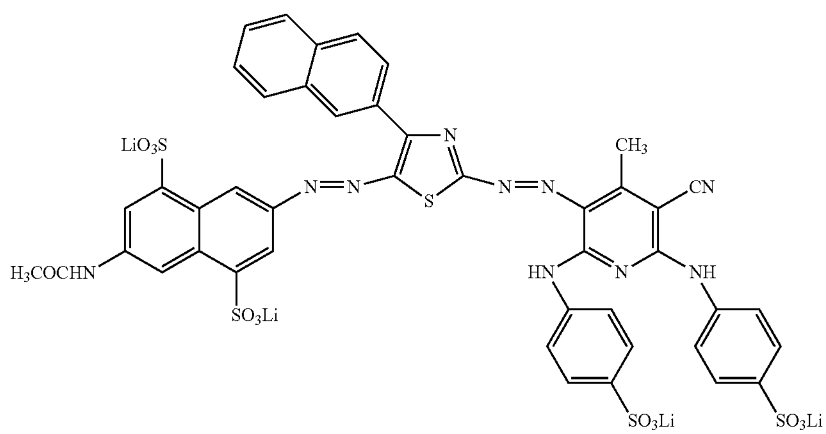
Exemplary compound I-6
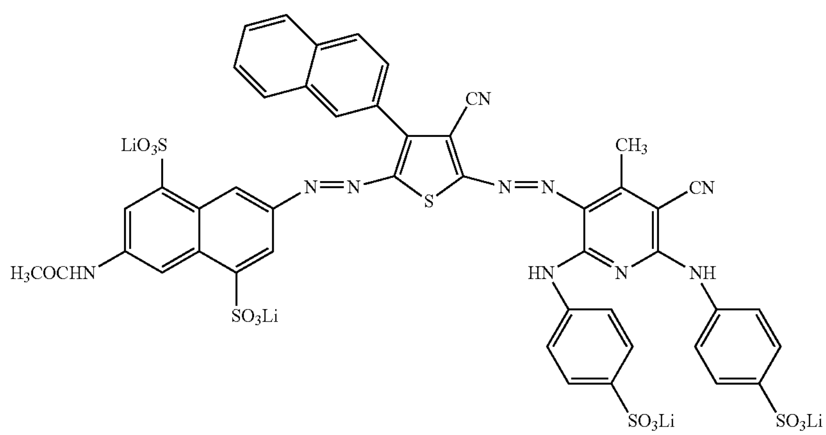

-continued
Exemplary compound I-7
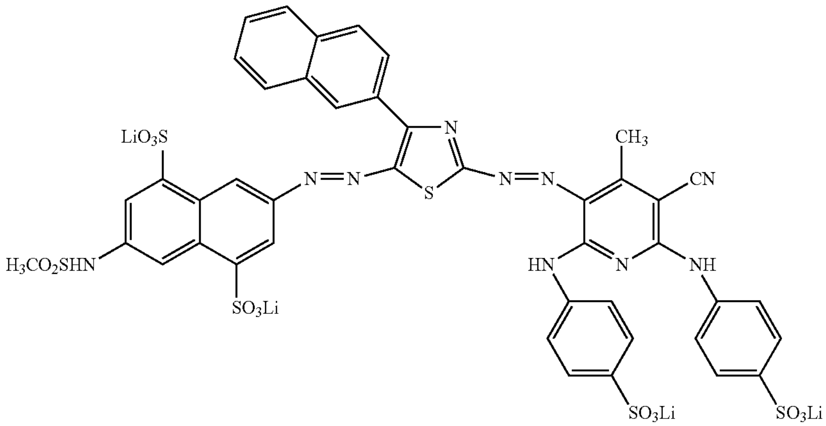
Exemplary compound I-8
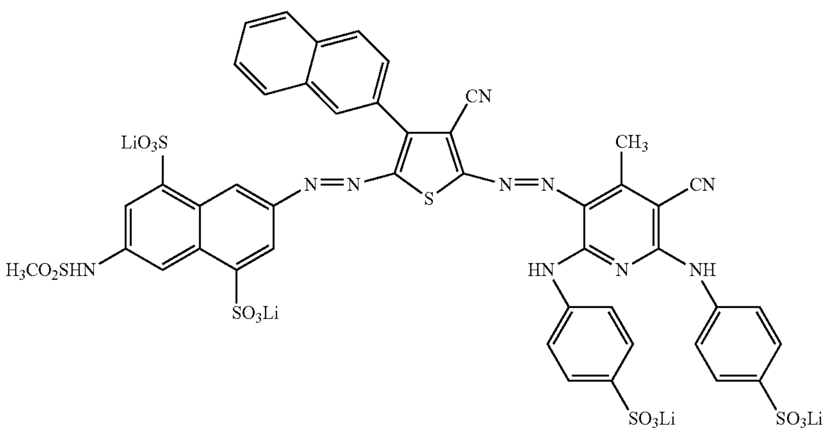
Exemplary compound I-9
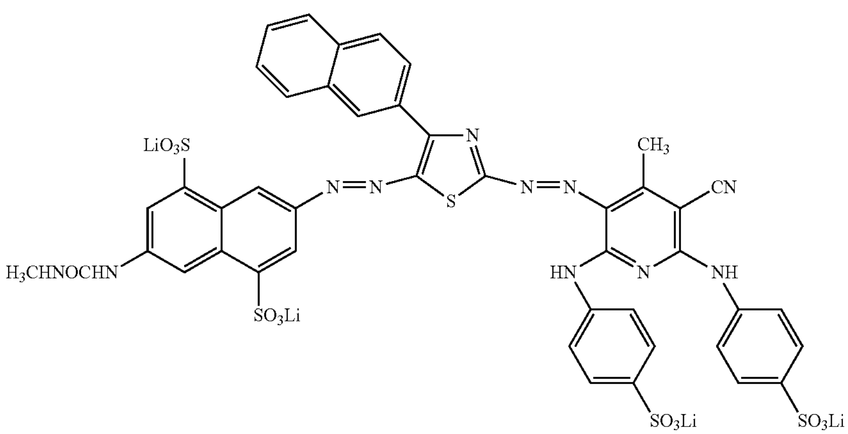

-continued
Exemplary compound I-10
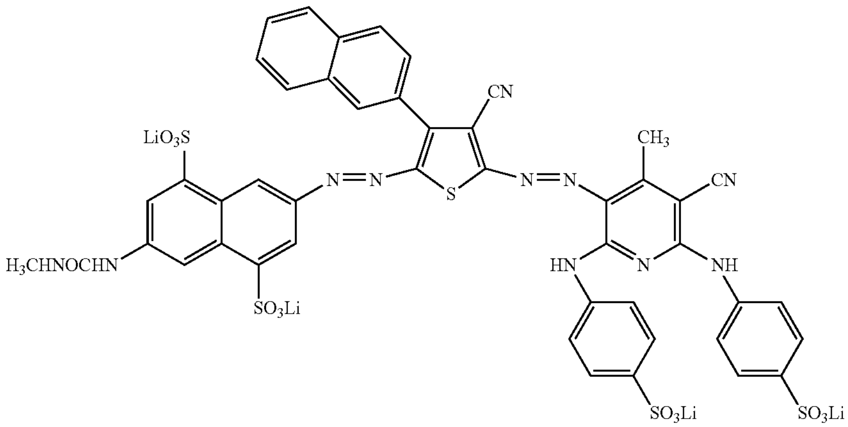
Exemplary compound I-11
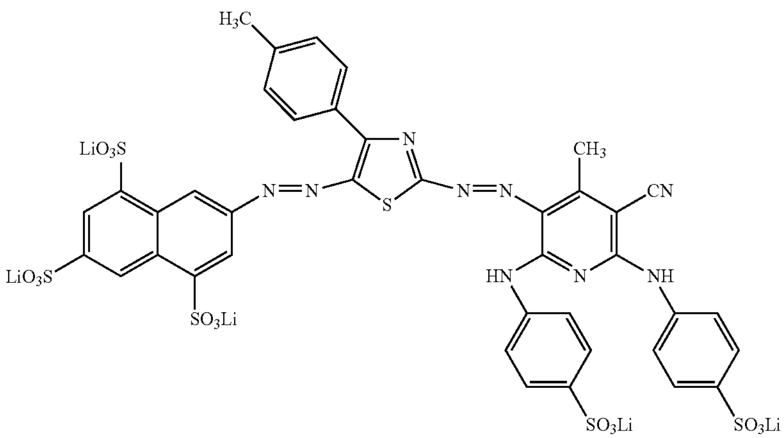
Exemplary compound I-12
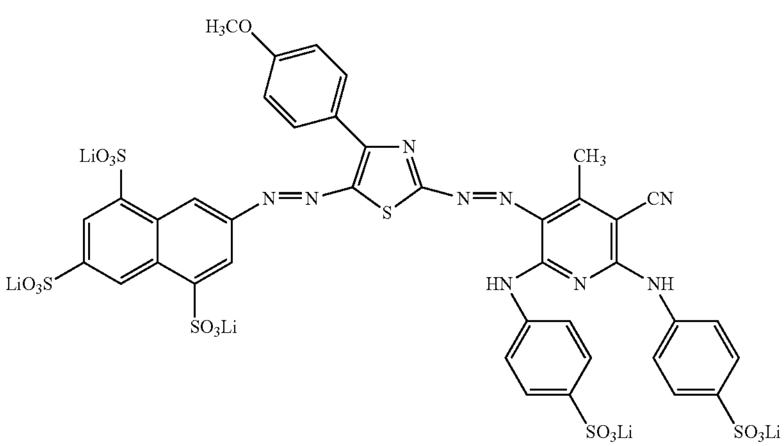

-continued
Exemplary compound I-13
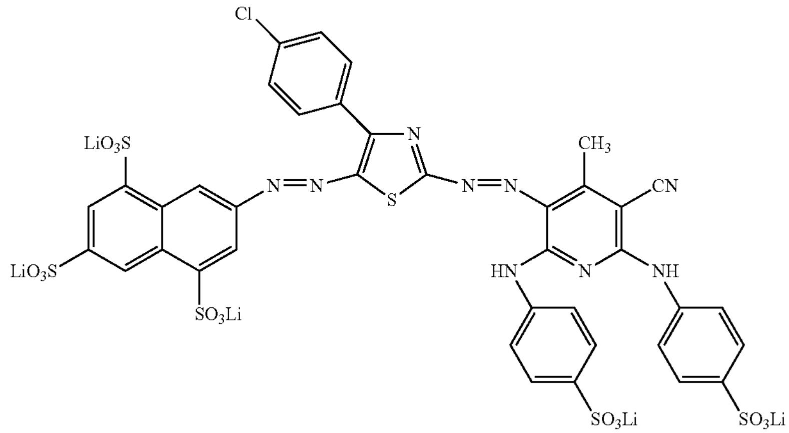
Exemplary compound I-14
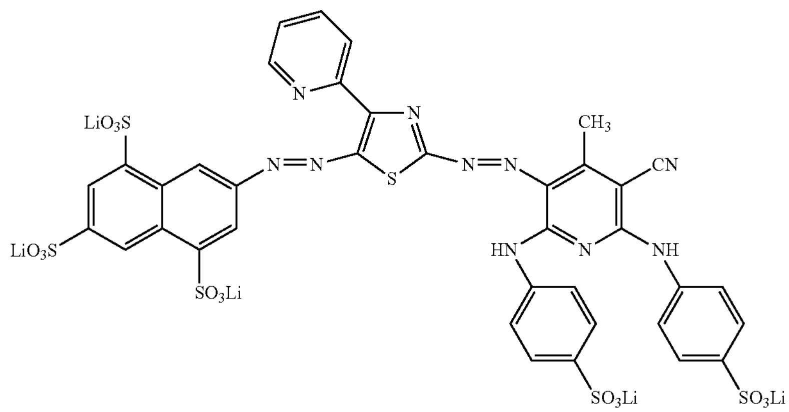
Exemplary compound I-15
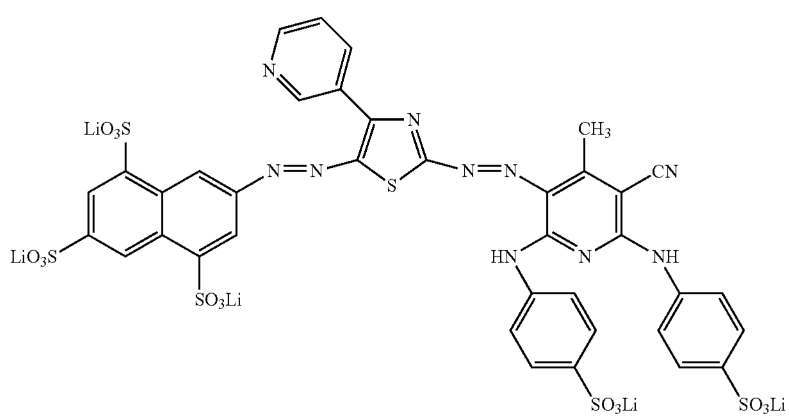

-continued
Exemplary compound I-16
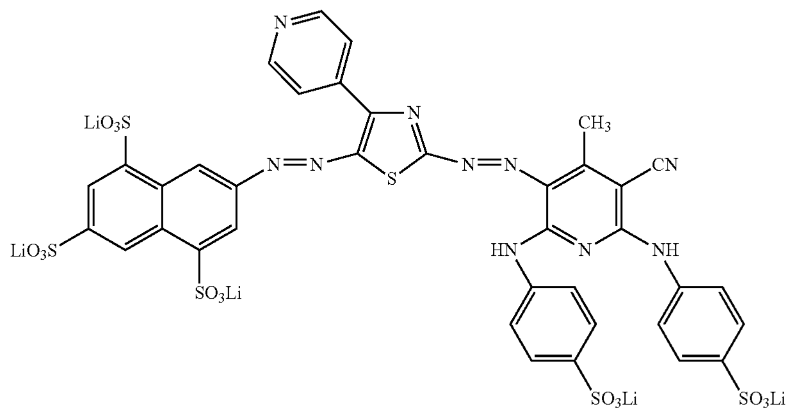
Exemplary compound I-17
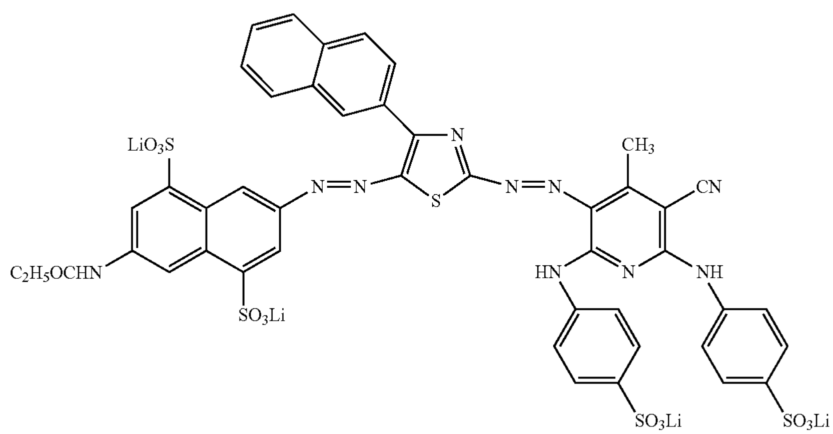
Exemplary compound I-18
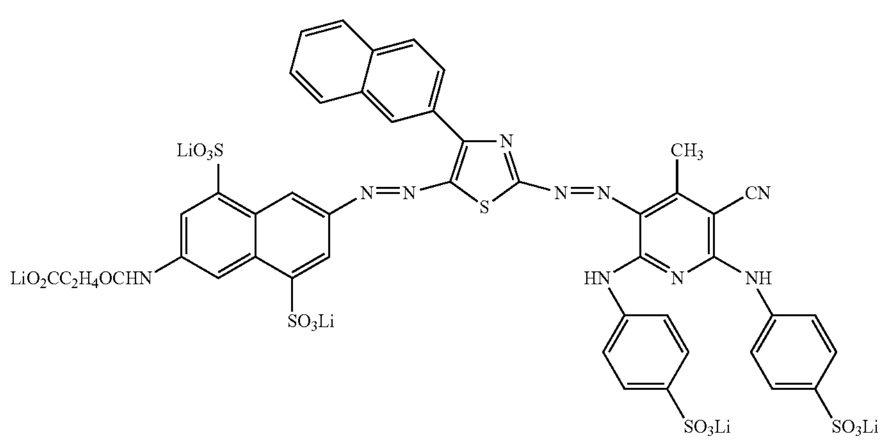

-continued
Exemplary compound I-19
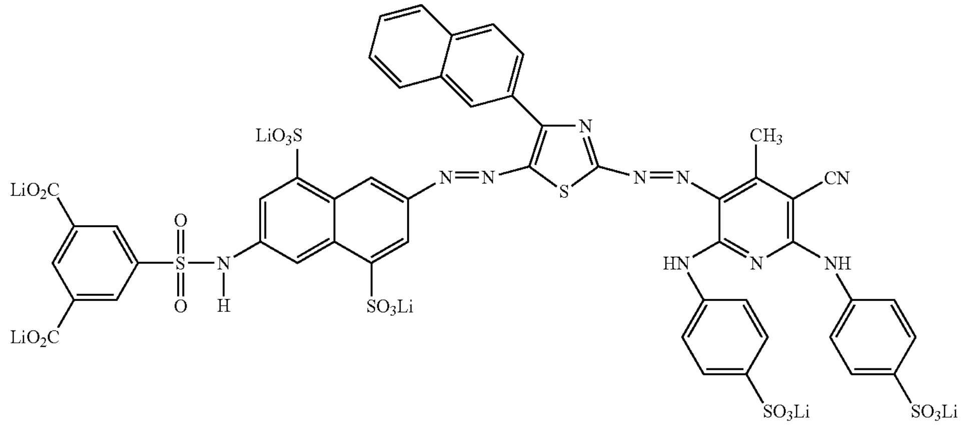
Exemplary compound I-20
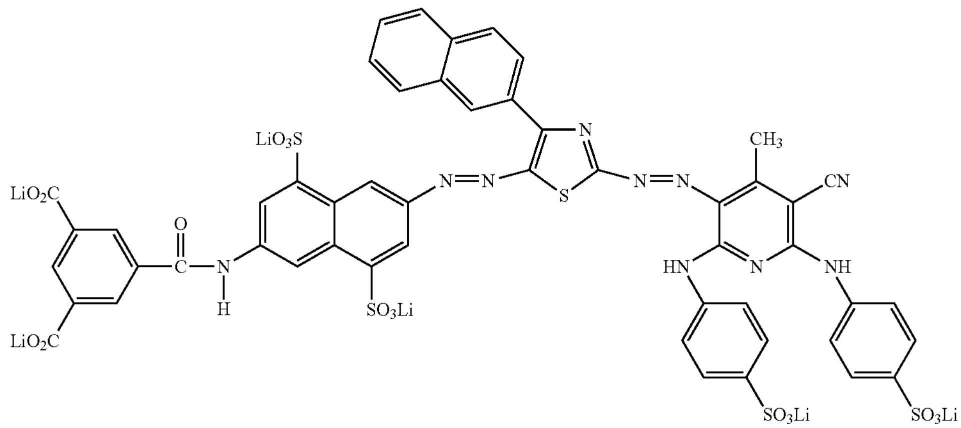
Exemplary compound I-21
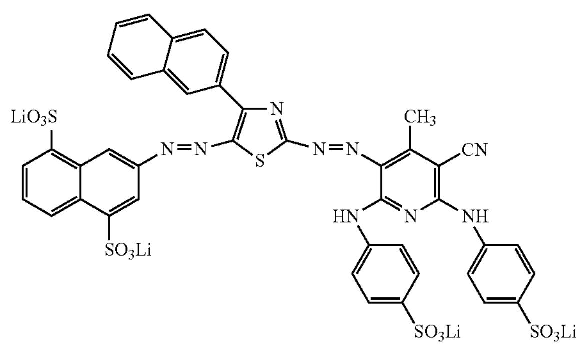
Exemplary compound I-22
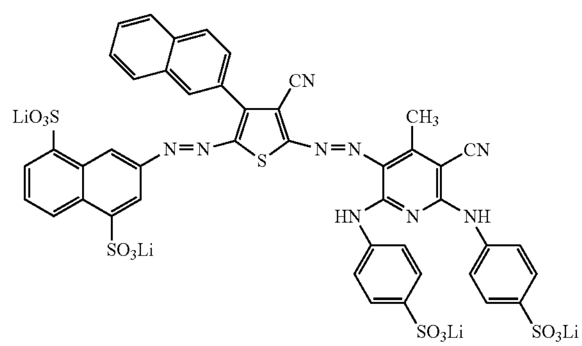
Exemplary compound I-23
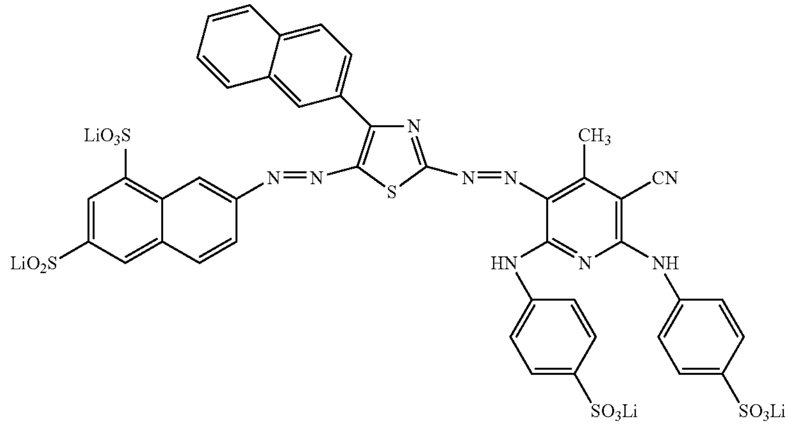

-continued
Exemplary compound I-24
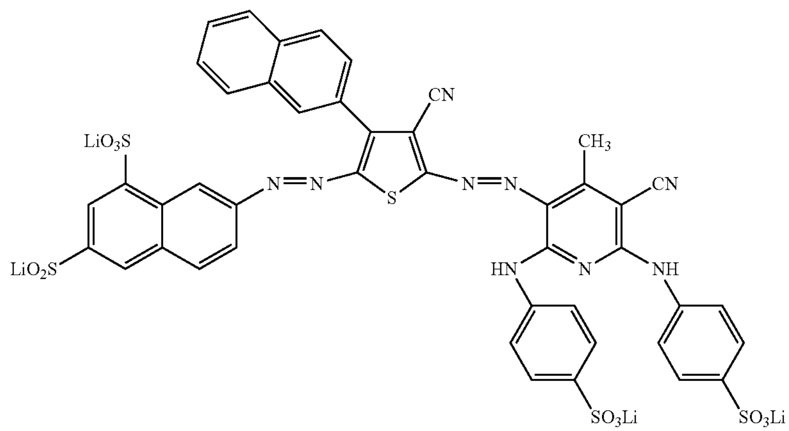
Exemplary compound I-25
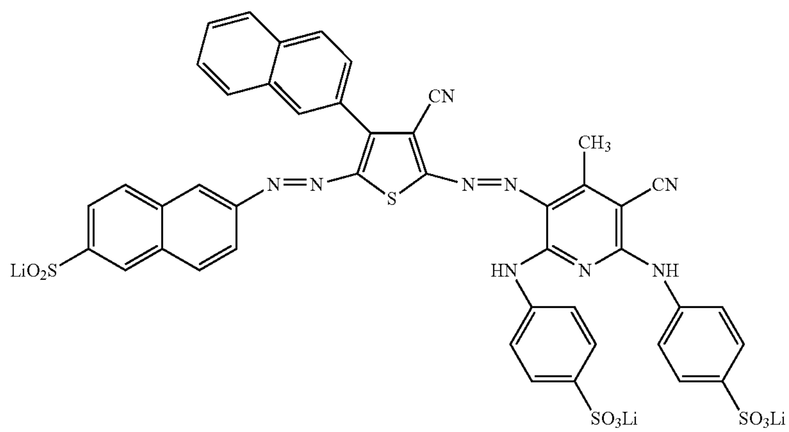
Exemplary compound I-26
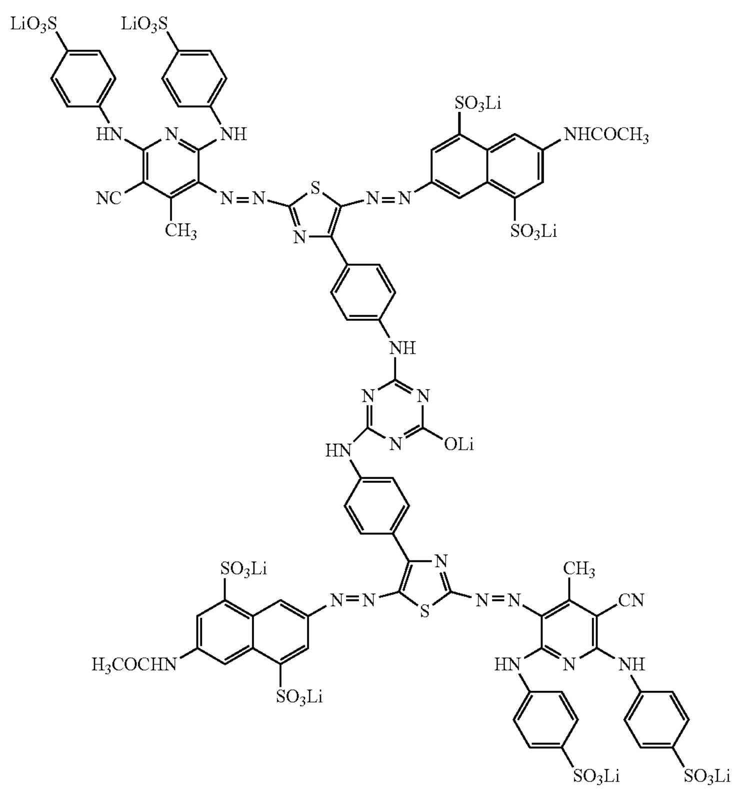

-continued
Exemplary compound I-27
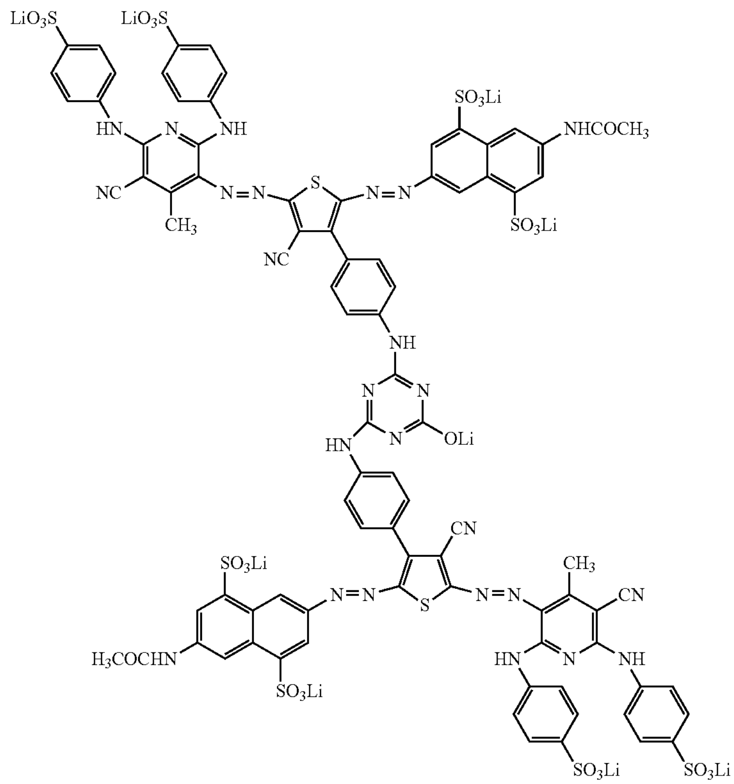
Exemplary compound I-28
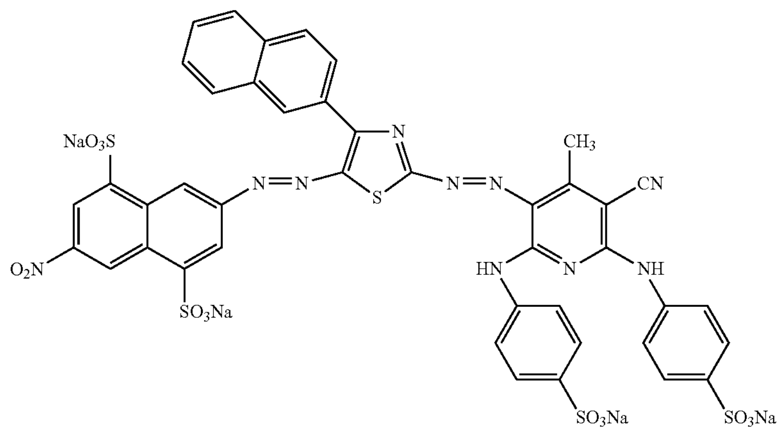
Exemplary compound I-29
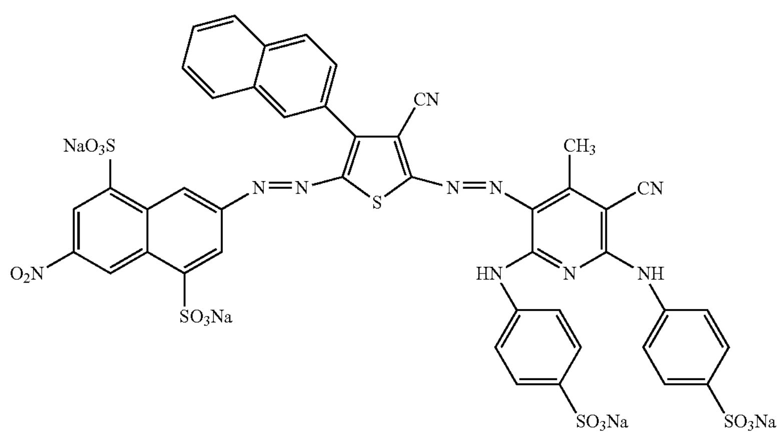

-continued
Exemplary compound I-30
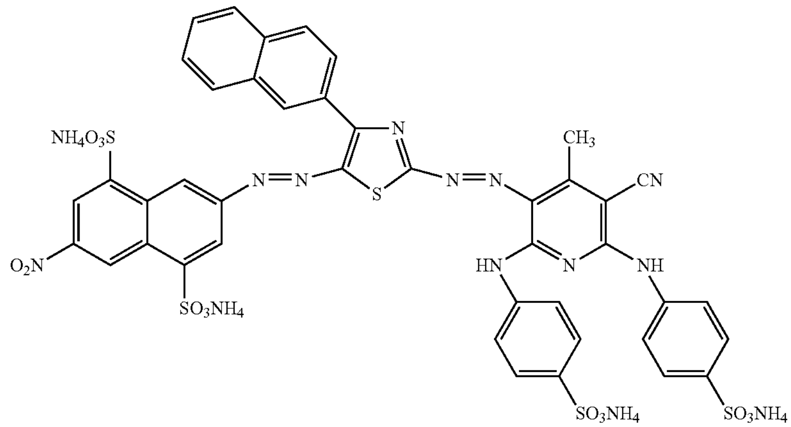
Exemplary compound I-31
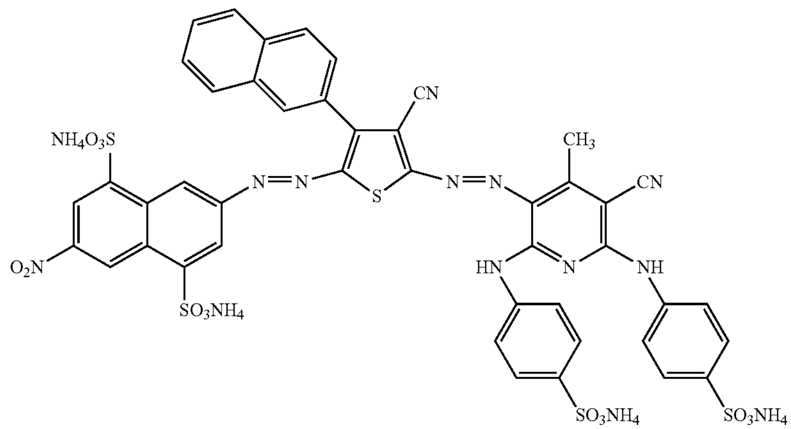
Exemplary compound I-32
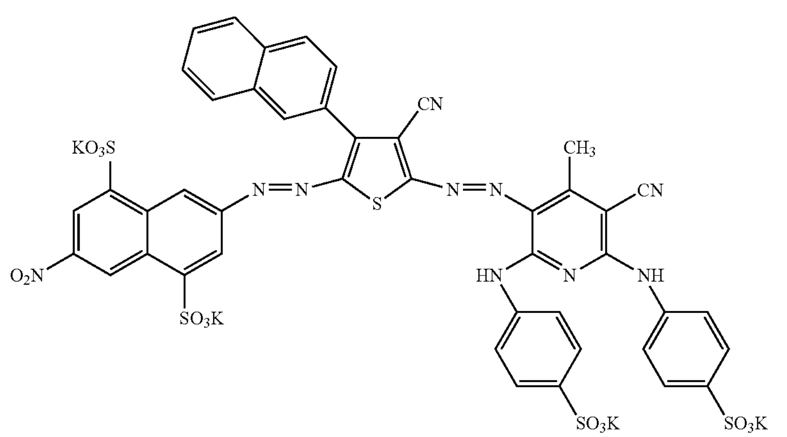

-continued

Exemplary compound I-33

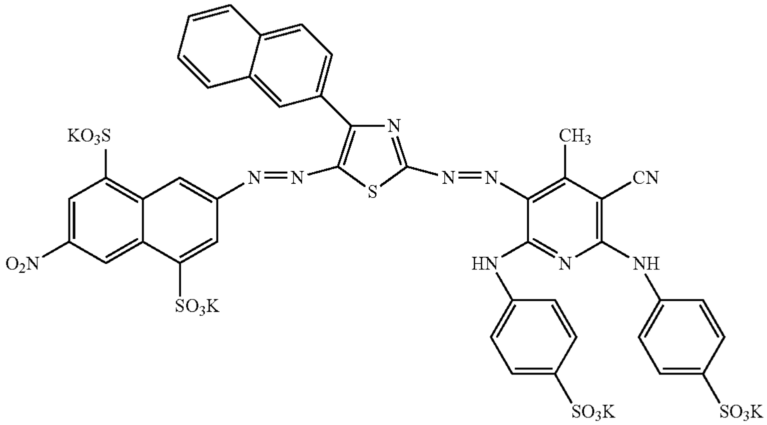

When the aqueous colorant solution according to the present invention is an aqueous colorant solution for an ink composition having a gray/black color tone, the content of the colorant is preferably 5.0% to 20.0% by mass, more preferably 5.0% to 15.0% by mass, still more preferably 5.0% to 12.0% by mass, and particularly preferably 5.0% to 10.0% by mass, based on the total mass of the aqueous colorant solution. When the content of the colorant is within the above range, the intermolecular interaction among the colorant, the compound (A), and the compound (II) in the aqueous colorant solution is good, and storage stability of the aqueous colorant solution is improved.

When the content of the colorant in the aqueous colorant solution for an ink composition having a gray/black color tone is 5.0% by mass or more, presumably, not only is an ink composition having a gray color tone/black color tone easily prepared, but also the effect of long-term dissolution stability of the aqueous colorant solution is more easily exhibited.

On the other hand, when the content of the colorant in the aqueous colorant solution for an ink composition having a gray/black color tone is 20.0% by mass or less, presumably, the concentration of solid contents in the aqueous colorant solution does not increase, and, during the storage of the aqueous colorant solution, the range of variation in liquid physical properties (in particular, dissolution stability, change in absorbance, increase and decrease in viscosity, and change in pH value) over time is small, thus improving the continuous ejection stability (reliability) of an ink composition for ink jet recording, the ink composition being prepared using the aqueous colorant solution.

When the aqueous colorant solution is an aqueous colorant solution for an ink composition having a gray color tone, the content of the colorant is preferably 5.0% to 20.0% by mass, more preferably 5.0% to 15.0% by mass, still more preferably 7.0% to 12.0% by mass, and particularly preferably 7.5% to 10.0% by mass, based on the total mass of the aqueous colorant solution. When the content of the colorant is within the above range, the intermolecular interaction among the colorant, the compound (A), and the compound (II) in the aqueous colorant solution is good, and storage stability of the aqueous colorant solution is improved.

When the aqueous colorant solution is an aqueous colorant solution for an ink composition having a black color tone, the content of the colorant is preferably 5.0% to 20.0% by mass, more preferably 5.0% to 15.0% by mass, still more preferably 5.3% to 15.0% by mass, and particularly preferably 10.0% to 12.0% by mass, based on the total mass of the aqueous colorant solution. When the content of the colorant is within the above range, the intermolecular interaction among the colorant, the compound (A), and the compound (II) in the aqueous colorant solution is good, and storage stability of the aqueous colorant solution is improved.

Toning Agent

The aqueous colorant solution according to the present invention may further contain a toning agent in addition to the colorant described above. In particular, when the aqueous colorant solution is an aqueous colorant solution for an ink composition having a gray/black color tone, the aqueous colorant solution preferably contains a toning agent.

Examples of the toning agent that can be used when the aqueous colorant solution according to the present invention is an aqueous colorant solution for an ink composition having a gray/black color tone include toning agents represented by general formula (III) in JP2020-76048A. Specific examples of preferred toning agents include, but are not limited to, the following.

Exemplary compound III-1

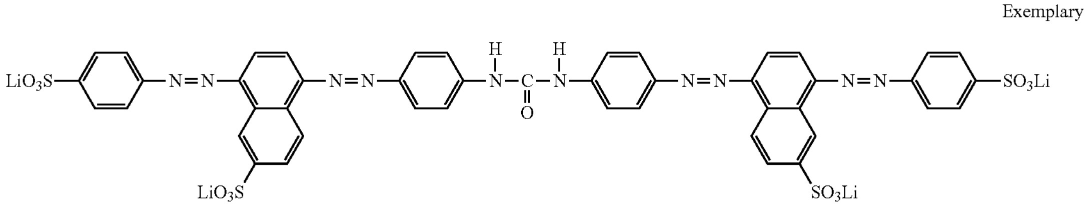

-continued

Exemplary compound III-2

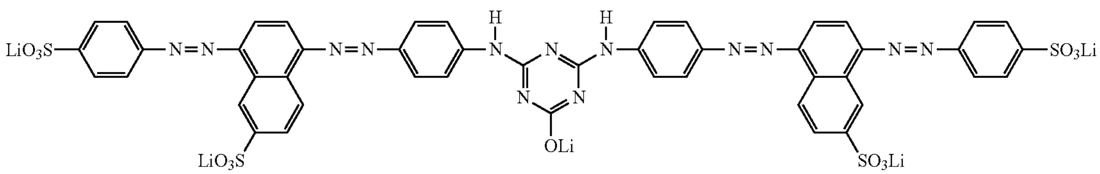

Exemplary compound III-3

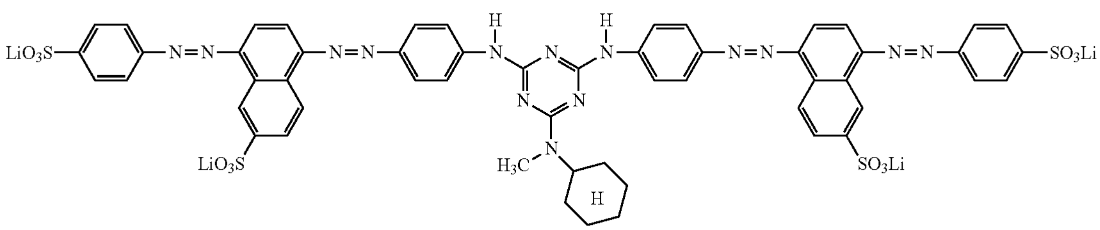

Exemplary compound III-4

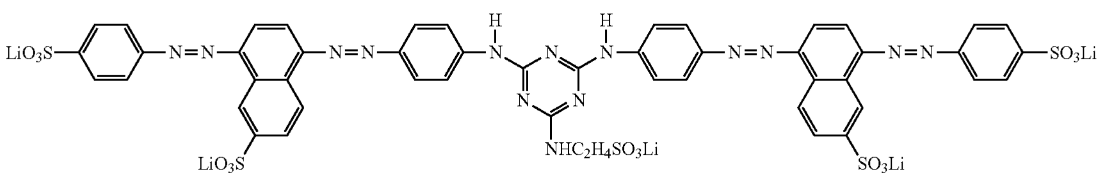

Exemplary compound III-5

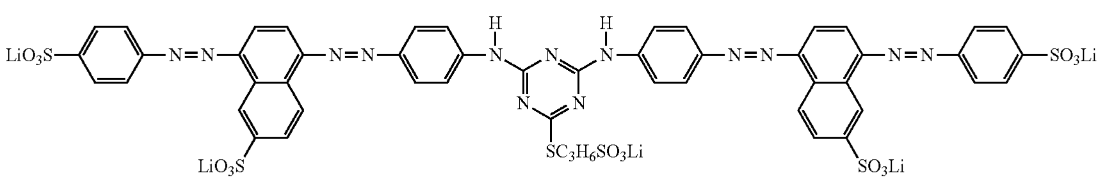

When the aqueous colorant solution according to the present invention is an aqueous colorant solution for an ink composition having a gray color tone, the content of the toning agent is preferably 0.1% to 2.0% by mass, more preferably 0.3% to 2.0% by mass, still more preferably 0.5% to 1.5% by mass, particularly preferably 0.5% to 1.3% by mass, and most preferably 0.8% to 1.2% by mass, based on the total mass of the aqueous colorant solution. The above range is preferable from the viewpoint of hue adjustment (neutral gray toning) with a colorant coexisting in the aqueous colorant solution.

When the aqueous colorant solution according to the present invention is an aqueous colorant solution for an ink composition having a black color tone, the content of the toning agent is preferably 0.1% to 5.0% by mass, more preferably 0.3% to 3.5% by mass, still more preferably 0.5% to 3.0% by mass, particularly preferably 1.0% to 3.0% by mass, and most preferably 1.5% to 2.5% by mass, based on the total mass of the aqueous colorant solution. The above range is preferable from the viewpoints of hue adjustment (black toning) with a colorant coexisting in the aqueous colorant solution and print density.

Magenta Dye

The aqueous colorant solution according to the present invention may contain another toning agent instead of the above-described toning agent or in addition to the above-described toning agent. In particular, when the aqueous colorant solution according to the present invention is an aqueous colorant solution for an ink composition having a gray/black color tone, the aqueous colorant solution preferably contains a magenta dye as a second toning agent in order to improve the color tone from gray to black. Examples of the magenta dye serving as the second toning agent include magenta dyes described in JP2020-76048A. Specific examples of the second toning agent include, but are not limited to, the following. In the following structural formulae, Me represents a methyl group, Et represents an ethyl group, (i)Pr and Pr(i) represent an isopropyl group, t-Bu represents a tert-butyl group, and $(n)C_5H_{11}$ and $C_5H_{11}(n)$ represent a n-pentyl group. M represents a hydrogen atom or a counter cation. M is the same as M in the compounds of the compound group (a) described above.

M dye 1
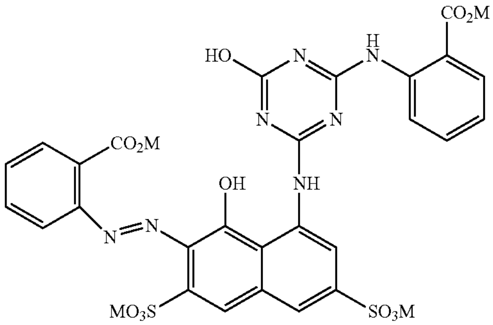
M dye 2
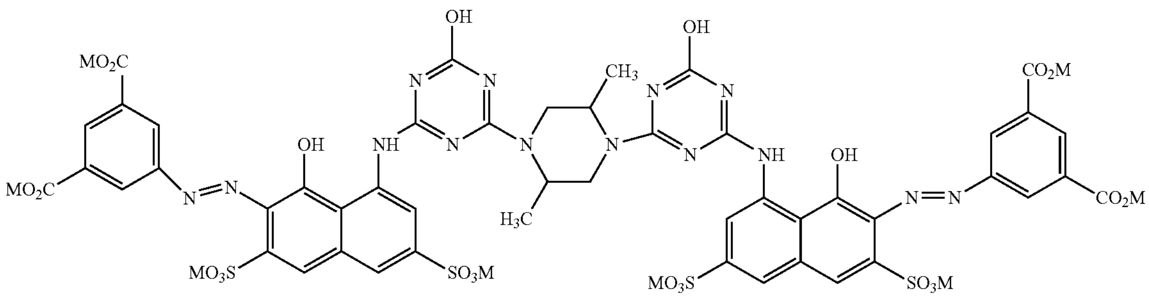
M dye 3
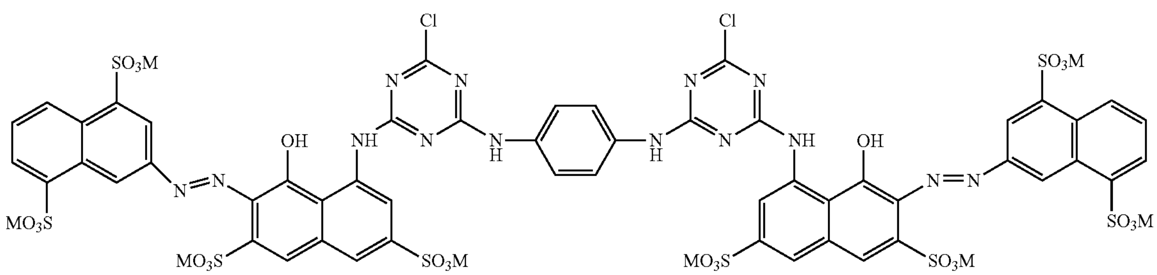
M dye 4
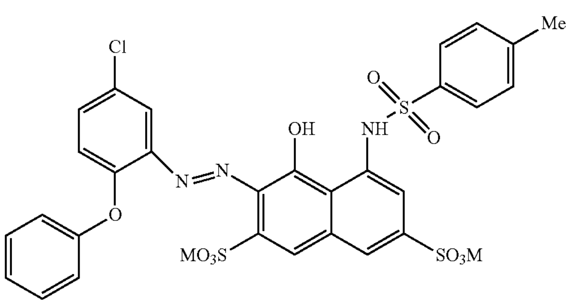
M dye 5
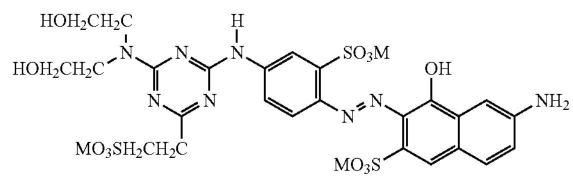
M dye 6
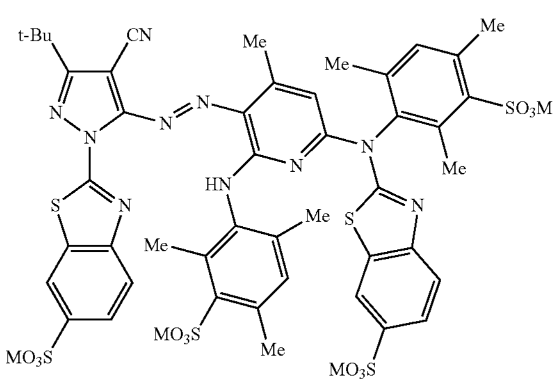
M dye 7
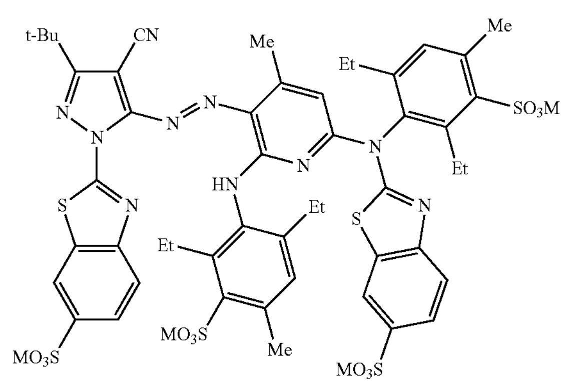

-continued
M dye 8
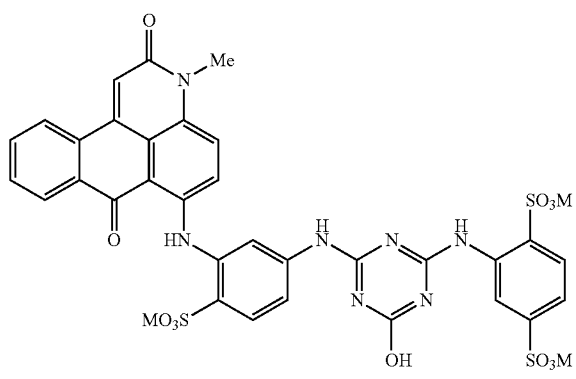
M dye 9
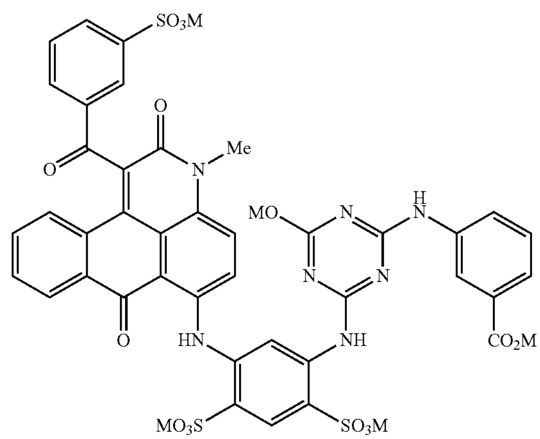
M dye 10
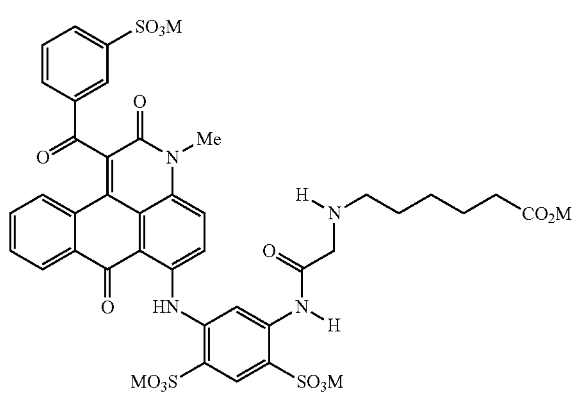
M dye 11
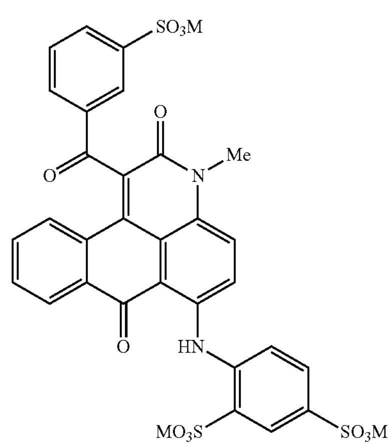
M dye 12
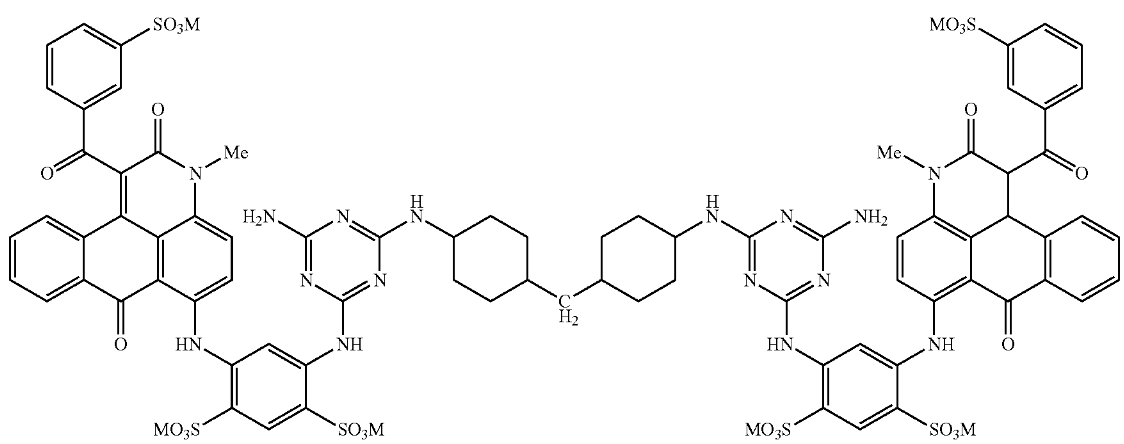

-continued
M dye 13
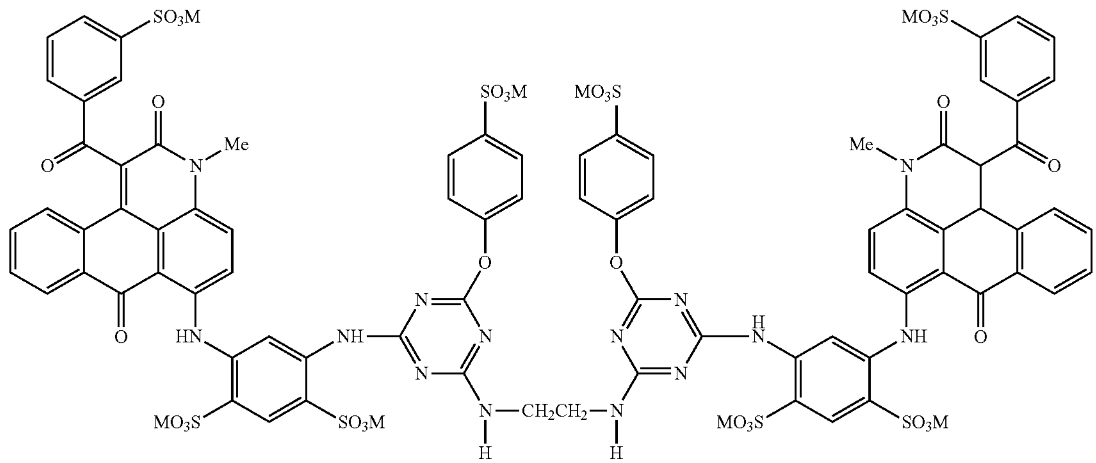
M dye 14
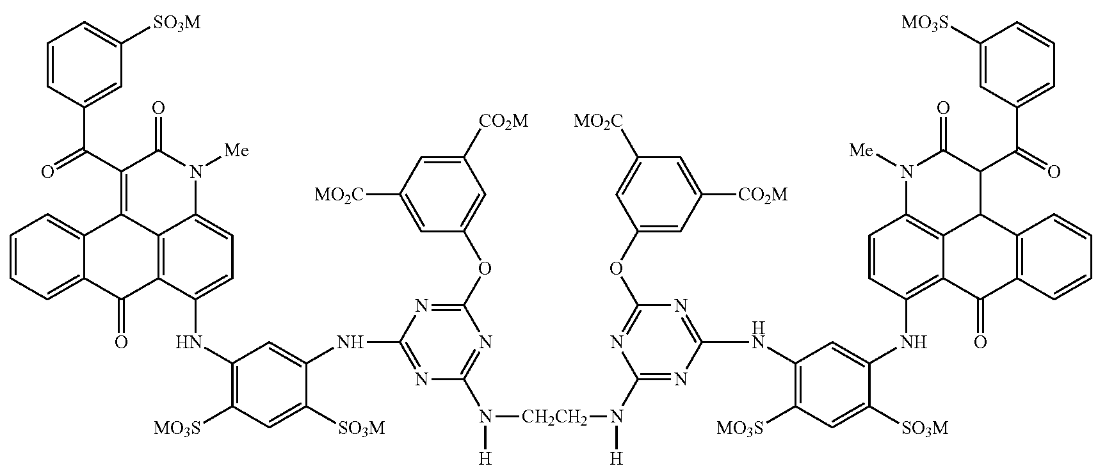
M dye 15
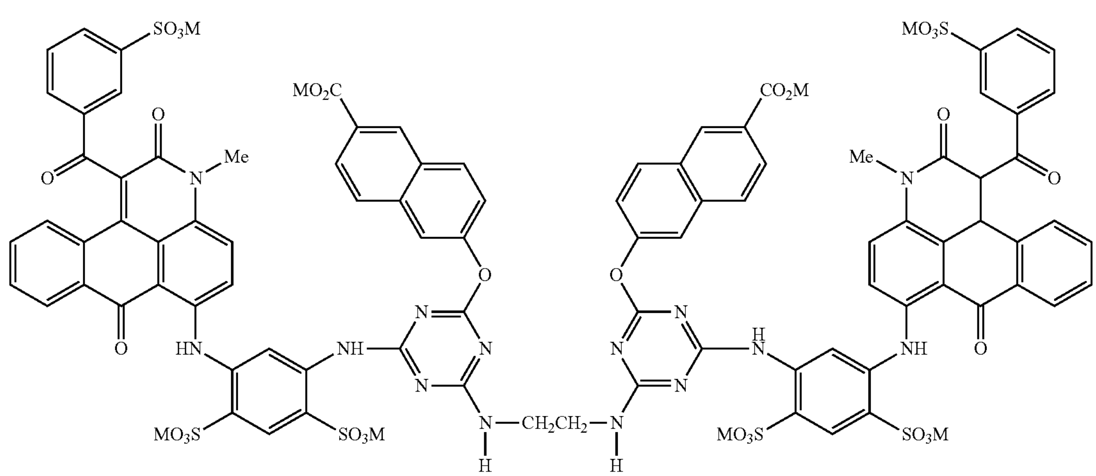

-continued
M dye 16
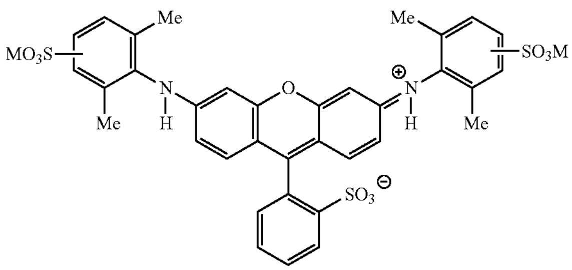
M dye 17
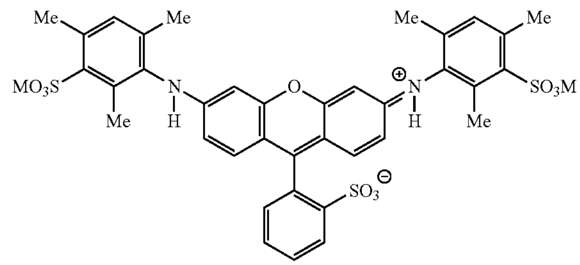
M dye 18
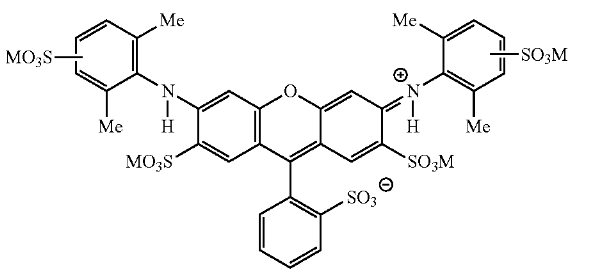
M dye 19
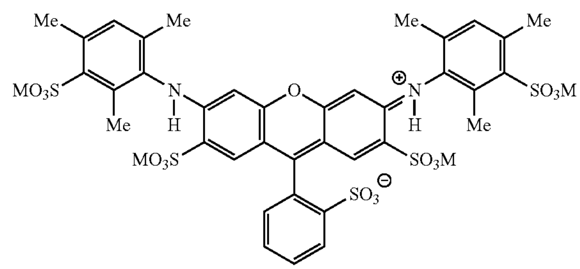
M dye 20
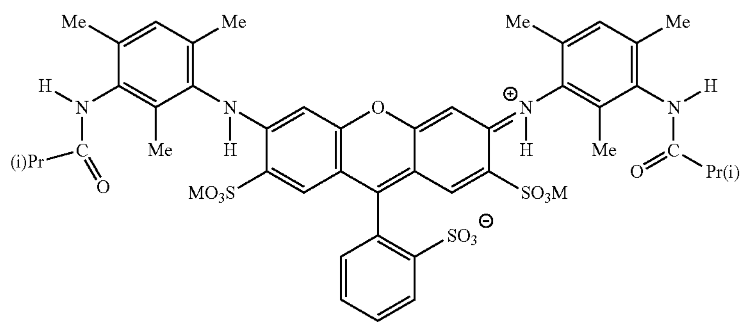
M dye 21
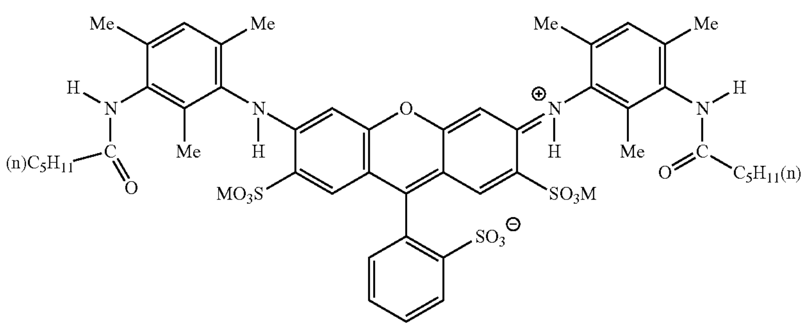
M dye 22
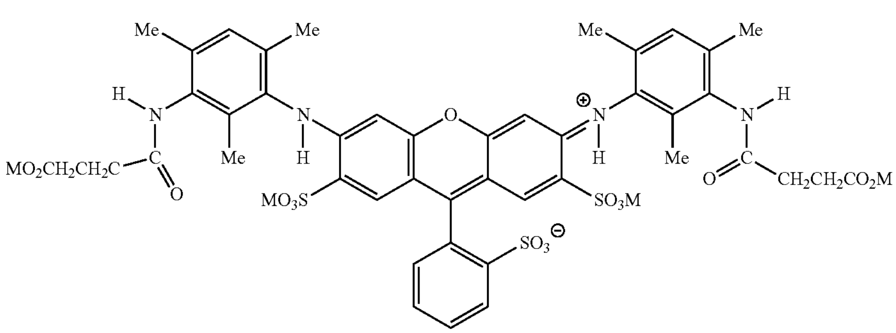

-continued
M dye 23
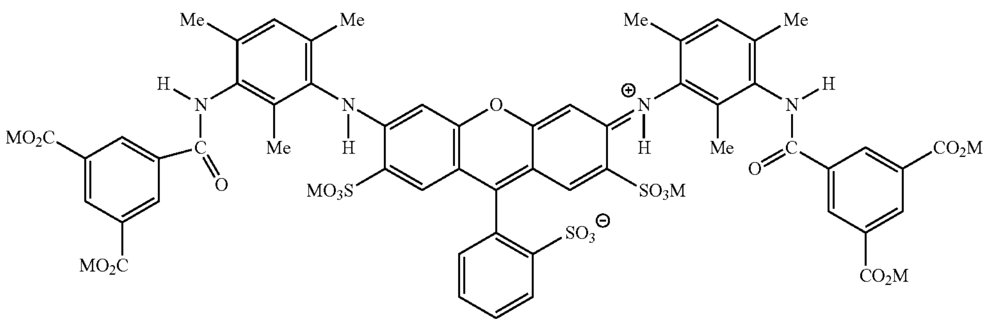
M dye 24
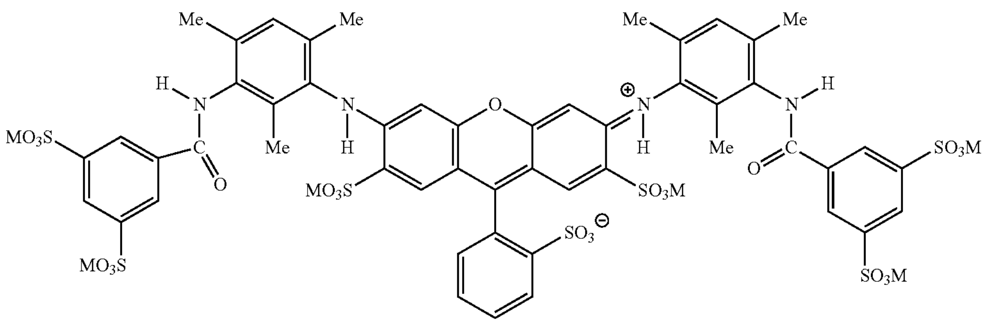
M dye 25
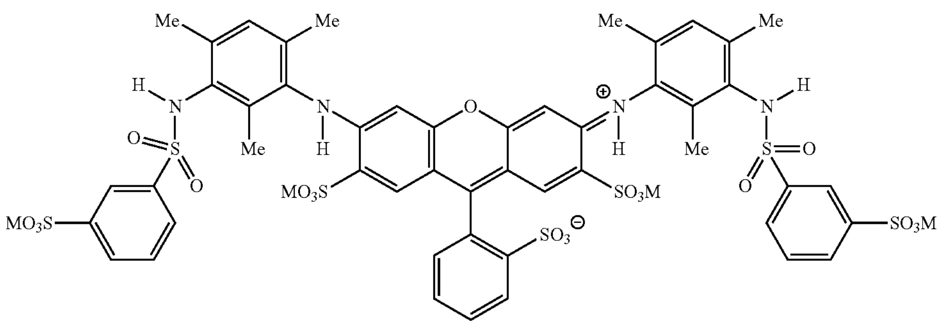
M dye 26
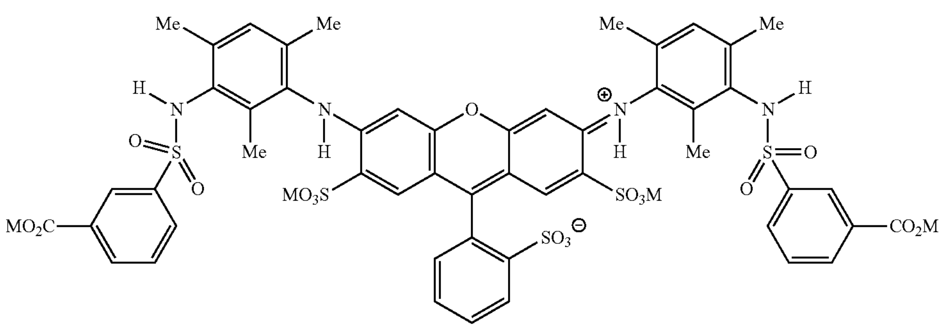
M dye 27
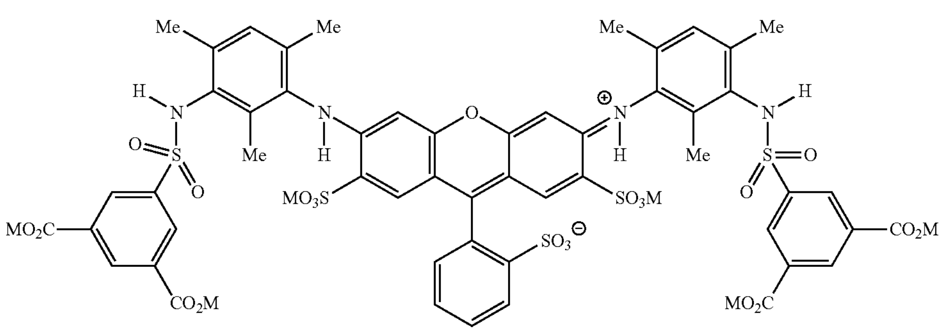

-continued

M dye 28

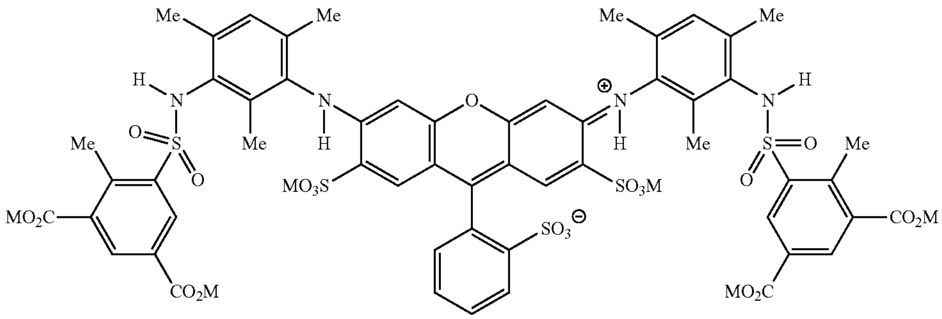

M dye 29

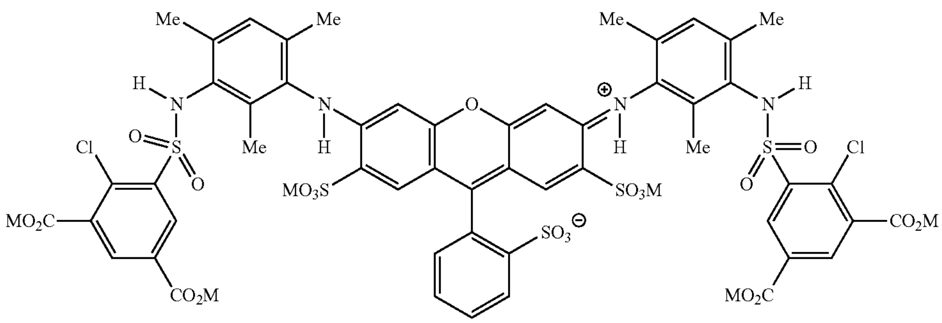

M dye 30

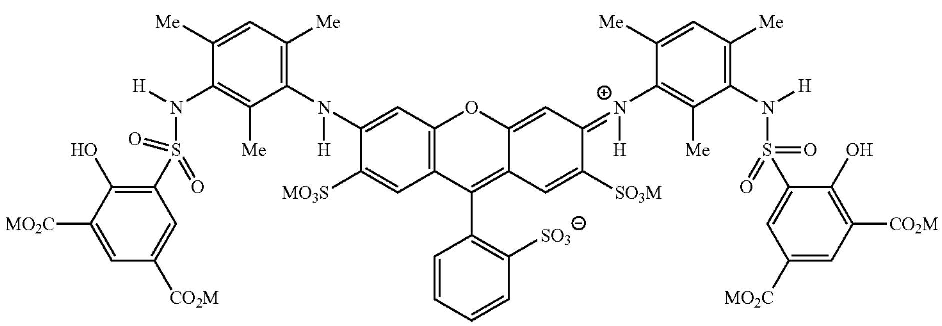

When the aqueous colorant solution according to the present invention contains a magenta dye as the second toning agent, the content of the magenta dye is preferably 0.1% to 5.0% by mass, more preferably 0.5% to 3.0% by mass, based on the total mass of the aqueous colorant solution, although it varies depending on the color value (tinting strength per unit mass) of the dye to be used.

When the aqueous colorant solution according to the present invention is an aqueous colorant solution for an ink composition having a gray color tone, the content of the magenta dye is preferably 0.1% to 5.0% by mass, more preferably 0.3% to 3.5% by mass, still more preferably 0.5% to 3.0% by mass, particularly preferably 0.5% to 2.0% by mass, and most preferably 0.8% to 1.2% by mass, based on the total mass of the aqueous colorant solution. The above range is preferable from the viewpoint of hue adjustment (neutral gray toning) with a colorant coexisting in the aqueous colorant solution.

When the aqueous colorant solution according to the present invention is an aqueous colorant solution for an ink composition having a black color tone, the content of the magenta dye is preferably 0.1% to 5.0% by mass, more preferably 0.3% to 3.5% by mass, still more preferably 0.5% to 3.0% by mass, particularly preferably 1.0% to 3.0% by mass, and most preferably 1.5% to 2.5% by mass, based on the total mass of the aqueous colorant solution. The above range is preferable from the viewpoints of hue adjustment (black toning) with a colorant coexisting in the aqueous colorant solution and print density.

Another Toning Agent

The aqueous colorant solution according to the present invention may contain another toning agent (third toning agent) instead of the above-described toning agents or in addition to the above-described toning agents. Specific examples of the third toning agent include, but are not limited to, the following.

Toning dye 1
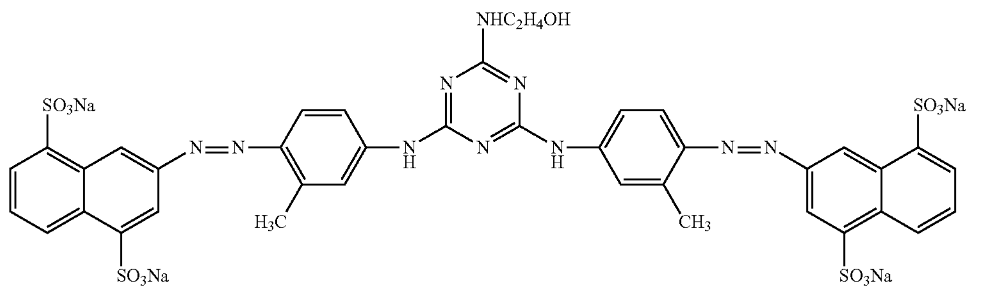
Toning dye 2
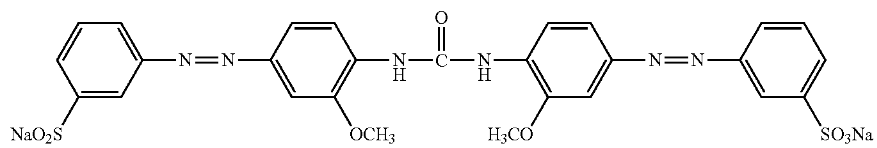
Toning dye 3
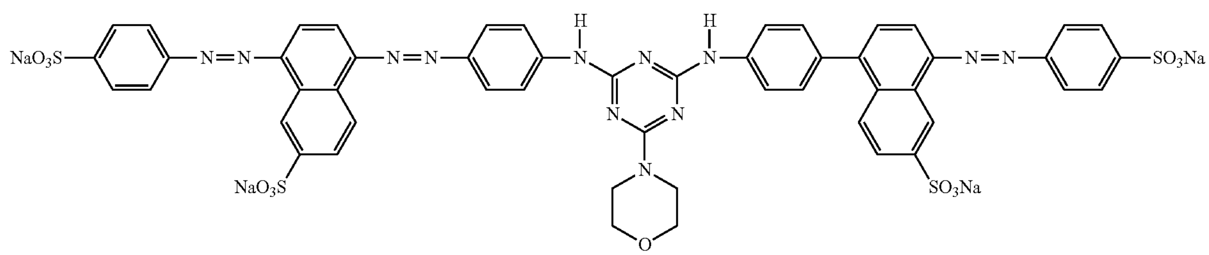
Toning dye 4
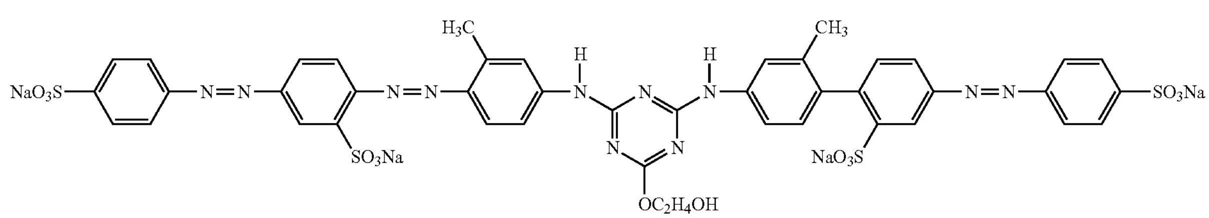
Toning dye 5
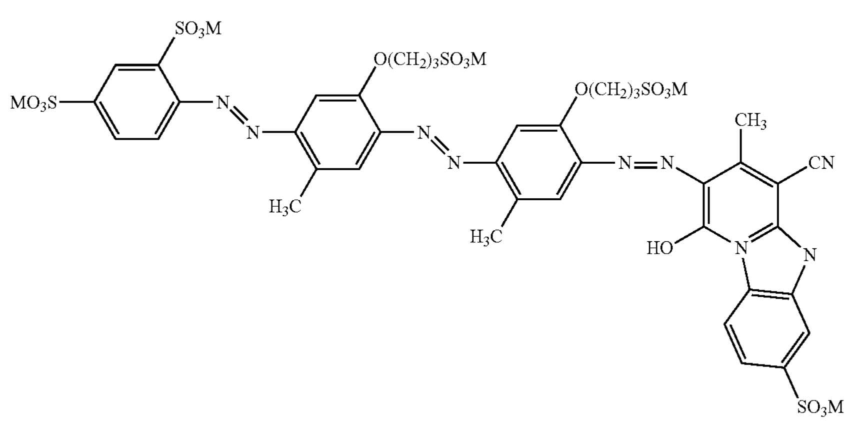
M = Li or Na -continued Toning dye 6

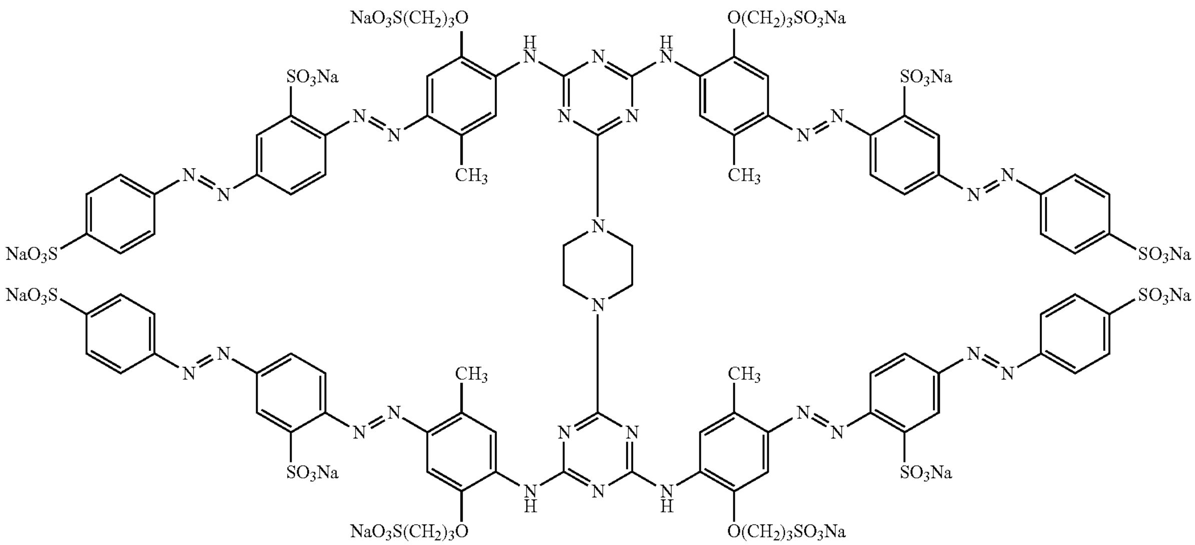

In addition to the above toning dyes 1 to 6, examples of toning dyes that can be contained in the aqueous colorant solution according to the present invention include, but are not limited to, the following. Note that "C.I." is an abbreviation of "color index".

C.I. Direct Yellow 9, 11, 28, 29, 35, 39, 41, 53, 59, 68, 87, 93, 95, 96, 106, 108, 109, 122, 130, 142, 144, 161, 163, etc.

C.I. Acid Yellow 19, 39, 49, 50, 61, 64, 79, 110, 127, 135, 143, 151, 159, 169, 174, 190, 195, 196, 197, 199, 218, 219, 222, 227, etc.

C.I. Reactive Yellow 2, 3, 13, 14, 15, 17, 18, 23, 24, 25, 26, 27, 29, 35, 37, 41, 42, etc.

C.I. Basic Yellow 1, 2, 4, 11, 13, 14, 15, 19, 21, 23, 24, 25, 28, 29, 32, 36, 39, 40, etc.

When the aqueous colorant solution according to the present invention contains another toning agent, the content of the other toning agent (the total amount in the case of a plurality of toning agents) in the aqueous colorant solution is preferably 0.1% to 3.0% by mass, more preferably 0.3% to 1.2% by mass, based on the total mass of the aqueous colorant solution, although it varies depending on the color value (tinting strength per unit mass) of the dye to be used.

When the aqueous colorant solution according to the present invention is an aqueous colorant solution for an ink composition having a gray color tone, the content of the other toning agent is preferably 0.1% to 3.0% by mass, more preferably 0.1% to 2.0% by mass, still more preferably 0.1% to 1.0% by mass, particularly preferably 0.3% to 1.0% by mass, and most preferably 0.3% to 0.5% by mass, based on the total mass of the aqueous colorant solution. The above range is preferable from the viewpoint of hue adjustment (neutral gray toning) with a colorant coexisting in the aqueous colorant solution.

When the aqueous colorant solution according to the present invention is an aqueous colorant solution for an ink composition having a black color tone, the content of the other toning agent is preferably 0.1% to 3.0% by mass, more preferably 0.1% to 2.0% by mass, still more preferably 0.1% to 1.5% by mass, particularly preferably 0.3% to 1.5% by mass, and most preferably 0.3% to 1.2% by mass, based on the total mass of the aqueous colorant solution. The above range is preferable from the viewpoints of hue adjustment (black toning) with a colorant coexisting in the aqueous colorant solution and print density.

The aqueous additive solution and the aqueous colorant solution according to the present invention are used for preparing an ink composition. An example of the ink composition is an ink composition serving as an image recording material for forming an image. Specific examples thereof include a thermal recording material, a pressure-sensitive recording material, a recording material for an electrophotographic process, a transfer-type silver halide photosensitive material, a printing ink, and a recording pen besides an ink jet recording material. The ink composition serving as an image recording material is preferably an ink jet recording material, a thermal recording material, or a recording material for an electrophotographic process, and more preferably an ink jet recording material.

Ink Composition

An ink composition according to the present invention is an ink composition containing the compound (A), the compound represented by general formula (II), water, and a colorant.

The ink composition according to the present invention can be prepared, for example, using the above-described aqueous colorant solution according to the present invention. More specifically, for example, the ink composition can be prepared by adding a water-miscible organic solvent, other additives (such as a pH adjusting agent and a surface-tension adjusting agent), water, and the like to the aqueous colorant solution according to the present invention.

The ink composition according to the present invention preferably further contains a chelating agent.

The ink composition according to the present invention preferably further contains a preservative.

The ink composition according to the present invention preferably further contains a buffering agent.

The compound (A), the compound (II), water, the colorant, the water-miscible organic solvent, the chelating agent, the preservative, and the buffering agent are the same as those described in the aqueous additive solution and the aqueous colorant solution. Other components that may be contained in the ink composition according to the present invention are also the same as those described in the aqueous additive solution and the aqueous colorant solution.

The pH value of the ink composition according to the present invention at 25° C. is preferably 6.5 to 9.0, more preferably 6.8 to 9.0, and most preferably 7.0 to 9.0.

The content of the preservative in the ink composition according to the present invention is preferably 0.001% to 1.0% by mass, more preferably 0.001% to 0.5% by mass, still more preferably 0.005% to 0.5% by mass, particularly preferably 0.01% to 0.5% by mass, and most preferably 0.01% to 0.4% by mass, based on the total mass of the ink composition.

The content of the chelating agent in the ink composition according to the present invention is preferably 0.001% to 1.0% by mass, more preferably 0.01% to 0.5% by mass, and particularly preferably 0.01% to 0.1% by mass, based on the total mass of the ink composition.

In the ink composition according to the present invention, the ratio of the chelating agent to a coloring material (the "coloring material" as used herein means all coloring materials including a colorant, a toning agent, a magenta dye serving as a second toning agent, a third toning agent, other colorants that may be used in combination, and the like) (content of chelating agent by mass:content of coloring material by mass) is preferably in the range of 0.0001:1 to 0.15:1. The ratio (content of chelating agent by mass:content of coloring material by mass) is more preferably in the range of 0.0001:1 to 0.05:1, and still more preferably in the range of 0.0002:1 to 0.005:1.

A metal that is likely to form a metal salt is a metal that can be mixed during the manufacturing process of a colorant (dye) or a metal that can be included in an ink container of an ink composition and eluted into the ink composition. At the ratio described above, the generation of foreign matter that causes clogging of an ink jet head can be effectively suppressed. In addition, the chelating action can be effectively exhibited, and an excessive increase in the viscosity of the ink composition and an excessive increase in the pH thereof can be suppressed.

The ink composition according to the present invention is also applicable to a color filter for recording and reproducing a color image used in a solid-state imaging element such as a charge-coupled device (CCD) or a display such as a liquid crystal display (LCD) or a plasma display panel (PDP), or a dyeing solution for dyeing various fibers.

The ink composition according to the present invention can be used in recording methods such as printing, copying, marking, writing, drawing, and stamping and is particularly suitable for use in an ink jet recording method.

The ink composition according to the present invention is particularly preferably used as an ink composition for ink jet recording.

The content of the colorant in the ink composition according to the present invention is preferably 0.1% to 10.0% by mass based on the total mass of the ink composition.

When the ink composition according to the present invention contains a cyan dye as a colorant, the ink composition according to the present invention can be used as an ink composition having a cyan color tone (also simply referred to as a "cyan ink") for ink jet recording, and can be applied to both a dark cyan ink and a light cyan ink.

In the case of a dark cyan ink, the ink is particularly suitable as an ink for photo applications and document applications.

On the other hand, in the case of a light cyan ink, the ink is particularly suitable for forming a light-colored cyan image and a light-colored mixed color (blue, green, gray, etc.) image.

In the case of a dark cyan ink, the content of the colorant (cyan dye) in the cyan ink is preferably 2.5% to 10.0% by mass, more preferably 3.0% to 8.0% by mass, still more preferably 3.5% to 6.0% by mass, and particularly preferably 3.5% to 5.5% by mass, based on the total mass of the cyan ink.

In the case of a light cyan ink, the content of the colorant (cyan dye) in the cyan ink is preferably 0.1% to 5.0% by mass, more preferably 0.5% to 3.0% by mass, still more preferably 1.0% to 2.5% by mass, and particularly preferably 1.0% to 2.0% by mass, based on the total mass of the cyan ink.

When the content of the colorant (cyan dye) in the dark/light cyan ink is within the above range, the ink has excellent storage stability, print density on various types of image-receiving paper (ink jet paper and plain paper), and image fastness.

When the ink composition according to the present invention contains a gray dye or a black dye as a colorant, the ink composition according to the present invention can be used as an ink composition having a gray color tone (also simply referred to as a "gray ink") for ink jet recording or an ink composition having a black color tone (also simply referred to as a "black ink") for ink jet recording.

The black ink is particularly suitable for photo and document applications.

The gray ink is particularly suitable for forming a light-colored gray image.

When the ink composition according to the present invention is used as a gray ink, the content of the colorant is preferably 0.1% to 10.0% by mass, more preferably 0.2% to 7.0% by mass, still more preferably 0.3% to 5.0% by mass, particularly preferably 0.3% to 3.0% by mass, and most preferably 0.5% to 2.0% by mass, based on the total mass of the ink composition.

When the content of the colorant in the gray ink is within the above range, the intermolecular interaction between the compound (A) and the compound (II) can be enhanced, and gray hue adjustment (neutral gray toning) with a toning agent for a gray tone is also improved.

When the ink composition according to the present invention is used as a black ink, the content of the colorant is preferably 0.1% to 10.0% by mass, more preferably 0.5% to 7.0% by mass, still more preferably 1.0% to 6.0% by mass, particularly preferably 3.0% to 6.0% by mass, and most preferably 3.5% to 5.5% by mass, based on the total mass of the ink composition.

When the content of the colorant in the black ink is within the above-described range, the intermolecular interaction between the compound (A) and the compound (II) can be enhanced, and black hue adjustment with a toning agent for a black tone is also improved.

When the ink composition according to the present invention contains the toning agent described above, the content of the toning agent is preferably 0.1% to 10.0% by mass, and more preferably 0.5% to 6.0% by mass based on the total mass of the ink composition.

In the ink composition according to the present invention, a blending proportion of the content of the colorant, the total content of the compound (A) and the compound (II), and the content of the toning agent based on the total mass of the ink composition, that is, colorant/{compound (A)+compound (II)}/toning agent is preferably 0.01% to 10.0% by mass/

0.01% to 10.0% by mass/0.00% to 10.0% by mass, and more preferably 0.05% to 5.0% by mass/0.05% to 5.0% by mass/0.01% to 5.0% by mass.

When the ink composition according to the present invention is a dark cyan ink, the blending proportion of the content of the colorant, the total content of the compound (A) and the compound (II), and the content of the toning agent based on the total mass of the ink composition, that is, colorant/{compound (A)+compound (II)}/toning agent is preferably 2.5% to 10.0% by mass/0.25% to 3.0% by mass/0.00% to 1.0% by mass, more preferably 3.0% to 8.0% by mass/0.30% to 2.0% by mass/0.00% to 0.5% by mass, still more preferably 3.5% to 6.0% by mass/0.35% to 2.0% by mass/0.00% to 0.10% by mass, and most preferably 3.5% to 5.5% by mass/0.35% to 1.0% by mass/0.00% to 0.10% by mass.

When the ink composition according to the present invention is a light cyan ink, the blending proportion of the content of the colorant, the total content of the compound (A) and the compound (II), and the content of the toning agent based on the total mass of the ink composition, that is, colorant/{compound (A)+compound (II)}/toning agent is preferably 0.1% to 5.0% by mass/0.01% to 2.5% by mass/0.00% to 1.0% by mass, more preferably 0.5% to 3.0% by mass/0.05% to 1.5% by mass/0.00% to 0.5% by mass, still more preferably 1.0% to 2.5% by mass/0.10% 1.25% by mass/0.00% 0.10% by mass, and most preferably 1.0% to 2.0% by mass/0.10% to 1.0% by mass/0.00% to 0.05% by mass.

When the ink composition according to the present invention is a gray ink, the blending proportion of the content of the colorant, the total content of the compound (A) and the compound (II), and the content of the toning agent based on the total mass of the ink composition, that is, colorant/{compound (A)+compound (II)}/toning agent is preferably 0.10% to 5.0% by mass/0.30% to 5.0% by mass/0.01 to 2.5% by mass, more preferably 0.30% to 3.0% by mass/0.30% to 3.0% by mass/0.03% to 1.5% by mass, and still more preferably 0.50% to 2.0% by mass/0.50% to 1.5% by mass/0.05% to 1.0% by mass.

When the ink composition according to the present invention is a black ink, the proportion of the content of the colorant, the total content of the compound (A) and the compound (II), and the content of the toning agent based on the total mass of the ink composition, that is, colorant/{compound (A)+compound (II)}/toning agent is preferably 1.0% to 6.0% by mass/0.1% to 3.0% by mass/1.0% to 4.0% by mass, more preferably 3.0% to 5.5% by mass/0.3% to 3.0% by mass/1.0% to 3.0% by mass, and still more preferably 3.5% to 5.0% by mass/0.3% to 2.0% by mass/1.5% to 2.0% by mass.

When the ink composition according to the present invention is a gray ink, the content of the magenta dye is preferably 0.01% to 2.0% by mass, more preferably 0.03% to 1.0% by mass, still more preferably 0.05% to 2.0% by mass, particularly preferably 0.05% to 1.0% by mass, and most preferably 0.05% to 0.50% by mass, based on the total mass of the ink composition. When the content of the magenta dye is within the above range, hue adjustment (neutral gray toning) with a colorant coexisting in the ink composition is improved.

When the ink composition according to the present invention is a black ink, the content of the magenta dye is preferably 0.10% to 5.0% by mass, more preferably 0.50% to 3.0% by mass, still more preferably 0.5% to 3.0% by mass, particularly preferably 0.5% to 2.5% by mass, and most preferably 1.0% to 2.0% by mass, based on the total mass of the ink composition, from the viewpoint of hue adjustment (black toning) with a colorant coexisting in the ink composition.

When the ink composition according to the present invention contains a water-miscible organic solvent, the content of the water-miscible organic solvent is preferably 20% to 50% by mass, and more preferably 30% to 50% by mass, based on the total mass of the ink composition. In particular, in the case of an ink composition for ink jet recording, the content of the water-miscible organic solvent is particularly preferably 30% to 40% by mass for reasons of suitability for a piezo head or a thermal head.

Ink Composition for Ink Jet Recording

An ink composition for ink jet recording according to the present invention includes the above-described ink composition according to the present invention. The above-described ink composition according to the present invention can also be used as it is as an ink composition for ink jet recording.

The reason why the ink composition for ink jet recording according to the present invention has an excellent color tone from gray to black or an excellent cyan color tone and has excellent storage stability is not completely clear, but the inventors of the present invention presume as follows.

When an ink composition for ink jet recording is prepared using, together with a colorant, an aqueous solution that includes the compound (A) containing an s-triazine ring group and the compound (II), an image having an excellent color tone from gray to black or an excellent cyan color tone can be formed by an ink jet method. In the image immediately after being formed, the colorant is considered to form a relatively stable association state. On the other hand, when the humidity of the surrounding environment increases, a colorant (dye) having high water solubility is considered to proceed to a more stable association state (subjected to a change in the state of existence like an H-aggregate of a coloring agent) with moisture serving as a driving force. As a result, the color tone of an image is presumed to change (short-wavelength shift of the color tone due to the H-aggregate).

Accordingly, in the present invention, by adding the compound (II), which is a compound having high planarity, a relatively stable association state of a colorant of gray to black or cyan in an image immediately after being formed by an ink jet method can be stabilized by the intermolecular interaction between the colorant and the compound (II), or a more stable association state can be formed by the intermolecular interaction between the colorant and the compound (II) immediately after the formation of the image. It is considered that, as a result, a change in the color tone of the image can be suppressed without causing a change in the association state of the colorant due to a change in the surrounding environment (humidity, light, and active gas). Presumably, furthermore, by using the compound (A) in combination, the interaction among the colorant, the compound (II), and the compound (A) and the compatibility are improved, and consequently, the storage stability of the ink composition is remarkably improved, the antiseptic property is improved, and the ranges of variations in the pH value, the absorbance, the viscosity, and the surface tension can be suppressed to the minimum even after long-term storage of the ink composition.

Ink Jet Recording Method

An ink jet recording method according to the present invention has a step of ejecting the above-described ink composition for ink jet recording according to the present invention with a recording head for an ink jet process.

In the ink jet recording method according to the present invention, energy is provided to the ink composition for ink jet recording according to the present invention to form an image on a publicly known image-receiving material, that is, plain paper, resin coat paper, ink jet paper described in, for example, JP1996-169172A (JP-H08-169172A), JP1996-27693A (JP-H08-27693A), JP1990-276670A (JP-H02-276670A), JP1995-276789A (JP-H07-276789A), JP1997-323475A (JP-H09-323475A), JP1987-238783A (JP-S62-238783A), JP1998-153989A (JP-H10-153989A), JP1998-217473A (JP-H10-217473A), JP1998-235995A (JP-H10-235995A), JP1998-217597A (JP-H10-217597A), and JP1998-337947A (JP-H10-337947A), a film, paper for common use in electrophotography, a textile, glass, metal, ceramic, or the like.

When an image is formed, a polymer fine particle dispersion (also referred to as a polymer latex) may be used in combination for the purpose of imparting glossiness and water resistance or improving weather resistance. The polymer latex may be applied to the image-receiving material before, after, or at the same time as the application of the colorant; therefore, the polymer latex may be added to image-receiving paper or an ink, or the polymer latex may be used alone as a liquid. Specifically, the methods described in, for example, JP2000-363090, JP2000-315231, JP2000-354380, JP2000-343944, JP2000-268952, JP2000-299465, and JP2000-297365 can be preferably used.

The recording process of the ink jet recording method according to the present invention is not limited, and any publicly known process is employed. Examples thereof include a charge control process of utilizing an electrostatic attraction force to eject an ink; a drop-on-demand process (pressure pulse process) using vibration pressure of a piezo element; an acoustic ink jet process including converting electric signals into acoustic beams and applying the acoustic beams to an ink to eject the ink by utilizing the radiation pressure; and a thermal ink jet process including heating an ink to form bubbles and utilizing the generated pressure. The ink jet recording process includes a process including ejecting a plurality of droplets of a low-density ink called a photo ink with a small volume, a process in which the image quality is improved by using a plurality of inks having substantially the same hue but different densities, and a process of using a colorless, transparent ink.

EXAMPLES

Hereinafter, the present invention will be described with reference to Examples and Comparative Examples. However, the present invention is not limited to these.

Example 1

Preparation of Aqueous Additive Solution 1

In 60.00 g of deionized water, 0.36 g of the compound (a)-1, 0.072 g of the compound (a)-2, 0.146 g of the compound (a)-3, 14.423 g of the compound (P-3), 0.065 g of a chelating agent (EDTA), 0.100 g of a preservative (PROXEL (registered trademark) XL2(s), manufactured by LONZA), and 0.100 g of a buffering agent ($NaHCO_3$) were dissolved, and the pH of the resulting solution was then adjusted to 8.5 with a pH adjusting agent (10 mol/L aqueous sodium hydroxide solution). The solution was filtered under reduced pressure through a microfilter having an average pore size of 0.20 μm and washed with an appropriate amount of deionized water. Subsequently, deionized water was added while the total mass was carefully checked to prepare an aqueous additive solution 1 (100 g). The EDTA used was available from FUJIFILM Wako Pure Chemical Corporation. The same applies to Examples and Comparative Examples described below.

Examples 2 to 16

Aqueous additive solutions 2 to 16 (each 100 g) were prepared in the same manner as in Example 1 except that the types and amounts of the components were changed to the types and amounts shown in Tables 1 to 4 below.

Examples 17 to 20

Aqueous additive solutions 17 to 20 (each 100 g) were prepared in the same manner as in Example 1 except that the types and amounts of the components were changed to the types and amounts shown in Table 4 below, and that the pH of each of the solutions was adjusted to 8.5 with a pH adjusting agent (10 mol/L aqueous lithium hydroxide solution).

Example 21

An aqueous additive solution 21 (100 g) was prepared in the same manner as in Example 1 except that the same components as those in Example 2 were used and the pH was changed to 9.0.

Example 22

An aqueous additive solution 22 (100 g) was prepared in the same manner as in Example 1 except that the same components as those in Example 2 were used and the pH was changed to 8.0.

Example 23

An aqueous additive solution 23 (100 g) was prepared in the same manner as in Example 1 except that the same components as those in Example 2 were used and the pH was changed to 7.5.

Example 24

An aqueous additive solution 24 (100 g) was prepared in the same manner as in Example 1 except that the same components as those in Example 2 were used and the pH was changed to 7.0.

Example 25

An aqueous additive solution 25 (100 g) was prepared in the same manner as in Example 1 except that the same components as those in Example 2 were used and the pH was changed to 6.5.

Examples 26 to 32

Aqueous additive solutions 26 to 32 (each 100 g) were prepared in the same manner as in Example 1 except that the types and amounts of the components were changed to the types and amounts shown in Tables 5 and 6 below.

Comparative Examples 1 to 12

Comparative aqueous additive solutions 1 to 12 (each 100 g) were prepared in the same manner as in Example 1 except that the types and amounts of the components were changed to the types and amounts shown in Tables 7 to 9 below.

Comparative Examples 13 to 16

Comparative aqueous additive solutions 13 to 16 (each 100 g) were prepared in the same manner as in Example 1 except that the types and amounts of the components were changed to the types and amounts shown in Table 9 below, and that the pH of each of the solutions was adjusted to 8.5 with a pH adjusting agent (10 mol/L aqueous lithium hydroxide solution).

TABLE 1

| | Compound (A) | | Compound (II) | | Chelating agent | | Preservative | | Buffering agent | |
|---|---|---|---|---|---|---|---|---|---|---|
| | Type | Amount (g) | Type | Amount (g) | Type | Amount (g) | Type | Amount (g) | Type | Amount (g) |
| Example 1 | (a)-1<br>(a)-2<br>(a)-3 | 0.360<br>0.072<br>0.146 | (P-3) | 14.423 | EDTA | 0.065 | PROXEL XL2(s) | 0.100 | $NaHCO_3$ | 0.100 |
| Example 2 | (a)-1<br>(a)-2<br>(a)-3 | 0.360<br>0.072<br>0.146 | (P-3) | 14.423 | EDTA | 0.065 | PROXEL XL2(s) | 0.100 | — | none |
| Example 3 | (a)-1<br>(a)-2<br>(a)-3 | 0.360<br>0.072<br>0.146 | (P-3) | 14.423 | EDTA | 0.065 | — | none | $NaHCO_3$ | 0.100 |
| Example 4 | (a)-1<br>(a)-2<br>(a)-3 | 0.360<br>0.072<br>0.146 | (P-3) | 14.423 | — | none | PROXEL XL2(s) | 0.100 | $NaHCO_3$ | 0.100 |
| Example 5 | (a)-1<br>(a)-2<br>(a)-3 | 0.360<br>0.072<br>0.146 | (P-3) | 14.423 | EDTA | 0.065 | PROXEL GXL | 0.100 | $NaHCO_3$ | 0.100 |

TABLE 2

| | Compound (A) | | Compound (II) | | Chelating agent | | Preservative | | Buffering agent | |
|---|---|---|---|---|---|---|---|---|---|---|
| | Type | Amount (g) | Type | Amount (g) | Type | Amount (g) | Type | Amount (g) | Type | Amount (g) |
| Example 6 | (a)-1<br>(a)-2<br>(a)-3 | 0.125<br>0.025<br>0.051 | (P-3) | 5.00 | EDTA | 0.022 | PROXEL XL2(s) | 0.033 | $NaHCO_3$ | 0.100 |
| Example 7 | (a)-1<br>(a)-2<br>(a)-3 | 0.240<br>0.048<br>0.097 | (P-3) | 9.615 | EDTA | 0.043 | PROXEL XL2(s) | 0.067 | $NaHCO_3$ | 0.100 |
| Example 8 | (a)-1<br>(a)-2<br>(a)-3 | 0.499<br>0.100<br>0.203 | (P-3) | 20.00 | EDTA | 0.087 | PROXEL XL2(s) | 0.200 | $NaHCO_3$ | 0.100 |
| Example 9 | (a)-1<br>(a)-2<br>(a)-3 | 0.006<br>0.001<br>0.003 | (P-3) | 14.990 | EDTA | 0.065 | PROXEL XL2(s) | 0.100 | $NaHCO_3$ | 0.100 |
| Example 10 | (a)-1<br>(a)-2<br>(a)-3 | 0.623<br>0.125<br>0.252 | (P-3) | 14.000 | EDTA | 0.065 | PROXEL XL2(s) | 0.100 | $NaHCO_3$ | 0.100 |

TABLE 3

| | Compound (A) | | Compound (II) | | Chelating agent | | Preservative | | Buffering agent | |
|---|---|---|---|---|---|---|---|---|---|---|
| | Type | Amount (g) | Type | Amount (g) | Type | Amount (g) | Type | Amount (g) | Type | Amount (g) |
| Example 11 | (a)-1<br>(a)-2<br>(a)-3 | 0.360<br>0.072<br>0.146 | (P-3)<br>(P-27) | 14.155<br>0.268 | EDTA | 0.065 | PROXEL XL2(s) | 0.100 | $NaHCO_3$ | 0.100 |
| Example 12 | (a)-1<br>(a)-2<br>(a)-3 | 0.360<br>0.072<br>0.146 | (P-3)<br>(P-27) | 14.155<br>0.268 | EDTA | 0.065 | PROXEL XL2(s) | 0.100 | — | none |
| Example 13 | (a)-1<br>(a)-2<br>(a)-3 | 0.360<br>0.072<br>0.146 | (P-3)<br>(P-27) | 14.155<br>0.268 | EDTA | 0.065 | — | none | $NaHCO_3$ | 0.100 |
| Example 14 | (a)-1<br>(a)-2<br>(a)-3 | 0.360<br>0.072<br>0.146 | (P-3)<br>(P-27) | 14.155<br>0.268 | — | none | PROXEL XL2(s) | 0.100 | $NaHCO_3$ | 0.100 |
| Example 15 | (a)-1<br>(a)-3 | 0.450<br>0.050 | (P-3)<br>(P-27) | 14.250<br>0.250 | EDTA | 0.065 | PROXEL XL2(s) | 0.100 | $NaHCO_3$ | 0.100 |

TABLE 4

| | Compound (A) | | Compound (II) | | Chelating agent | | Preservative | | Buffering agent | |
|---|---|---|---|---|---|---|---|---|---|---|
| | Type | Amount (g) | Type | Amount (g) | Type | Amount (g) | Type | Amount (g) | Type | Amount (g) |
| Example 16 | (a)-1 | 0.500 | (P-3)<br>(P-27) | 14.250<br>0.250 | EDTA | 0.065 | PROXEL XL2(s) | 0.100 | $NaHCO_3$ | 0.100 |
| Example 17 | (a)-1<br>(a)-21<br>(a)-18 | 0.360<br>0.072<br>0.146 | (P-4) | 14.423 | EDTA | 0.065 | PROXEL XL2(s) | 0.100 | $LiHCO_3$ | 0.100 |
| Example 18 | (a)-1<br>(a)-21<br>(a)-18 | 0.360<br>0.072<br>0.146 | (P-4)<br>(P-27) | 14.155<br>0.268 | EDTA | 0.065 | PROXEL XL2(s) | 0.100 | $LiHCO_3$ | 0.100 |
| Example 19 | (a)-5 | 0.50 | (P-4) | 14.500 | EDTA | 0.065 | PROXEL XL2(s) | 0.100 | $LiHCO_3$ | 0.100 |
| Example 20 | (a)-21 | 0.50 | (P-4) | 14.500 | EDTA | 0.065 | PROXEL XL2(s) | 0.100 | $LiHCO_3$ | 0.100 |
| Example 21 | (a)-1<br>(a)-2<br>(a)-3 | 0.360<br>0.072<br>0.146 | (P-3) | 14.423 | EDTA | 0.065 | PROXEL XL2(s) | 0.100 | — | none |

TABLE 5

| | Compound (A) | | Compound (II) | | Chelating agent | | Preservative | | Buffering agent | |
|---|---|---|---|---|---|---|---|---|---|---|
| | Type | Amount (g) | Type | Amount (g) | Type | Amount (g) | Type | Amount (g) | Type | Amount (g) |
| Example 22 | (a)-1<br>(a)-2<br>(a)-3 | 0.360<br>0.072<br>0.146 | (P-3) | 14.423 | EDTA | 0.065 | PROXEL XL2(s) | 0.100 | — | none |
| Example 23 | (a)-1<br>(a)-2<br>(a)-3 | 0.360<br>0.072<br>0.146 | (P-3) | 14.423 | EDTA | 0.065 | PROXEL XL2(s) | 0.100 | — | none |
| Example 24 | (a)-1<br>(a)-2<br>(a)-3 | 0.360<br>0.072<br>0.146 | (P-3) | 14.423 | EDTA | 0.065 | PROXEL XL2(s) | 0.100 | — | none |
| Example 25 | (a)-1<br>(a)-2<br>(a)-3 | 0.360<br>0.072<br>0.146 | (P-3) | 14.423 | EDTA | 0.065 | PROXEL XL2(s) | 0.100 | — | none |
| Example 26 | (a)-1<br>(a)-2<br>(a)-3 | 0.360<br>0.072<br>0.146 | (P-3) | 21.000 | EDTA | 0.087 | PROXEL XL2(s) | 0.200 | $NaHCO_3$ | 0.100 |

TABLE 6

| | Compound (A) | | Compound (II) | | Chelating agent | | Preservative | | Buffering agent | |
|---|---|---|---|---|---|---|---|---|---|---|
| | Type | Amount (g) | Type | Amount (g) | Type | Amount (g) | Type | Amount (g) | Type | Amount (g) |
| Example 27 | (a)-1<br>(a)-2<br>(a)-3 | 0.360<br>0.072<br>0.146 | (P-3) | 21.000 | — | none | PROXEL XL2(s) | 0.200 | $NaHCO_3$ | 0.100 |
| Example 28 | (a)-1<br>(a)-2<br>(a)-3 | 0.360<br>0.072<br>0.146 | (P-3) | 4.000 | EDTA | 0.022 | PROXEL XL2(s) | 0.033 | $NaHCO_3$ | 0.100 |
| Example 29 | (a-1) | 0.500 | (P-3) | 4.500 | EDTA | 0.022 | PROXEL XL2(s) | 0.033 | — | none |
| Example 30 | (a-1) | 0.500 | (P-3) | 20.500 | — | none | PROXEL XL2(s) | 0.200 | $NaHCO_3$ | 0.100 |
| Example 31 | (a-1) | 1.500 | (P-3) | 13.500 | EDTA | 0.065 | PROXEL XL2(s) | 0.100 | — | none |
| Example 32 | (a-1) | 0.0009 | (P-27) | 14.9991 | EDTA | 0.065 | PROXEL XL2(s) | 0.100 | — | none |

TABLE 7

| | Compound (A) | | Compound (II) | | Chelating agent | | Preservative | | Buffering agent | |
|---|---|---|---|---|---|---|---|---|---|---|
| | Type | Amount (g) | Type | Amount (g) | Type | Amount (g) | Type | Amount (g) | Type | Amount (g) |
| Comparative Example 1 | — | none | (P-3) | 15.000 | EDTA | 0.065 | PROXEL XL2(s) | 0.100 | $NaHCO_3$ | 0.100 |
| Comparative Example 2 | — | none | (P-3) | 15.000 | EDTA | 0.065 | PROXEL XL2(s) | 0.100 | — | none |
| Comparative Example 3 | — | none | (P-3) | 15.000 | EDTA | 0.065 | — | none | $NaHCO_3$ | 0.100 |
| Comparative Example 4 | — | none | (P-3) | 15.000 | — | none | PROXEL XL2(s) | 0.100 | $NaHCO_3$ | 0.100 |
| Comparative Example 5 | (a)-1<br>(a)-2<br>(a)-3 | 0.360<br>0.072<br>0.146 | — | none | EDTA | 0.065 | PROXEL XL2(s) | 0.100 | $NaHCO_3$ | 0.100 |

TABLE 8

| | Compound (A) | | Compound (II) | | Chelating agent | | Preservative | | Buffering agent | |
|---|---|---|---|---|---|---|---|---|---|---|
| | Type | Amount (g) | Type | Amount (g) | Type | Amount (g) | Type | Amount (g) | Type | Amount (g) |
| Comparative Example 6 | (a)-1<br>(a)-2<br>(a)-3 | 0.360<br>0.072<br>0.146 | — | none | — | none | PROXEL XL2(s) | 0.200 | $NaHCO_3$ | 0.100 |
| Comparative Example 7 | (a)-1<br>(a)-2<br>(a)-3 | 0.360<br>0.072<br>0.146 | — | none | — | none | — | none | $NaHCO_3$ | 0.100 |
| Comparative Example 8 | (a)-1<br>(a)-2<br>(a)-3 | 0.360<br>0.072<br>0.146 | — | none | — | none | — | none | — | none |
| Comparative Example 9 | (a)-1 | 0.500 | — | none | EDTA | 0.065 | PROXEL XL2(s) | 0.100 | $NaHCO_3$ | 0.100 |
| Comparative Example 10 | (a)-1 | 0.500 | — | none | — | none | PROXEL XL2(s) | 0.100 | $NaHCO_3$ | 0.100 |

TABLE 9

| | Compound (A) | | Compound (II) | | Chelating agent | | Preservative | | Buffering agent | |
|---|---|---|---|---|---|---|---|---|---|---|
| | Type | Amount (g) | Type | Amount (g) | Type | Amount (g) | Type | Amount (g) | Type | Amount (g) |
| Comparative Example 11 | (a)-1 | 0.500 | — | none | — | none | — | none | $NaHCO_3$ | 0.100 |
| Comparative Example 12 | (a)-1 | 0.500 | — | none | — | none | — | none | — | none |
| Comparative Example 13 | — | none | (P-27) | 15.000 | EDTA | 0.065 | PROXEL XL2(s) | 0.100 | $LiHCO_3$ | 0.100 |
| Comparative Example 14 | — | none | (P-1) | 15.000 | EDTA | 0.065 | PROXEL XL2(s) | 0.100 | $LiHCO_3$ | 0.100 |
| Comparative Example 15 | — | none | (P-2) | 15.000 | EDTA | 0.065 | PROXEL XL2(s) | 0.100 | $LiHCO_3$ | 0.100 |
| Comparative Example 16 | — | none | (P-4) | 15.000 | EDTA | 0.065 | PROXEL XL2(s) | 0.100 | $LiHCO_3$ | 0.100 |

Storage Stability of Aqueous Additive Solution

Antiseptic Property

Caps of food stamps for bacterial tests (for viable bacteria count and for fungi) manufactured by Nissui Pharmaceutical Co., Ltd. were removed, and a sufficient amount of the aqueous additive solution was applied to the surfaces of agar media. The food stamps were allowed to stand without the caps for 10 hours to promote adhesion of bacteria. Subsequently, the caps were put, the food stamp for viable bacteria count was cultured in a thermostatic chamber at 36° C. for two days, and the food stamp for fungi was cultured in a thermostatic chamber at 23° C. for five days. The evaluation was performed by visual observation in the following three grades according to the following criteria.

A: No mold appears.

B: Although the appearance of mold is slightly confirmed, a growth tendency is not observed.

C: Mold appears, and a growth tendency is also observed.

The aqueous additive solutions 1 to 32 prepared in Examples 1 to 32 and the comparative aqueous additive solutions 1 to 16 prepared in Comparative Examples 1 to 16 were stored, as a forced test, for 4 weeks at 60° C. and a relative humidity of 50%, for 10 weeks at 60° C. and a relative humidity of 50%, for 15 weeks at 60° C. and a relative humidity of 50%, and for 20 weeks at 60° C. and a relative humidity of 50%, and then evaluated for the following evaluation items.

Presence or Absence of Insoluble Matter (Precipitate) (Filtration Residue)

The aqueous additive solution was filtered through a filter having a pore size of 0.2 m and then visually observed. The evaluation was performed in the following two grades: When a dissolved state was maintained, the aqueous additive solution was evaluated as A. When precipitation of foreign matter or separation occurred, the aqueous additive solution was evaluated as C.

Changes in Liquid Physical Properties

The evaluation was performed in the following three grades: When an aqueous additive solution maintains substantially the same physical properties (an absorbance, a viscosity, and a surface tension) as those immediately after the preparation thereof, the aqueous additive solution was evaluated as A. When a liquid physical property value changed by ±3% or more in one item after the forced test, the aqueous additive solution was evaluated as B. When a liquid physical property value changed by ±3% or more in two or more items after the forced test, the aqueous additive solution was evaluated as C. The absorbance, viscosity, and surface tension values were measured by the following methods.

Absorbance

After 200 mg of the aqueous additive solution was weighed, the aqueous additive solution was diluted with deionized water up to 50 mL, and 2 mL of the resulting diluted solution was further diluted with deionized water up to 100 mL. The diluted aqueous solution was then poured into a quartz cell with a size of 1 cm×1 cm, and the absorbance in the range of 250 nm to 400 nm was measured with a UV-Vis spectrophotometer (UV-1800) manufactured by Shimadzu Corporation in an environment at 25° C. and a relative humidity of 50%. The absorbance at λmax in the ultraviolet region (250 to 300 nm) was checked, and a change before and after the forced test was then calculated.

Viscosity

After 1.5 mL of the aqueous additive solution was weighed, the measurement was performed with a viscometer (RE85) manufactured by Toki Sangyo Co., Ltd. in an environment at 25° C. and a relative humidity of 50% to 70% for a measurement time of two minutes.

Surface Tension

After 5 mL of the aqueous additive solution was weighed, the measurement was performed with a surface tensiometer (DY-200) manufactured by Kyowa Interface Science Co., Ltd. in an environment at 25° C. and a relative humidity of 30% using a platinum plate.

Change in pH Value

The evaluation was performed in the following three grades: When an aqueous additive solution maintained substantially the same pH value as that immediately after the preparation thereof, the aqueous additive solution was evaluated as A. When the pH value changed by ±0.3 or more after the forced test, the aqueous additive solution was evaluated as B. When the pH value changed by ±0.5 or more after the forced test, the aqueous additive solution was evaluated as C. The pH value was measured by the following method.

After 5 mL of the aqueous additive solution was weighed, the measurement was performed with a pH meter (HM-25G) manufactured by DKK-TOA Corporation in an environment at 25° C. and a relative humidity of 50% to 70% for a measurement time of two minutes.

The results are shown in Tables 10 to 13 below.

With regard to antiseptic properties, the results obtained when the food stamps for viable bacteria count were cultured in the thermostatic chamber at 36° C. for two days are shown in the column of "exposure time: 2 days", and the results obtained when the food stamps for fungi were cultured in the thermostatic chamber at 23° C. for five days are shown in the column of "exposure time: 5 days".

In the forced test, the results after storage for 4 weeks at 60° C. and a relative humidity of 50% are shown in the column of "4 weeks", the results after storage for 10 weeks at 60° C. and a relative humidity of 50% are shown in the column of "10 weeks", the results after storage for 15 weeks at 60° C. and a relative humidity of 50% are shown in the column of "15 weeks", and the results after storage for 20 weeks at 60° C. and a relative humidity of 50% are shown in the column of "20 weeks".

TABLE 10

| | Storage stability of aqueous additive solution | | | | | | | | | | | | | |
|---|---|---|---|---|---|---|---|---|---|---|---|---|---|---|
| | Antiseptic property Exposure time (days) | | Filtration residue Exposure time (weeks) | | | | Changes in liquid physical properties Exposure time (weeks) | | | | Change in pH value Exposure time (weeks) | | | |
| | 2 | 5 | 4 | 10 | 15 | 20 | 4 | 10 | 15 | 20 | 4 | 10 | 15 | 20 |
| Example 1 | A | A | A | A | A | A | A | A | A | A | A | A | A | A |
| Example 2 | A | A | A | A | A | A | A | A | A | A | A | A | A | A |
| Example 3 | A | B | A | A | A | A | A | A | A | A | A | A | A | A |
| Example 4 | A | A | A | A | C | C | A | A | A | B | A | A | A | B |
| Example 5 | A | A | A | A | A | A | A | A | A | A | A | A | A | A |
| Example 6 | A | A | A | A | A | C | A | A | B | B | A | A | A | A |
| Example 7 | A | A | A | A | A | A | A | A | A | A | A | A | A | A |
| Example 8 | A | A | A | A | A | A | A | A | B | B | A | A | A | A |
| Example 9 | A | A | A | A | A | A | A | A | B | B | A | A | A | A |
| Example 10 | A | A | A | A | A | A | A | A | B | B | A | A | A | A |
| Example 11 | A | A | A | A | A | A | A | A | A | A | A | A | A | A |
| Example 12 | A | A | A | A | A | A | A | A | A | A | A | A | A | A |

TABLE 11

| | Storage stability of aqueous additive solution | | | | | | | | | | | | | |
|---|---|---|---|---|---|---|---|---|---|---|---|---|---|---|
| | Antiseptic property Exposure time (days) | | Filtration residue Exposure time (weeks) | | | | Changes in liquid physical properties Exposure time (weeks) | | | | Change in pH value Exposure time (weeks) | | | |
| | 2 | 5 | 4 | 10 | 15 | 20 | 4 | 10 | 15 | 20 | 4 | 10 | 15 | 20 |
| Example 13 | A | B | A | A | A | A | A | A | A | A | A | A | A | A |
| Example 14 | A | A | A | A | C | C | A | A | A | B | A | A | A | B |
| Example 15 | A | A | A | A | A | A | A | A | A | A | A | A | A | A |
| Example 16 | A | A | A | A | A | A | A | A | A | A | A | A | A | A |
| Example 17 | A | A | A | A | A | A | A | A | A | A | A | A | A | A |
| Example 18 | A | A | A | A | A | A | A | A | A | A | A | A | A | A |
| Example 19 | A | A | A | A | A | A | A | A | A | A | A | A | A | A |
| Example 20 | A | A | A | A | A | A | A | A | A | A | A | A | A | A |
| Example 21 | A | A | A | A | A | A | A | A | A | B | A | A | A | B |
| Example 22 | A | A | A | A | A | A | A | A | A | A | A | A | A | A |
| Example 23 | A | A | A | A | A | A | A | A | A | A | A | A | A | A |
| Example 24 | A | A | A | A | A | A | A | A | A | A | A | A | A | A |
| Example 25 | A | A | A | A | A | A | A | A | A | B | A | A | A | B |

TABLE 12

| | Storage stability of aqueous additive solution | | | | | | | | | | | | | |
|---|---|---|---|---|---|---|---|---|---|---|---|---|---|---|
| | Antiseptic property Exposure time (days) | | Filtration residue Exposure time (weeks) | | | | Changes in liquid physical properties Exposure time (weeks) | | | | Change in pH value Exposure time (weeks) | | | |
| | 2 | 5 | 4 | 10 | 15 | 20 | 4 | 10 | 15 | 20 | 4 | 10 | 15 | 20 |
| Example 26 | A | A | A | A | A | A | A | B | B | B | A | A | A | A |
| Example 27 | A | A | A | A | C | C | A | B | B | B | A | B | B | B |
| Example 28 | A | A | A | A | A | C | A | B | B | B | A | A | A | A |
| Example 29 | A | A | A | A | A | C | A | B | B | B | A | A | A | B |
| Example 30 | A | A | A | A | C | C | A | B | B | B | A | B | B | B |
| Example 31 | A | A | A | A | A | A | A | B | B | B | A | A | A | B |
| Example 32 | A | A | A | A | A | A | A | B | B | B | A | A | A | B |

TABLE 13

| | Storage stability of aqueous additive solution | | | | | | | | | | | | | |
|---|---|---|---|---|---|---|---|---|---|---|---|---|---|---|
| | Antiseptic property Exposure time (days) | | Filtration residue Exposure time (weeks) | | | | Changes in liquid physical properties Exposure time (weeks) | | | | Change in pH value Exposure time (weeks) | | | |
| | 2 | 5 | 4 | 10 | 15 | 20 | 4 | 10 | 15 | 20 | 4 | 10 | 15 | 20 |
| Comparative Example 1 | A | A | A | A | A | A | A | B | B | C | A | A | A | A |
| Comparative Example 2 | A | A | A | A | A | A | A | B | B | C | A | A | B | C |
| Comparative Example 3 | A | C | A | A | A | A | A | B | C | C | A | A | A | A |
| Comparative Example 4 | A | A | A | A | C | C | A | B | C | C | A | B | C | C |
| Comparative Example 5 | A | A | A | A | A | A | A | B | C | C | A | A | B | C |
| Comparative Example 6 | A | A | A | A | C | C | A | B | C | C | A | B | C | C |
| Comparative Example 7 | A | C | A | A | C | C | A | B | C | C | A | B | C | C |
| Comparative Example 8 | A | C | A | A | C | C | A | B | C | C | B | C | C | C |
| Comparative Example 9 | A | A | A | A | A | A | A | B | C | C | A | A | B | C |

TABLE 13-continued

| | Storage stability of aqueous additive solution | | | | | | | | | | | | | |
|---|---|---|---|---|---|---|---|---|---|---|---|---|---|---|
| | Antiseptic property Exposure time (days) | | Filtration residue Exposure time (weeks) | | | | Changes in liquid physical properties Exposure time (weeks) | | | | Change in pH value Exposure time (weeks) | | | |
| | 2 | 5 | 4 | 10 | 15 | 20 | 4 | 10 | 15 | 20 | 4 | 10 | 15 | 20 |
| Comparative Example 10 | A | A | A | A | C | C | A | B | C | C | A | B | C | C |
| Comparative Example 11 | A | C | A | A | C | C | A | B | C | C | A | B | C | C |
| Comparative Example 12 | A | C | A | A | C | C | A | B | C | C | B | C | C | C |
| Comparative Example 13 | A | A | A | A | A | A | A | B | B | C | A | A | A | A |
| Comparative Example 14 | A | A | A | A | A | A | A | B | B | C | A | A | A | A |
| Comparative Example 15 | A | A | A | A | A | A | A | B | B | C | A | A | A | A |
| Comparative Example 16 | A | A | A | A | A | A | A | B | B | C | A | A | A | A |

The above results showed that the aqueous additive solutions of Examples of the present invention had excellent storage stability even when they contained additives at high concentrations. It was found that, in particular, when the content of the compound (A) was 0.01% to 1.00% by mass and the content of the compound (II) was 5.00% to 20.00% by mass, the liquid physical properties did not change even after the forced test was performed for 10 weeks, and the aqueous additive solutions had very high storage stability. It was found that when a chelating agent, a preservative, and a buffering agent (pH value stabilizer) were further used in combination, the liquid physical properties and the pH value did not change even after the forced test was performed for 15 to 20 weeks, and the aqueous additive solutions had extremely high storage stability.

Example 33

Preparation of Aqueous Colorant Solution 33

In 200.00 parts by mass of deionized water, 0.33 parts by mass of the compound (a)-1, 9.67 parts by mass of the compound (P-3), 31.6 parts by mass of cyan dye (C-12), 42.2 parts by mass of cyan dye (C-26), 21.1 parts by mass of cyan dyes (C-47 and C-48), 4.7 parts by mass of cyan dye (C-62), 0.4 parts by mass of cyan dye (C-73), 1.50 parts by mass of a chelating agent (EDTA), 1.0 part by mass of a preservative (PROXEL (registered trademark) XL2(s), manufactured by LONZA), and 1.00 part by mass of a buffering agent ($NaHCO_3$) were dissolved, and the pH of the resulting solution was then adjusted to 8.5 with a pH adjusting agent (10 mol/L aqueous sodium hydroxide solution). The solution was filtered under reduced pressure through a microfilter having an average pore size of 0.20 μm and washed with an appropriate amount of deionized water. Subsequently, deionized water was added while the total mass was carefully checked to prepare an aqueous colorant solution (aqueous cyan dye solution) 33 (1,000 parts by mass).

Example 34

Preparation of Aqueous Colorant Solution 34

In 200.00 parts by mass of deionized water, 0.33 parts by mass of the compound (a)-1, 9.67 parts by mass of the compound (P-3), 6.25 parts by mass of cyan dye (C-12), 25.00 parts by mass of cyan dye (C-26), 37.50 parts by mass of cyan dyes (C-47 and C-48), 25.00 parts by mass of cyan dye (C-62), 6.25 parts by mass of cyan dye (C-73), 1.50 parts by mass of a chelating agent (EDTA), 1.00 part by mass of a preservative (PROXEL (registered trademark) XL2(s), manufactured by LONZA), and 1.00 part by mass of a buffering agent ($NaHCO_3$) were dissolved, and the pH of the resulting solution was then adjusted to 8.5 with a pH adjusting agent (10 mol/L aqueous sodium hydroxide solution). The solution was filtered under reduced pressure through a microfilter having an average pore size of 0.20 m and washed with an appropriate amount of deionized water. Subsequently, deionized water was added while the total mass was carefully checked to prepare an aqueous colorant solution (aqueous cyan dye solution) 34 (1,000 parts by mass).

Example 35

Preparation of Aqueous Colorant Solution 35

In 200.00 parts by mass of deionized water, 0.33 parts by mass of the compound (a)-1, 9.67 parts by mass of the compound (P-3), 6.06 parts by mass of cyan dye (C-12), 0.19 parts by mass of cyan dye (C-14), 24.25 parts by mass of cyan dye (C-26), 0.75 parts by mass of cyan dye (C-28), 36.38 parts by mass of cyan dyes (C-47 and C-48), 1.12 parts by mass of cyan dyes (C-59 and C-60), 24.25 parts by mass of cyan dye (C-62), 0.75 parts by mass of cyan dye (C-69), 6.25 parts by mass of cyan dye (C-73), 1.5 parts by mass of a chelating agent (EDTA), 1.00 part by mass of a preservative (PROXEL (registered trademark) XL2(s), manufactured by LONZA), and 1.00 part by mass of a buffering agent ($NaHCO_3$) were dissolved, and the pH of the resulting solution was then adjusted to 8.5 with a pH adjusting agent (10 mol/L aqueous sodium hydroxide solution). The solution was filtered under reduced pressure through a microfilter having an average pore size of 0.20 m and washed with an appropriate amount of deionized water. Subsequently, deionized water was added while the total mass was carefully checked to prepare an aqueous colorant solution (aqueous cyan dye solution) 35 (1,000 parts by mass).

Example 36

Preparation of Ink Composition 36

In 20.0 parts by mass of deionized water, 48.0 parts by mass of the aqueous colorant solution 34 prepared in Example 34, 9.70 parts by mass of glycerin, 3.40 parts by mass of triethylene glycol, 9.90 parts by mass of triethylene glycol monobutyl ether, 2.5 parts by mass of 2-pyrrolidone, 1.30 parts by mass of 1,2-hexanediol, and 1.0 part by mass of SURFYNOL (registered trademark) 465 (manufactured by Nissin Chemical Industry Co., Ltd.) were dissolved, and the pH of the resulting solution was then adjusted to 8.5 with a pH adjusting agent (10 mol/L aqueous sodium hydroxide solution). The solution was filtered under reduced pressure through a microfilter having an average pore size of 0.20 m and washed with an appropriate amount of deionized water. Subsequently, deionized water was added while the total mass was carefully checked to prepare an ink composition (cyan dye ink composition) 36 (100 parts by mass).

Example 37

Preparation of Ink Composition 37

In 20.0 parts by mass of deionized water, 48.0 parts by mass of the aqueous colorant solution 35 prepared in Example 35, 9.70 parts by mass of glycerin, 3.40 parts by mass of triethylene glycol, 9.90 parts by mass of triethylene glycol monobutyl ether, 2.5 parts by mass of 2-pyrrolidone, 1.30 parts by mass of 1,2-hexanediol, and 1.0 part by mass of SURFYNOL (registered trademark) 465 (manufactured by Nissin Chemical Industry Co., Ltd.) were dissolved, and the pH of the solution was then adjusted to 8.5 with a pH adjusting agent (10 mol/L aqueous sodium hydroxide solution). The solution was filtered under reduced pressure through a microfilter having an average pore size of 0.20 m and washed with an appropriate amount of deionized water. Subsequently, deionized water was added while the total mass was carefully checked to prepare an ink composition (cyan dye ink composition) 37 (100 parts by mass).

Example 38

Preparation of Aqueous Colorant Solution 38

In 200.00 parts by mass of deionized water, 2.6 parts by mass of the compound (a)-1, 74.4 parts by mass of the compound (P-3), 53.8 parts by mass of a black dye (exemplary compound I-1), 23.1 parts by mass of a toning agent (exemplary compound III-1), 23.1 parts by mass of a magenta dye (M dye 14 where M=Na salt) serving as a second toning agent, 0.33 parts by mass of a chelating agent (EDTA), 1.00 part by mass of a preservative (PROXEL (registered trademark) XL2(s), manufactured by LONZA), and 1.00 part by mass of a buffering agent ($NaHCO_3$) were dissolved, and the pH of the resulting solution was then adjusted to 8.5 with a pH adjusting agent (10 mol/L aqueous lithium hydroxide solution). The solution was filtered under reduced pressure through a microfilter having an average pore size of 0.20 m and washed with an appropriate amount of deionized water. Subsequently, deionized water was added while the total mass was carefully checked to prepare an aqueous colorant solution (aqueous black dye solution) 38 (1,000 parts by mass).

Example 39

Preparation of Aqueous Colorant Solution 39

In 200.00 parts by mass of deionized water, 2.6 parts by mass of the compound (a)-1, 74.4 parts by mass of the compound (P-3), 53.8 parts by mass of a black dye (exemplary compound I-3), 23.1 parts by mass of a toning agent (exemplary compound III-1), 23.1 parts by mass of a magenta dye (M dye 14 where M=Na salt) serving as a second toning agent, 0.33 parts by mass of a chelating agent (EDTA), 1.00 part by mass of a preservative (PROXEL (registered trademark) XL2(s), manufactured by LONZA), and 1.00 part by mass of a buffering agent ($NaHCO_3$) were dissolved, and the pH of the resulting solution was then adjusted to 8.5 with a pH adjusting agent (10 mol/L aqueous lithium hydroxide solution). The solution was filtered under reduced pressure through a microfilter having an average pore size of 0.20 m and washed with an appropriate amount of deionized water. Subsequently, deionized water was added while the total mass was carefully checked to prepare an aqueous colorant solution (aqueous black dye solution) 39 (1,000 parts by mass).

Example 40

Preparation of Aqueous Colorant Solution 40

In 200.00 parts by mass of deionized water, 0.38 parts by mass of the compound (a)-1, 10.98 parts by mass of the compound (P-3), 79.5 parts by mass of a gray dye (exemplary compound I-1), 11.4 parts by mass of a toning agent (exemplary compound III-1), 9.1 parts by mass of a magenta dye (M dye 14 where M=Na salt) serving as a second toning agent, 0.50 parts by mass of a chelating agent (EDTA), 1.00 part by mass of a preservative (PROXEL (registered trademark) XL2(s), manufactured by LONZA), and 1.00 part by mass of a buffering agent ($NaHCO_3$) were dissolved, and the pH of the resulting solution was then adjusted to 8.5 with a pH adjusting agent (10 mol/L aqueous lithium hydroxide solution). The solution was filtered under reduced pressure through a microfilter having an average pore size of 0.20 m and washed with an appropriate amount of deionized water. Subsequently, deionized water was added while the total mass was carefully checked to prepare an aqueous colorant solution (aqueous gray dye solution) 40 (1,000 parts by mass).

Example 41

Preparation of Aqueous Colorant Solution 41

An aqueous colorant solution (aqueous black dye solution) 41 (1,000 parts by mass) was prepared in the same manner as in Example 38 described above except that the buffering agent ($NaHCO_3$) was not added.

Example 42

Preparation of Aqueous Colorant Solution 42

An aqueous colorant solution (aqueous black dye solution) 42 (1,000 parts by mass) was prepared in the same manner as in Example 38 described above except that the preservative (PROXEL (registered trademark) XL2(s), manufactured by LONZA) was not added.

Example 43

Preparation of Aqueous Colorant Solution 43

An aqueous colorant solution (aqueous black dye solution) 43 (1,000 parts by mass) was prepared in the same manner as in Example 38 described above except that the chelating agent (EDTA) was not added.

Example 44

Preparation of Ink Composition 44

In 20.0 parts by mass of deionized water, 65.0 parts by mass of the aqueous colorant solution 38 prepared in Example 38, 10.0 parts by mass of glycerin, 2.0 parts by mass of triethylene glycol, 10.0 parts by mass of triethylene glycol monobutyl ether, 2.0 parts by mass of 2-pyrrolidone, and 1.0 part by mass of SURFYNOL (registered trademark) 465 (manufactured by Nissin Chemical Industry Co., Ltd.) were dissolved, and the pH of the resulting solution was then adjusted to 8.5 with a pH adjusting agent (10 mol/L aqueous sodium hydroxide solution). The solution was filtered under reduced pressure through a microfilter having an average pore size of 0.20 m and washed with an appropriate amount of deionized water. Subsequently, deionized water was added while the total mass was carefully checked to prepare an ink composition (black dye ink composition) 44 (100 parts by mass).

Example 45

Preparation of Ink Composition 45

In 20.0 parts by mass of deionized water, 65.0 parts by mass of the aqueous colorant solution 39 prepared in Example 39, 10.0 parts by mass of glycerin, 2.0 parts by mass of triethylene glycol, 10.0 parts by mass of triethylene glycol monobutyl ether, 2.0 parts by mass of 2-pyrrolidone, and 1.0 part by mass of SURFYNOL (registered trademark) 465 (manufactured by Nissin Chemical Industry Co., Ltd.) were dissolved, and the pH of the resulting solution was then adjusted to 8.5 with a pH adjusting agent (10 mol/L aqueous sodium hydroxide solution). The solution was filtered under reduced pressure through a microfilter having an average pore size of 0.20 m and washed with an appropriate amount of deionized water. Subsequently, deionized water was added while the total mass was carefully checked to prepare an ink composition (black dye ink composition) 45 (100 parts by mass).

Example 46

Preparation of Ink Composition 46

In 20.0 parts by mass of deionized water, 8.8 parts by mass of the aqueous colorant solution 40 prepared in Example 40, 7.3 parts by mass of glycerin, 8.0 parts by mass of triethylene glycol, 7.6 parts by mass of triethylene glycol monobutyl ether, 2.9 parts by mass of 2-pyrrolidone, and 0.3 parts by mass of propylene glycol were dissolved, and the pH of the resulting solution was then adjusted to 8.5 with a pH adjusting agent (10 mol/L aqueous sodium hydroxide solution). The solution was filtered under reduced pressure through a microfilter having an average pore size of 0.20 m and washed with an appropriate amount of deionized water. Subsequently, deionized water was added while the total mass was carefully checked to prepare an ink composition (gray dye ink composition) 46 (100 parts by mass).

Example 47

Preparation of Ink Composition 47

In 20.0 parts by mass of deionized water, 65.0 parts by mass of the aqueous colorant solution 38 prepared in Example 38, 6.5 parts by mass of glycerin, 2.3 parts by mass of triethylene glycol, 2.9 parts by mass of 1,5-pentanediol, 3.7 parts by mass of 2-pyrrolidone, and 0.5 parts by mass of SURFYNOL (registered trademark) 465 (manufactured by Nissin Chemical Industry Co., Ltd.) were dissolved, and the pH of the resulting solution was then adjusted to 8.5 with a pH adjusting agent (10 mol/L aqueous sodium hydroxide solution). The solution was filtered under reduced pressure through a microfilter having an average pore size of 0.20 m and washed with an appropriate amount of deionized water. Subsequently, deionized water was added while the total mass was carefully checked to prepare an ink composition (black dye ink composition) 47 (100 parts by mass).

Example 48

Preparation of Ink Composition 48

In 20.0 parts by mass of deionized water, 65.0 parts by mass of the aqueous colorant solution 39 prepared in Example 39, 6.5 parts by mass of glycerin, 2.3 parts by mass of triethylene glycol, 2.9 parts by mass of 1,5-pentanediol, 3.7 parts by mass of 2-pyrrolidone, and 0.5 parts by mass of SURFYNOL (registered trademark) 465 (manufactured by Nissin Chemical Industry Co., Ltd.) were dissolved, and the pH of the resulting solution was then adjusted to 8.5 with a pH adjusting agent (10 mol/L aqueous sodium hydroxide solution). The solution was filtered under reduced pressure through a microfilter having an average pore size of 0.20 m and washed with an appropriate amount of deionized water. Subsequently, deionized water was added while the total mass was carefully checked to prepare an ink composition (black dye ink composition) 48 (100 parts by mass).

Example 49

Preparation of Ink Composition 49

In 20.0 parts by mass of deionized water, 8.8 parts by mass of the aqueous colorant solution 40 prepared in Example 40, 6.5 parts by mass of glycerin, 2.3 parts by mass of triethylene glycol, 2.9 parts by mass of 1,5-pentanediol, 3.7 parts by mass of 2-pyrrolidone, and 0.5 parts by mass of SURFYNOL (registered trademark) 465 (manufactured by Nissin Chemical Industry Co., Ltd.) were dissolved, and the pH of the resulting solution was then adjusted to 8.5 with a pH adjusting agent (10 mol/L aqueous sodium hydroxide solution). The solution was filtered under reduced pressure through a microfilter having an average pore size of 0.20 m and washed with an appropriate amount of deionized water. Subsequently, deionized water was added while the total mass was carefully checked to prepare an ink composition (gray dye ink composition) 49 (100 parts by mass).

Comparative Example 17

Preparation of Comparative Aqueous Colorant Solution 17

A comparative aqueous colorant solution (comparative aqueous black dye solution) 17 (1,000 parts by mass) was prepared in the same manner as in Example 38 described above except that the compound (a)-1 was not added.

Comparative Example 18

Preparation of Comparative Aqueous Colorant Solution 18

A comparative aqueous colorant solution (comparative aqueous black dye solution) 18 (1,000 parts by mass) was prepared in the same manner as in Example 38 described above except that neither compound (P-3) nor the buffering agent ($NaHCO_3$) was added.

Comparative Example 19

Preparation of Comparative Aqueous Colorant Solution 19

A comparative aqueous colorant solution (comparative aqueous black dye solution) 19 (1,000 parts by mass) was prepared in the same manner as in Example 38 described above except that neither compound (P-3) nor the preservative (PROXEL (registered trademark) XL2(s), manufactured by LONZA) was added.

Comparative Example 20

Preparation of Comparative Aqueous Colorant Solution 20

A comparative aqueous colorant solution (comparative aqueous black dye solution) 20 (1,000 parts by mass) was prepared in the same manner as in Example 38 described above except that neither compound (P-3) nor the chelating agent (EDTA) was added.

Storage Stability of Aqueous Colorant Solution and Ink Composition

The aqueous colorant solutions 33 to 35 and 38 to 43 and the ink compositions 36 and 37 and 44 to 49 prepared in Examples 33 to 49 and the comparative aqueous colorant solutions 17 to 20 prepared in Comparative Examples 17 to 20 were stored, as a forced test, for 4 weeks at 60° C. and a relative humidity of 50%, for 10 weeks at 60° C. and a relative humidity of 50%, for 15 weeks at 60° C. and a relative humidity of 50%, and for 20 weeks at 60° C. and a relative humidity of 50%, and storage stability was then evaluated.

The antiseptic property, the presence or absence of insoluble matter (precipitate) (filtration residue), changes in liquid physical properties (the absorbance, the viscosity, and the surface tension), and a change in the pH value were evaluated by the same methods and evaluation criteria as those used in Examples 1 to 32 and Comparative Examples 1 to 16. However, only the measurement of the absorbance and the calculation were performed under the following conditions.

Absorbance

With regard to each aqueous colorant solution, after 450 mg (0.45 g) of the aqueous colorant solution was weighed, the aqueous colorant solution was diluted with deionized water up to 50 mL, and 2 mL of the resulting diluted solution was further diluted with deionized water up to 100 mL. The diluted aqueous solution was then poured into a quartz cell with a size of 1 cm×1 cm, and the absorbance in the range of 250 nm to 900 nm was measured with a UV-Vis spectrophotometer (UV-1800) manufactured by Shimadzu Corporation in an environment at 25° C. and a relative humidity of 50%. The absorbance at λmax in the ultraviolet to visible region (250 to 700 nm) was checked, and a change before and after the forced test was then calculated.

With regard to each ink composition, after 200 mg (0.2 g) of the ink composition was weighed, the ink composition was diluted with deionized water up to 50 mL, and 2 mL of the resulting diluted solution was further diluted with deionized water up to 100 mL. The diluted aqueous solution was then poured into a quartz cell with a size of 1 cm×1 cm, and the absorbance in the range of 250 nm to 400 nm was measured with a UV-Vis spectrophotometer (UV-1800) manufactured by Shimadzu Corporation in an environment at 25° C. and a relative humidity of 50%. The absorbance at λmax in the ultraviolet region (250 to 300 nm) was checked, and a change before and after the forced test was then calculated.

The results of Examples 33 to 49 and Comparative Examples 17 to 20 are shown in Tables 14 and 15 below.

TABLE 14

| | Storage stability of aqueous colorant solution and ink composition | | | | | | | | | | | | | |
|---|---|---|---|---|---|---|---|---|---|---|---|---|---|---|
| | Antiseptic property Exposure time (days) | | Filtration residue Exposure time (weeks) | | | | Changes in liquid physical properties Exposure time (weeks) | | | | Change in pH value Exposure time (weeks) | | | |
| | 2 | 5 | 4 | 10 | 15 | 20 | 4 | 10 | 15 | 20 | 4 | 10 | 15 | 20 |
| Example 33 | A | A | A | A | A | A | A | A | A | A | A | A | A | A |
| Example 34 | A | A | A | A | A | A | A | A | A | A | A | A | A | A |
| Example 35 | A | A | A | A | A | A | A | A | A | A | A | A | A | A |
| Example 36 | A | A | A | A | A | A | A | A | A | A | A | A | A | A |
| Example 37 | A | A | A | A | A | A | A | A | A | A | A | A | A | A |
| Example 38 | A | A | A | A | A | A | A | A | A | A | A | A | A | A |
| Example 39 | A | A | A | A | A | A | A | A | A | A | A | A | A | A |
| Example 40 | A | A | A | A | A | A | A | A | A | A | A | A | A | A |

TABLE 15

| | Storage stability of aqueous colorant solution and ink composition | | | | | | | | | | | | | |
|---|---|---|---|---|---|---|---|---|---|---|---|---|---|---|
| | Antiseptic property Exposure time (days) | | Filtration residue Exposure time (weeks) | | | | Changes in liquid physical properties Exposure time (weeks) | | | | Change in pH value Exposure time (weeks) | | | |
| | 2 | 5 | 4 | 10 | 15 | 20 | 4 | 10 | 15 | 20 | 4 | 10 | 15 | 20 |
| Example 41 | A | A | A | A | A | A | A | A | B | A | A | A | A | B |
| Example 42 | A | B | A | A | A | A | A | A | A | A | A | A | A | A |
| Example 43 | A | A | A | A | A | C | A | A | A | C | A | A | A | B |
| Example 44 | A | A | A | A | A | A | A | A | A | A | A | A | A | A |
| Example 45 | A | A | A | A | A | A | A | A | A | A | A | A | A | A |

TABLE 15-continued

| | Storage stability of aqueous colorant solution and ink composition | | | | | | | | | | | | | |
|---|---|---|---|---|---|---|---|---|---|---|---|---|---|---|
| | Antiseptic property Exposure time (days) | | Filtration residue Exposure time (weeks) | | | | Changes in liquid physical properties Exposure time (weeks) | | | | Change in pH value Exposure time (weeks) | | | |
| | 2 | 5 | 4 | 10 | 15 | 20 | 4 | 10 | 15 | 20 | 4 | 10 | 15 | 20 |
| Example 46 | A | A | A | A | A | A | A | A | A | A | A | A | A | A |
| Example 47 | A | A | A | A | A | A | A | A | A | A | A | A | A | A |
| Example 48 | A | A | A | A | A | A | A | A | A | A | A | A | A | A |
| Example 49 | A | A | A | A | A | A | A | A | A | A | A | A | A | A |
| Comparative Example 17 | A | A | A | A | A | A | A | B | C | C | A | A | A | A |
| Comparative Example 18 | A | A | A | A | A | C | A | B | C | C | A | B | B | C |
| Comparative Example 19 | A | B | A | A | A | C | A | B | C | C | A | A | B | C |
| Comparative Example 20 | A | A | A | A | C | C | A | B | C | C | A | B | B | C |

The above results showed that the aqueous colorant solutions and the ink compositions of Examples of the present invention had excellent storage stability even when they contained a colorant at a high concentration. It was found that, in particular, when the content of the compound (A) in the aqueous colorant solution was 0.00100 to 0.3% by mass, and the content of the compound (II) was 0.5% to 8.0% by mass, the liquid physical properties did not change even after the forced test was performed for 10 weeks, and the aqueous colorant solutions and the ink compositions had very high storage stability. It was found that when a chelating agent, a preservative, and a buffering agent (pH value stabilizer) were further used in combination, the liquid physical properties and the pH value did not change even after the forced test was performed for 15 to 20 weeks, and the aqueous colorant solutions and the ink compositions had extremely high storage stability.

According to the present invention, it is possible to provide an aqueous additive solution for an ink composition, an aqueous colorant solution for an ink composition, and an ink composition which are excellent in storage stability (have excellent antiseptic properties, and produce less precipitation of insoluble matter, are less likely to undergo changes in the absorbance, viscosity, and surface tension, and less likely to undergo a change in the pH value when stored for a long period of time), an ink composition for ink jet recording, the ink composition including the above ink composition, and an ink jet recording method using the above ink composition for ink jet recording.

While the present invention has been described in detail and with reference to specific embodiments, it will be apparent to those skilled in the art that various changes and modifications can be made without departing from the spirit and scope of the present invention.

This application is based on Japanese Patent Application (JP2021-058541) filed on Mar. 30, 2021, the contents of which are herein incorporated by reference.

What is claimed is:

1. An aqueous additive solution for an ink composition, the aqueous additive solution comprising:

a compound represented by the following general formula (A);

a compound represented by the following general formula (II); and water, (A)

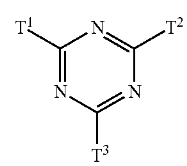

wherein, in general formula (A), $T^1$, $T^2$, and $T^3$ each independently represent $*—NH—(CH_2)_n$-Rt, $*—NH—(CH_2)_n—OH$, $*—N—\{(CH_2)_n—OH\}_2$, $*—NH—CH_2CH(OH)CH_2$-Rt, *-OM, a halogen atom, or a substituted or unsubstituted arylamino group, provided that at least one of $T^1$, $T^2$, or $T^3$ represents $*—NH—(CH_2)_n$-Rt, $*—NH—(CH_2)_n—OH$, $*—N—\{(CH_2)_n—OH\}_2$, or $*—NH—CH_2CH(OH)CH_2$-Rt; * represents a bonding site to a triazine ring, n represents an integer of 1 to 5, and Rt represents $CO_2M$, $SO_3M$, or $PO(OM)_2$; M represents a hydrogen atom or a counter cation; if a plurality of n are present, the plurality of n may be the same or different; and if a plurality of M are present, the plurality of M may be the same or different;

(II)

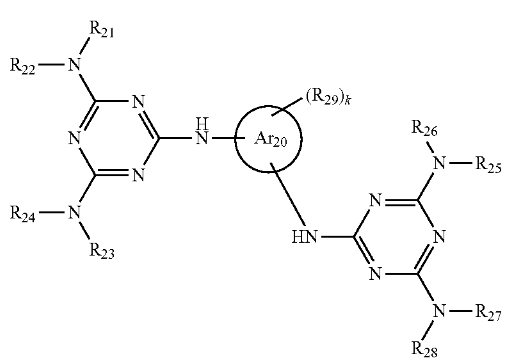

in general formula (II), $Ar_{20}$ represents a benzene ring or a naphthalene ring; $R_{21}$ to $R_{28}$ each independently represent a hydrogen atom or a substituent; $R_{21}$ and $R_{22}$ may be bonded to each other to form a ring; $R_{23}$ and $R_{24}$ may be bonded to each other to form a ring; $R_{25}$ and $R_{26}$ may be bonded to each other to form a ring; $R_{27}$ and $R_{28}$ may be bonded to each other to form a ring; $R_{29}$ represents a substituent; if $Ar_{20}$ represents a benzene ring, k represents an integer of 0 to 4; if $Ar_{20}$ represents a naphthalene ring, k represents an integer of 0 to 6; if a plurality of $R_{29}$ are present, the plurality of $R_{29}$ may be the same or different; and if a plurality of $R_{29}$ are present, the plurality of $R_{29}$ may be bonded together to form a ring; provided that the compound represented by general formula (II) has at least one hydrophilic group.

2. The aqueous additive solution for an ink composition according to claim 1, wherein the compound represented by the general formula (A) is at least one compound selected from the following compound group (a):

Compound group (a)

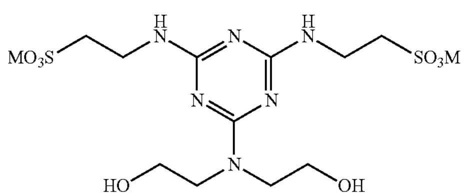

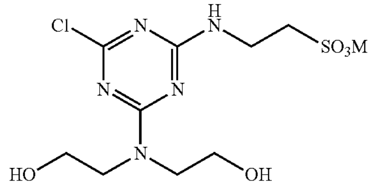

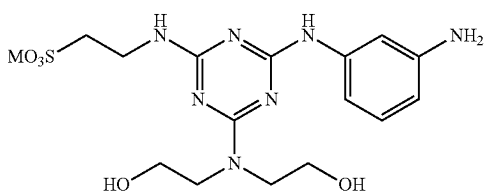

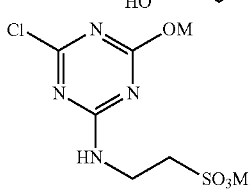

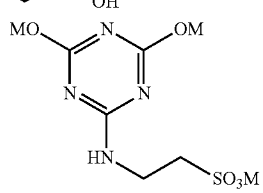

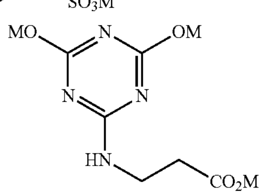

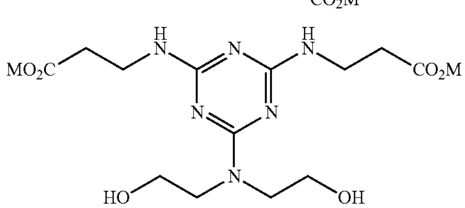

-continued

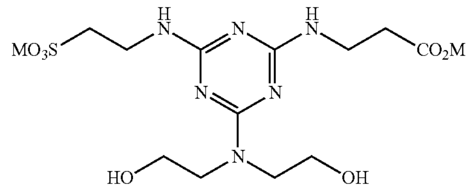

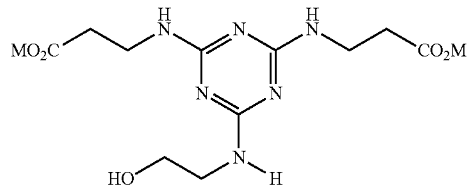

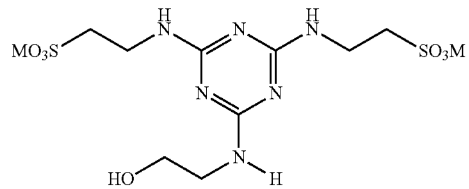

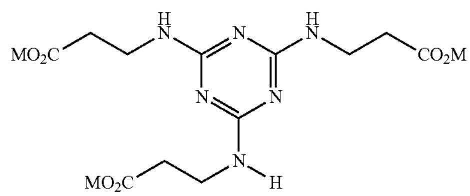

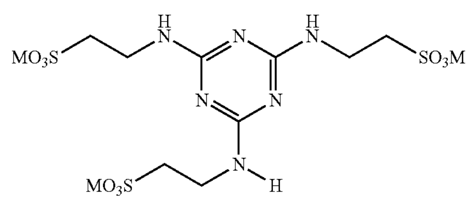

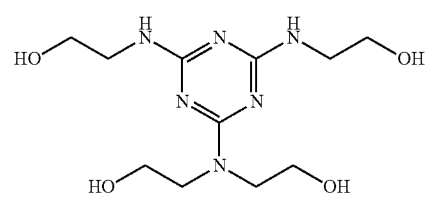

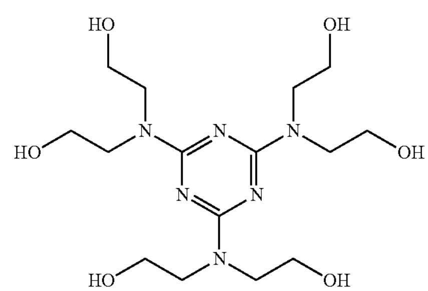

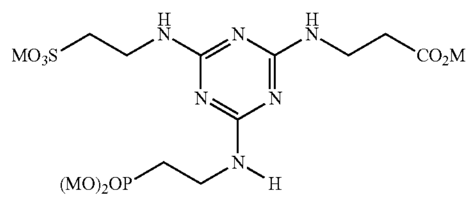

-continued

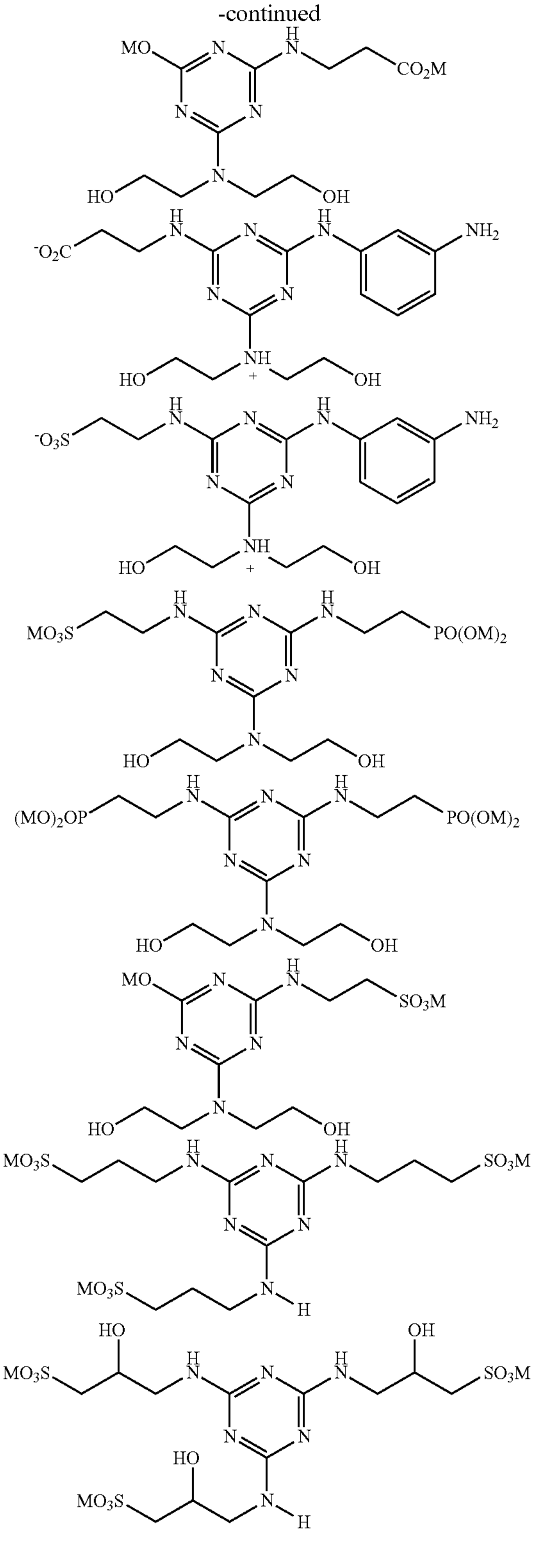

wherein M in a compound of the compound group (a) represents a hydrogen atom or a counter cation; and if a plurality of M are present in the compound, the plurality of M may be the same or different.

3. The aqueous additive solution for an ink composition according to claim 1, wherein at least one of $R_{21}$ to $R_{29}$ in the general formula (II) has an ionic hydrophilic group.

4. The aqueous additive solution for an ink composition according to claim 1, wherein a content of the compound represented by the general formula (II) is 5.0% to 20.0% by mass based on a total mass of the aqueous additive solution for an ink composition.

5. The aqueous additive solution for an ink composition according to claim 1, wherein a content of the compound represented by the general formula (A) is 0.01% to 1.0% by mass based on a total mass of the aqueous additive solution for an ink composition.

6. The aqueous additive solution for an ink composition according to claim 1, further comprising a chelating agent.

7. The aqueous additive solution for an ink composition according to claim 6, wherein a content of the chelating agent is 0.001% to 1.0% by mass based on a total mass of the aqueous additive solution for an ink composition.

8. The aqueous additive solution for an ink composition according to claim 1, further comprising a preservative.

9. The aqueous additive solution for an ink composition according to claim 8, wherein a content of the preservative is 0.01% to 1.0% by mass based on a total mass of the aqueous additive solution for an ink composition.

10. The aqueous additive solution for an ink composition according to claim 1, further comprising a buffering agent.

11. The aqueous additive solution for an ink composition according to claim 1, having a pH value of 6.5 to 9.0 at 25° C.

12. An aqueous colorant solution for an ink composition, the aqueous colorant solution comprising:

a compound represented by the following general formula (A);

a compound represented by the following general formula (II);

water; and a colorant,

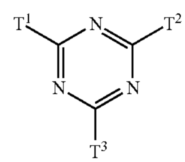

(A)

wherein, in general formula (A), $T^1$, $T^2$, and $T^3$ each independently represent *—NH—$(CH_2)_n$-Rt, *—NH—$(CH_2)_n$—OH, *—N—$\{(CH_2)_n—OH\}_2$, *—NH—$CH_2CH(OH)CH_2$-Rt, *-OM, a halogen atom, or a substituted or unsubstituted arylamino group, provided that at least one of $T^1$, $T^2$, or $T^3$ represents *—NH—$(CH_2)_n$-Rt, *—NH—$(CH_2)_n$—OH, *—N—$\{(CH_2)_n—OH\}_2$, or *—NH—$CH_2CH(OH)CH_2$-Rt; * represents a bonding site to a triazine ring, n represents an integer of 1 to 5, and Rt represents $CO_2M$, $SO_3M$, or $PO(OM)_2$; M represents a hydrogen atom or a counter cation; if a plurality of n are present, the plurality of n may be the same or different; and if a plurality of M are present, the plurality of M may be the same or different;

(II)

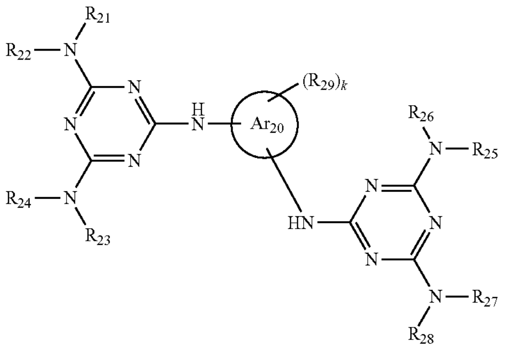

in general formula (II), $Ar_{20}$ represents a benzene ring or a naphthalene ring; $R_{21}$ to $R_{28}$ each independently represent a hydrogen atom or a substituent; $R_{21}$ and $R_{22}$ may be bonded to each other to form a ring; $R_{23}$ and $R_{24}$ may be bonded to each other to form a ring; $R_{25}$ and $R_{26}$ may be bonded to each other to form a ring; $R_{27}$ and $R_{28}$ may be bonded to each other to form a ring; $R_{29}$ represents a substituent; if $Ar_{20}$ represents a benzene ring, k represents an integer of 0 to 4; if $Ar_{20}$ represents a naphthalene ring, k represents an integer of 0 to 6; if a plurality of $R_{29}$ are present, the plurality of $R_{29}$ may be the same or different; and if a plurality of $R_{29}$ are present, the plurality of $R_{29}$ may be bonded together to form a ring; provided that the compound represented by general formula (II) has at least one hydrophilic group.

13. An ink composition comprising:

a compound represented by the following general formula (A);

a compound represented by the following general formula (II);

water; and a colorant, (A)

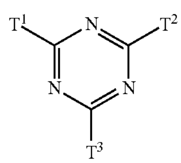

wherein, in general formula (A), $T^1$, $T^2$, and $T^3$ each independently represent *—NH—$(CH_2)_n$-Rt, *—NH—$(CH_2)_n$—OH, *—N—{$(CH_2)_n$—OH}$_2$, *—NH—$CH_2CH(OH)CH_2$-Rt, *-OM, a halogen atom, or a substituted or unsubstituted arylamino group, provided that at least one of $T^1$, $T^2$, or $T^3$ represents *—NH—$(CH_2)_n$-Rt, *—NH—$(CH_2)_n$—OH, *—N—{$(CH_2)_n$—OH}$_2$, or *—NH—$CH_2CH(OH)CH_2$-Rt; * represents a bonding site to a triazine ring, n represents an integer of 1 to 5, and Rt represents $CO_2M$, $SO_3M$, or $PO(OM)_2$; M represents a hydrogen atom or a counter cation; if a plurality of n are present, the plurality of n may be the same or different; and if a plurality of M are present, the plurality of M may be the same or different;

(II)

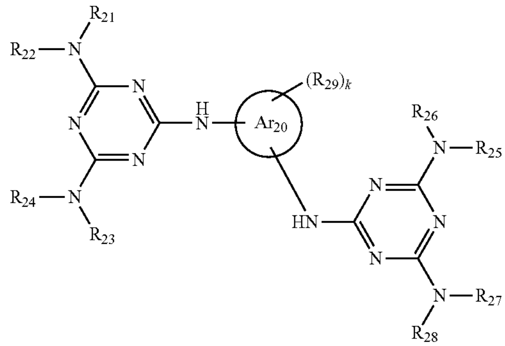

in general formula (II), $Ar_{20}$ represents a benzene ring or a naphthalene ring; $R_{21}$ to $R_{28}$ each independently represent a hydrogen atom or a substituent; $R_{21}$ and $R_{22}$ may be bonded to each other to form a ring; $R_{23}$ and $R_{24}$ may be bonded to each other to form a ring; $R_{25}$ and $R_{26}$ may be bonded to each other to form a ring; $R_{27}$ and $R_{28}$ may be bonded to each other to form a ring; $R_{29}$ represents a substituent; if $Ar_{20}$ represents a benzene ring, k represents an integer of 0 to 4; if $Ar_{20}$ represents a naphthalene ring, k represents an integer of 0 to 6; if a plurality of $R_{29}$ are present, the plurality of $R_{29}$ may be the same or different; and if a plurality of $R_{29}$ are present, the plurality of $R_{29}$ may be bonded together to form a ring; provided that the compound represented by general formula (II) has at least one hydrophilic group.

14. The ink composition according to claim 13, wherein the compound represented by the general formula (A) is at least one compound selected from the following compound group (a):

Compound group (a)

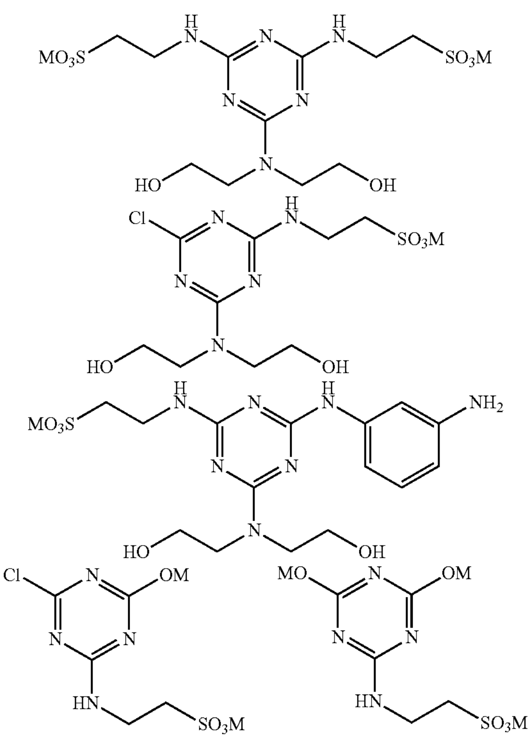

-continued
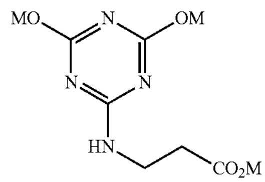
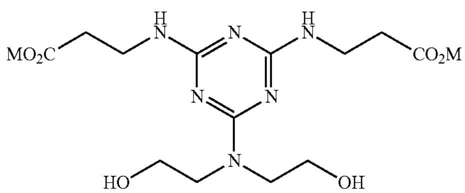
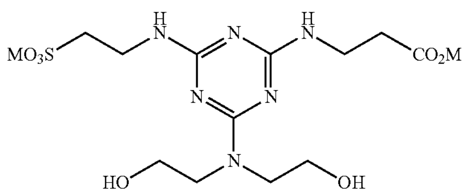
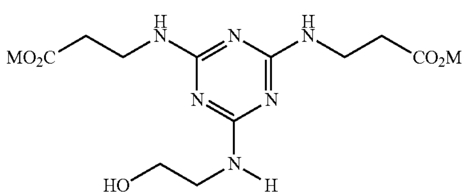
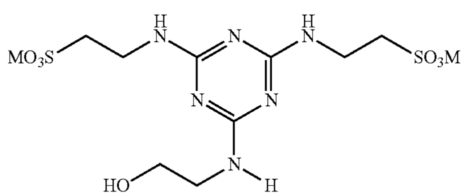
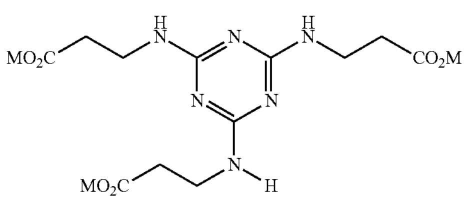
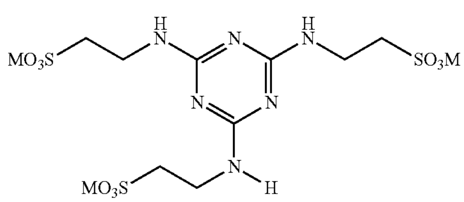
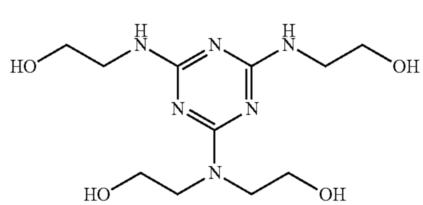
-continued
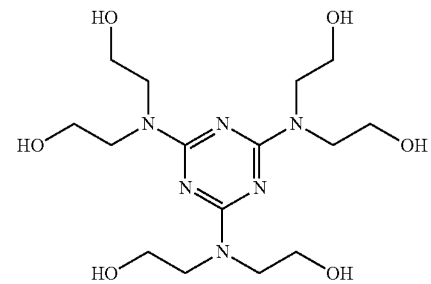
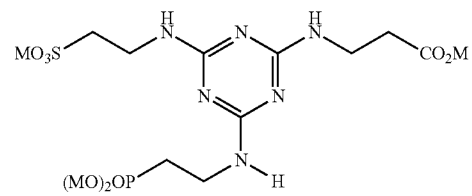
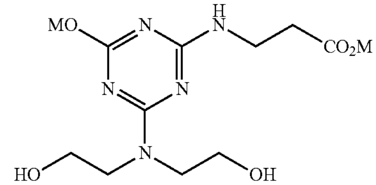
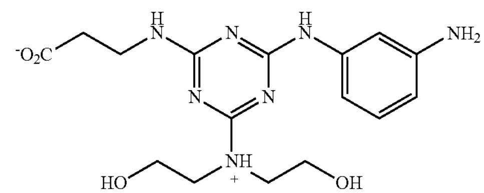
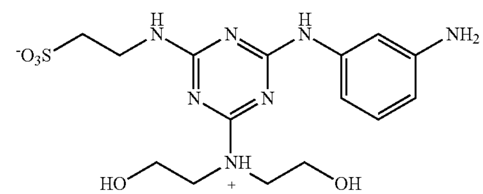
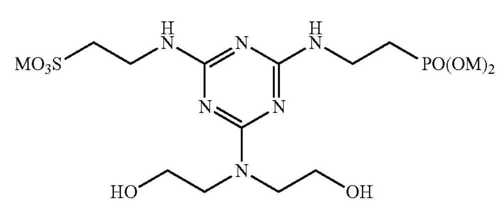
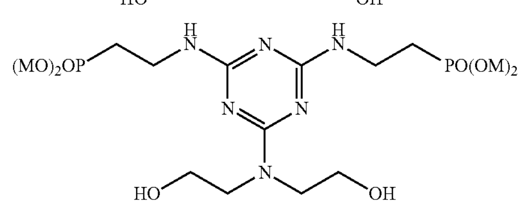
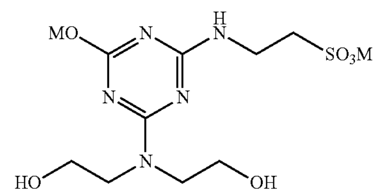

-continued

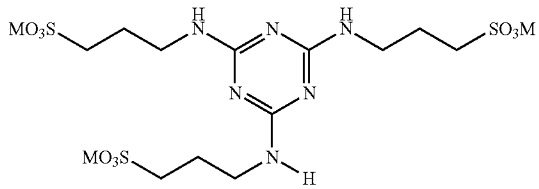

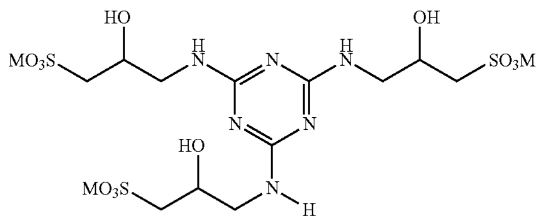

wherein M in a compound of the compound group (a) represents a hydrogen atom or a counter cation; and if a plurality of M are present in the compound, the plurality of M may be the same or different.

15. The ink composition according to claim 13, further comprising a chelating agent, wherein a content of the chelating agent is 0.001% to 1.0% by mass based on a total mass of the ink composition.

16. The ink composition according to claim 13, further comprising a preservative.

17. The ink composition according to claim 16, wherein a content of the preservative is 0.001% to 0.5% by mass based on a total mass of the ink composition.

18. The ink composition according to claim 13, further comprising a buffering agent.

19. An ink jet recording method comprising: ejecting the ink composition according to claim 13 with a recording head for an ink jet process.

* * * * *